(12) United States Patent
Roh et al.

(10) Patent No.: US 10,209,779 B2
(45) Date of Patent: Feb. 19, 2019

(54) METHOD FOR DISPLAYING CONTENT AND ELECTRONIC DEVICE THEREFOR

(71) Applicant: Samsung Electronics Co., Ltd., Gyeonggi-do (KR)

(72) Inventors: Byoung-Tack Roh, Gyeonggi-do (KR); Cheol-Ho Cheong, Seoul (KR); Yang-Su Kim, Gyeonggi-do (KR); Dong-Il Son, Gyeonggi-do (KR); Jae-Yung Yeo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 98 days.

(21) Appl. No.: 15/120,587

(22) PCT Filed: Feb. 17, 2015

(86) PCT No.: PCT/KR2015/001666
§ 371 (c)(1),
(2) Date: Aug. 22, 2016

(87) PCT Pub. No.: WO2015/126182
PCT Pub. Date: Aug. 27, 2015

(65) Prior Publication Data
US 2017/0010677 A1     Jan. 12, 2017

Related U.S. Application Data

(60) Provisional application No. 61/943,004, filed on Feb. 21, 2014.

(30) Foreign Application Priority Data

Dec. 30, 2014    (KR) ........................ 10-2014-0194289

(51) Int. Cl.
*G06F 3/01*     (2006.01)
*G06F 3/0488*    (2013.01)
(Continued)

(52) U.S. Cl.
CPC .............. *G06F 3/017* (2013.01); *G06F 1/163* (2013.01); *G06F 3/01* (2013.01); *G06F 3/015* (2013.01);
(Continued)

(58) Field of Classification Search
CPC . G06F 3/017; G06F 1/163; G06F 3/01; G06F 3/0482; G06F 3/1454;
(Continued)

(56) References Cited

U.S. PATENT DOCUMENTS

2005/0276164 A1*   12/2005   Amron ................... G04C 3/002
                                                                                               368/82
2006/0148619 A1*   7/2006   Tsubata .............. A63B 24/0062
                                                                                                 482/8

(Continued)

FOREIGN PATENT DOCUMENTS

KR     10-2007-0076700 A     7/2007
KR     10-0869245 B1          11/2008
(Continued)

*Primary Examiner* — Richard Hong
(74) *Attorney, Agent, or Firm* — Cha & Reiter, LLC

(57) ABSTRACT

A method for operating an electronic device of the present invention may comprise determining movement information of the electronic device based on sensing data measured through a sensor module; determining bio information for a user by analyzing one or more bio signals; and controlling the electronic device according to the movement information and the bio information. In addition, another embodiment is also possible.

28 Claims, 28 Drawing Sheets

Display Level 3

Display Level 2

Display Level 3

Display Level 2

(51) Int. Cl.
    *G06F 3/048*     (2013.01)
    *G06F 1/16*     (2006.01)
    *G06F 3/0346*     (2013.01)
    *G06F 3/14*     (2006.01)
    *G06F 3/0482*     (2013.01)
    *G06F 3/0485*     (2013.01)

(52) U.S. Cl.
    CPC ............ *G06F 3/0346* (2013.01); *G06F 3/048* (2013.01); *G06F 3/0482* (2013.01); *G06F 3/0485* (2013.01); *G06F 3/0488* (2013.01); *G06F 3/04883* (2013.01); *G06F 3/1454* (2013.01)

(58) Field of Classification Search
    CPC ....... G06F 1/1626; G06F 3/041; A61B 5/721; A61B 5/0028; A61B 5/01; A61B 5/0205; A61B 5/0015; G04F 10/00; G04C 3/002; A63B 24/0062
    See application file for complete search history.

(56) References Cited

U.S. PATENT DOCUMENTS

| | | |
|---|---|---|
| 2008/0171636 A1 | 7/2008 | Usui et al. |
| 2009/0100384 A1 | 4/2009 | Louch |
| 2009/0144069 A1 | 6/2009 | Kang et al. |
| 2010/0066763 A1* | 3/2010 | MacDougall ......... G06F 1/1626 345/656 |
| 2011/0003665 A1* | 1/2011 | Burton .................... G04F 10/00 482/9 |
| 2011/0275940 A1 | 11/2011 | Nims et al. |
| 2012/0327123 A1 | 12/2012 | Felt |
| 2013/0009867 A1 | 1/2013 | Woo |
| 2013/0111384 A1 | 5/2013 | Kim et al. |
| 2013/0285963 A1 | 10/2013 | Park et al. |
| 2013/0332286 A1* | 12/2013 | Medelius ................ A61B 5/01 705/14.66 |
| 2014/0180595 A1* | 6/2014 | Brumback .......... A61B 5/0015 702/19 |
| 2015/0182130 A1* | 7/2015 | Utter, II ............... A61B 5/0205 600/483 |
| 2015/0230756 A1* | 8/2015 | Luna ..................... A61B 5/721 600/484 |
| 2015/0338914 A1* | 11/2015 | Andrysco ............... G06F 3/041 345/173 |
| 2016/0073883 A1* | 3/2016 | Charrat ................ A61B 5/0028 600/485 |
| 2016/0349803 A1* | 12/2016 | Dusan .................... G04C 3/002 |

FOREIGN PATENT DOCUMENTS

| | | |
|---|---|---|
| KR | 10-2012-0098854 A | 9/2012 |
| KR | 10-2013-0005656 A | 1/2013 |
| KR | 10-2013-0046147 A | 5/2013 |
| KR | 10-2013-0107156 A | 10/2013 |

\* cited by examiner

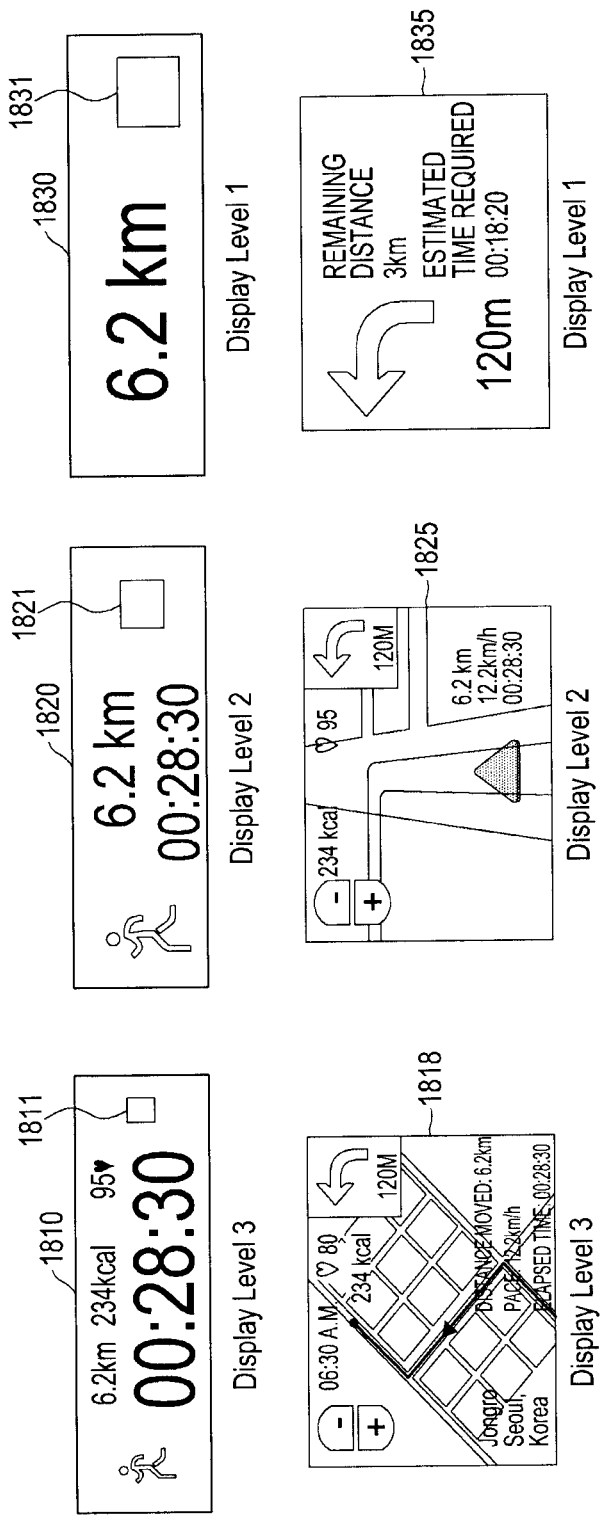

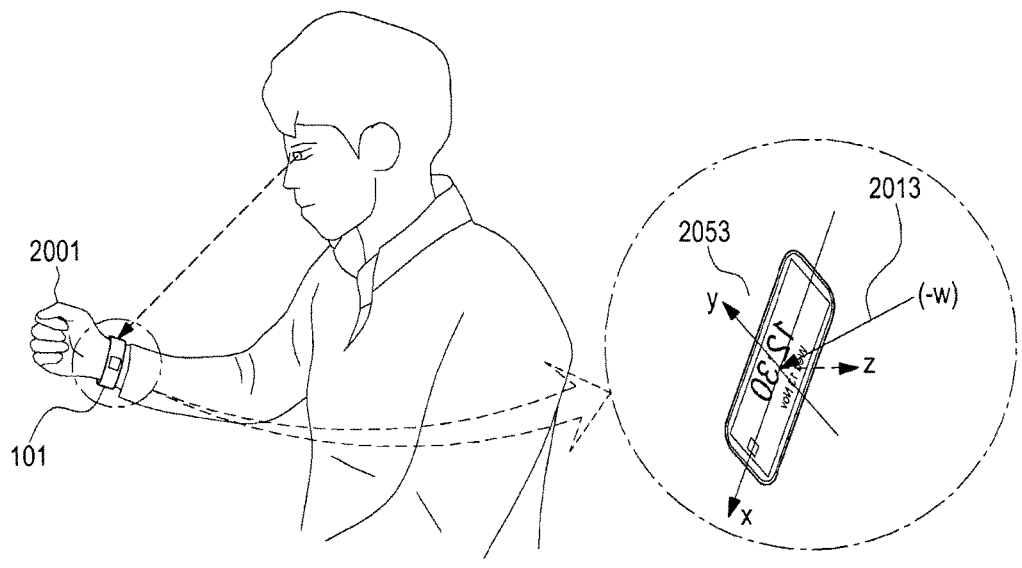
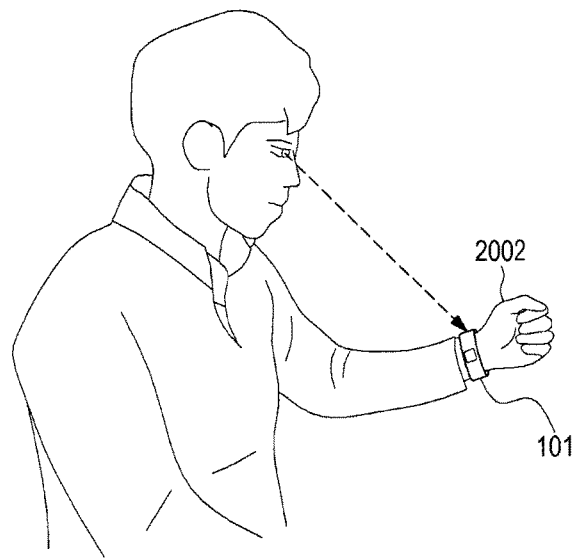
FIG.20C

METHOD FOR DISPLAYING CONTENT AND ELECTRONIC DEVICE THEREFOR

PRIORITY

This application is a National Phase Entry of PCT International Application No. PCT/KR2015/001666, which was filed on Feb. 17, 2015, and claims a priority to U.S. Patent Application No. 61/943,004, which was filed on Feb. 21, 2014, and claims a priority to Korean Patent Application No. 10-2014-0194289, which was filed on Dec. 30, 2014, the contents of which are incorporated herein by reference.

TECHNICAL FIELD

The present invention relates to electronic devices displaying contents.

BACKGROUND ART

Advancing information communication and semiconductor technologies accelerate the spread and use of various portable terminals. Recently, portable terminals go beyond their respective unique functions and converge with other portable devices. A representative example of such convergence is the mobile communication terminal that may offer various additional functions, such as those provided by a television (TV) (e.g., digital multimedia broadcasting (DMB) or digital video broadcasting (DVB)) and a music player (e.g., an MPEG audio layer-3 (MP3) player), a digital camera, or Internet access, as well as its normal functions including voice calling or text messaging.

Wearable electronic devices have been recently developed, which are a sort of portable terminals and have shapes such as wristwatches, headsets, or glasses allowing the user to wear on a portion of his body. A wearable device may operate standalone or may interwork with another portable terminal (host device) to operate as a companion device to provide at least some (e.g., calling, messaging, or streaming) of the functions of the portable terminal to the user.

DISCLOSURE

Technical Problems

As the wearable device is implemented to be placed over the user's body portion, its display is also placed over the user's body portion. As the user moves his wrist while wearing the wearable device or is on the move, the wearable device moves as well. For example, it is assumed that the wearable device is in the wrist watch type, and the user is running. While the user runs strenuously, it is not easy for the user to check the data, e.g., alarm, displayed on the display of the wearable device worn on the user's wrist. In particular, the wrist watch-type wearable device has inconsistency between the direction that data is displayed, i.e., the direction of the wrist, and the direction of the user's view, which renders it more difficult to check.

Accordingly, a goal of the present invention is to provide a method for displaying contents by an electronic device allowing the user to easily check contents depending on the state of the electronic device or the user's state and the electronic device.

Technical Solution

According to an embodiment of the present invention, a method for operating an electronic device may comprise determining movement information of the electronic device based on sensing data measured through a sensor module; determining bio information for a user by analyzing one or more bio signals; and controlling the electronic device according to the movement information and the bio information.

According to another embodiment of the present invention, a method for operating an electronic device may comprise determining whether a communication module is connected with an external device; and if the communication module is connected with the external device, controlling the electronic device based on a connection state for a connection between the electronic device and the external device.

According to still another embodiment of the present invention, a method for operating an electronic device may comprise performing one or more couplings with one or more external devices; determining movement information of the electronic device using a motion sensor; determining bio information for a user by analyzing one or more bio signals; determining a service providable from the electronic device to the user based on the movement information or the bio information; and providing the service to the user using the one or more external devices coupled with the electronic device.

According to yet still another embodiment of the present invention, a method for displaying content by an electronic device may comprise obtaining sensing data; determining a current state of a user based on the sensing data; determining a content to be displayed on a display based on the current state; and displaying the content on the display.

According to yet still another embodiment of the present invention, a method for displaying content by an electronic device may comprises obtaining sensing data for determining a direction of a screen; determining the direction of the screen based on the sensing data; determining a display direction of the content based on the direction of the screen; and displaying the content on the screen based on the display direction According to an embodiment of the present invention, an electronic device for displaying a content may comprise a display including a screen displaying the content; and a control module configured to: obtain sensing data, determine a user's current state based on the sensing data, determine a content to be displayed on the screen based on the current state, and control the display to display the content on the screen.

According to yet still another embodiment of the present invention, there is provided a machine readable storage medium recording a program for executing a method for displaying content by an electronic device, may comprise obtaining sensing data; determining a current state of a user based on the sensing data; determining a content to be displayed on a screen based on the current state; and displaying the content on the screen.

Advantageous Effects

According to the present invention, the display of contents may be controlled so that the user may easily check the contents depending on the state of the display included in the electronic device or the current state of the user using the electronic device.

BRIEF DESCRIPTION OF DRAWINGS

FIGS. 18A to 18C are views illustrating another example of a method of displaying content by an electronic device according to an embodiment of the present invention;

FIGS. 20A to 20D are views illustrating another example of a method of displaying content by an electronic device according to an embodiment of the present invention;

BEST MODE

Figure 1:
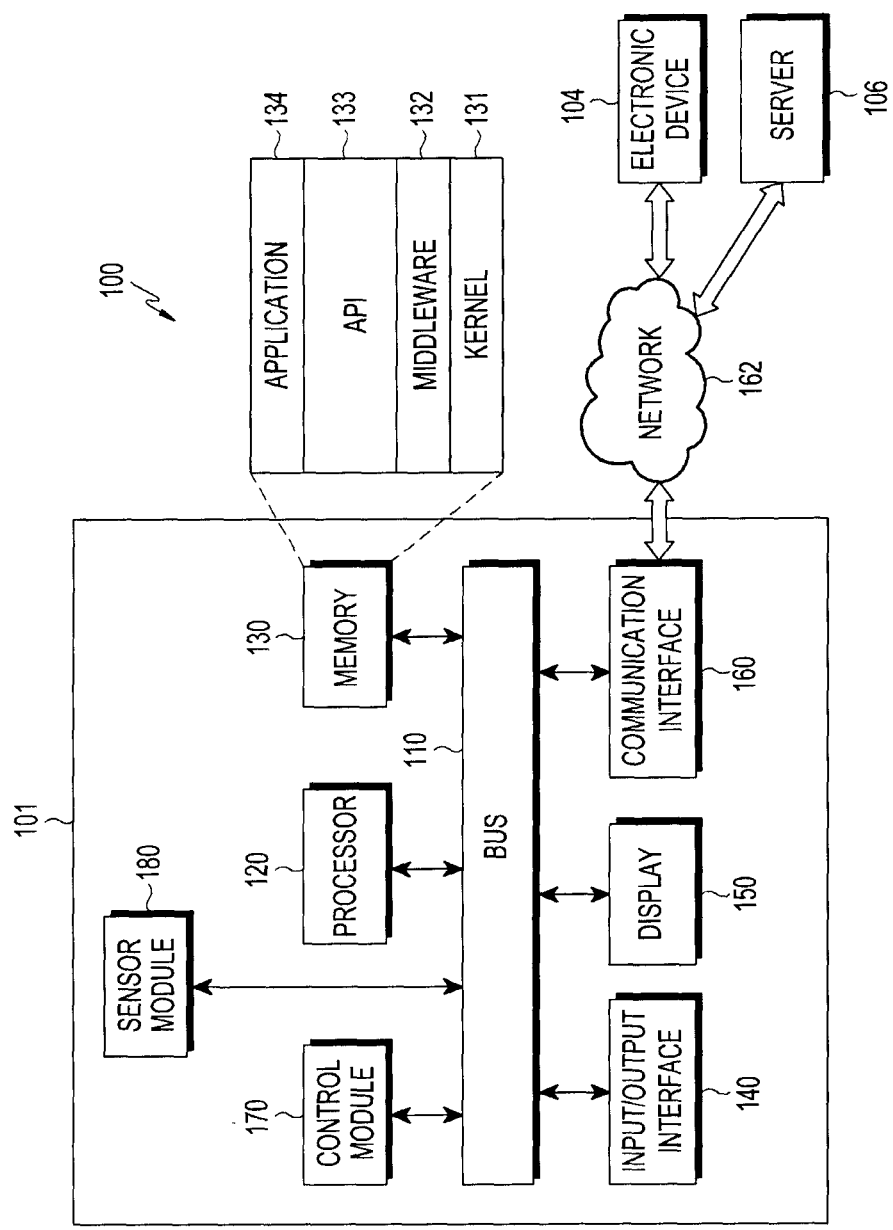
FIG. 1 is a view illustrating a network environment 100 including an electronic device according to an embodiment of the present invention.

Hereinafter, embodiments of the present invention are described with reference to the accompanying drawings. Various changes may be made to the present invention, and the present invention may come with a diversity of embodiments. Some embodiments of the present invention are shown and described in connection with the drawings. However, it should be appreciated that the present invention is not limited to the embodiments, and all changes and/or equivalents or replacements thereto also belong to the scope of the present invention. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have", when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A or B" may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the present invention.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present invention. It is to be understood that the singular forms "a", "an" and "the" include plural references unless the context clearly dictates otherwise.

Unless otherwise defined, all terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present invention, the electronic device may be a device including an exercise management function, such as sensing the health condition of the user using the electronic device to guide the user for an exercise schedule, progress of an exercise, or strength of an exercise. For example, the electronic device may include one or more of an acceleration sensor, a gyro sensor, a heart monitoring (HRM) sensor, or illumination sensor to grasp the user's exercise state. Such electronic device may be a wearable device, and the electronic device may be implemented in a wrist watch type, glasses type, head-mounted display (HMD) type, earphone type, necklace type, shoe type, waist belt type, ankle band type, or band type.

According to various embodiments of the present invention, an electronic device as disclosed herein may be a device with a communication function. Examples of the electronic device according to embodiments of the present invention may include at least one of a smartphone, a tablet personal computer (PC), a mobile phone, a video phone, an e-book reader, a desktop PC, a laptop computer, a netbook computer, a personal digital assistant (PDA), a portable multimedia player (PMP), an MP3 player, a mobile medical device, a camera, or a wearable device (e.g., a head-mounted device (HMD), such as smart glasses, electronic clothes, an electronic bracelet, an electronic necklace, an electronic appcessory, an electronic tattoo, or a smart watch).

According to an embodiment of the present invention, the electronic device may be a smart home appliance with a communication functionality. For example, examples of the smart home appliance may include, but is not limited to, a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to an embodiment of the present invention, examples of the electronic device may include, but is not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller machines (ATMs), or point of sales (POS) devices.

According to various embodiments, examples of the electronic device may at least one of part of a piece of furniture or building/structure with a communication functionality, an electronic board, an electronic signature input device, a projector, or various measurement devices (e.g., devices for measuring water, electricity, gas, or electromagnetic waves). According to an embodiment of the present invention, the electronic device may be one or a combination of the above-listed devices or appliances. According to an embodiment of the present invention, the electronic device may be a flexible device. According to an embodiment of the present invention, the electronic device is not limited to the above-listed devices or appliances.

Various embodiments of the present invention are now described with reference to the accompanying drawings. As used herein, the term "user" may denote a human or another device using the electronic device.

FIG. 1 illustrates a network environment 100 including an electronic device 101 according to an embodiment of the present invention.

Referring to FIG. 1, the electronic device 101 may include one or more of a bus 110, a processor 120, a memory 130, an input/output interface 140, a display 150, a communication interface 160, a control module 170, and a sensor module 180.

The bus 110 connects the other components to each other, and the bus 110 may carry communications (e.g., control messages) between the other components. For example, a control message generated from the processor 120 or the control module 170 may be transferred through the bus 110 to the display 150 or the communication interface 160.

The processor 120 may receive a command from other component (e.g., the memory 130, the input/output interface 140, the display 150, the communication interface 160, the control module 170, or the sensor module 180) through, e.g., the bus 110, may interpret the received command, and may execute computation or data processing according to the interpreted command.

The memory 130 may store a command or data received from other component (e.g., the input/output interface 140, the display 150, the communication interface 160, the control module 170, or the sensor module 180) or a command or data generated by the processor 120 or other component. The memory 130 may retain programming modules including, e.g., a kernel 131, middleware 132, an application programming interface (API) 133, or an application 134. The programming modules may be configured in software, firmware, hardware or a combination of two or more thereof.

The memory 130 may previously retain data to determine the direction of the display 150. Further, the memory 130 may store sensing data measured by one or more sensors included in the sensor module 180. The memory 130 may further store sensing data (e.g., moving speed, moving acceleration, moving direction or slope of the electronic device 101) measured by an acceleration sensor or gyro sensor included in the sensor module 180.

The memory 130 may store sensor values for determining the exercise the user is currently doing (e.g., walking, jogging, biking, swimming, badminton, tennis, soccer, baseball, or basketball). For example, the control module 170 may analyze the user's blood pressure, blood flow, heart rate, body temperature, respiratory rate, oxygen saturation, heart sound, respiratory sound, or blood sugar as measured for one minute, or the moving speed, acceleration, direction, or slope of the electronic device 101 to determine that the exercise the user is doing is jogging. Here, the user's blood pressure, blood flow, heart rate, body temperature, respiratory rate, oxygen saturation, heart sound, respiratory sound, or blood sugar as measured for one minute, or the moving speed, acceleration, direction, or slope of the electronic device 101 may be ones stored in the memory 130.

The memory 130 may store the type or schedule of exercise entered by the user through the input/output interface 140 or display 150. The memory 130 may store a blood pressure, blood flow, heart rate, body temperature, respiratory rate, oxygen saturation, heart sound, respiratory sound, and blood sugar previously entered by the user. Further, the type or schedule of the exercise whenever the user does the exercise and the blood pressure, blood flow, heart rate, body temperature, respiratory rate, oxygen saturation, heart sound, respiratory sound, and blood sugar while the user does exercise may be recorded in the memory 130 by the control module 170. Further, the sensing data measured by sensors included in the sensor module 180 may be recorded in the memory 130 by the control module 170.

The kernel 131 may control or manage system resources (e.g., the bus 110, the processor 120, or the memory 130) used to execute the operation or function implemented in the other programming modules, e.g., the middleware 132, the API 133 or the application 134. The kernel 131 may provide an interface that allows the middleware 132, the API 133, or the application 134 to access the individual components of the electronic device 101 to control or manage the same.

The middleware 132 may function as a relay to allow the API 133 or the application 134 to communicate data with the kernel 131. A plurality of applications 134 may be provided. The middleware 132 may control work requests received from the applications 134, e.g., by allocation the priority of using the system resources of the electronic device 101 (e.g., the bus 110, the processor 120, or the memory 130) to at least one of the plurality of applications 334.

The API 133 is an interface allowing the application 134 to control functions provided from the kernel 131 or the middleware 132. For example, the API 133 may include at least one interface or function (e.g., a command) for filing control, window control, image processing or text control.

According to an embodiment of the present invention, there may be provided a plurality of applications 134 including an SMS/MMS application, an email application, a calendar application, an alarm application, an SNS application, a messenger application, a multimedia application, a health-care application (e.g., an application for measuring exercise amount or blood sugar), or an environmental information application (e.g., an application providing atmospheric pressure, moisture, or temperature information). Additionally or alternatively, the application 134 may be an application related to information exchange between the electronic device 101 and an external electronic device (e.g., electronic device 104). Examples of the information exchange-related application may include, but is not limited to, a notification relay application for transferring specific information to the external electronic device, or a device management application for managing the external electronic device.

For example, the notification relay application may include a function for relaying notification information generated from other applications of the electronic device 101 (e.g., the SMS/MMS application, email application, SNS application, messenger application, multimedia application, health-care application, or environmental information application) to the external electronic device (e.g., the electronic device 104). Additionally or optionally, the notification relay application may receive notification information from, e.g., the external electronic device (e.g., the electronic device 104) and may provide the received notification information to the user. The device management application may perform at least some functions of the external electronic device (e.g., the electronic device 104) communicating with the electronic device 104 (for example, powering on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present invention, the application 134 may include an application designated depending on the attribute (e.g., type of electronic device) of the external electronic device (e.g., the electronic device 104). For example, in case the external electronic device is an MPEG audio layer-3 (MP3) player, the application 134 may include an application related to playing music. Similarly, in case the external electronic device is a mobile medical device, the application 134 may include an application related to health-care. According to an embodiment of the present invention, the application 134 may include an application designated to the electronic device 101 or an application received from an external electronic device (e.g., a server 106 or the electronic device 104).

The input/output interface 140 may transfer commands or data input by the user through an input/output device (e.g., a sensor, keyboard or touchscreen) to the processor 120, the storage unit 130, the communication interface 160, the control module 170, or the sensor module 180 through, e.g., the bus 110. For example, the input/output interface 140 may provide data regarding the user's touch input through a touchscreen to the processor 120. The input/output interface 140 may output, through the input/output device (e.g., a speaker or display), commands or data received from the processor 120, the memory 130, the communication interface 160, or the display module 170 through, e.g., the bus 110. For example, the input/output interface 140 may output voice data processed by the processor 120 to the user through a speaker. The input/output interface 140 may receive a user input for displaying contents (e.g., text, images, or video) on the display 150.

The display 150 may display various types of information (e.g., multimedia data or text data) to the user. Further, the display 150 may be implemented as, e.g., a touchscreen, to operate as the input/output interface 140 receiving a touch input or hovering input from the user.

The display 150 may be implemented in a form including a screen or touchscreen. The screen or touchscreen may indicate a surface of the display 150 where one or more contents are displayed.

The communication interface 160 may interface communication between the electronic device 101 and an external electronic device (e.g., the electronic device 104 or the server 106). For example, the communication interface 160 may be wiredly or wirelessly connected with the network 162 to communicate with the external electronic device. The wireless connection may be made by various radio communication protocols, including, but not limited to, wireless fidelity (Wi-Fi), Bluetooth (BT), ZigBee, near field communication (NFC), global positioning system (GPS), or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The wired connection may be made by various wired communication protocols, including, but not limited to, universal serial bus (USB), high definition multimedia interface (HDMI), recommended standard 232 (RS-232), or plain old telephone service (POTS).

According to an embodiment of the present invention, the network 162 may be a communication network. The telecommunication network may include at least one of a computer network, the Internet, an Internet of things (IoT) network, or a telephone network. According to an embodiment of the present invention, protocols for communication between the electronic device 101 and the external electronic device (examples of such protocols include, but not limited to, transport layer protocol, data link layer protocol, or physical layer protocol) may be supported by the application 134, the API 133, the middleware 132, the kernel 131, or the communication interface 160.

The control module 170 may process at least part of information obtained from other elements (e.g., at least one of the processor 120, the memory 130, the input/output interface 140, the communication interface 160, or the sensor module 180) and may provide the same to the user in various manners. For example, the control module 170 may control at least some functions of the electronic device 101 using the processor 120 or independently from the processor 120 so that the electronic device 101 may interwork with other electronic device (e.g., the electronic device 104 or the server 106).

The control module 170 may control the sensor module 180 to measure the moving speed, acceleration, direction, or slope of the electronic device 101 by performing sensing or measure the user's blood pressure, heart rate, respiratory rate, oxygen saturation, heart sound, respiratory sound, calorie consumption, electromyogram (EMG), or electrocardiogram (ECG).

The control module 170 may determine the direction of the display 150 using at least one of the sensing data obtained by the sensor module 180, e.g., the current location, moving speed, acceleration, direction, or slope of the electronic device 101 as measured by one or more sensors.

In case the electronic device 101 is implemented as a wearable device (e.g., a smart watch), the size or resolution of the screen included in the display 150 of the electronic device 101 may be restricted. Further, in case it is implemented as a wearable device, the electronic device 101 may be worn on a body portion involving lots of movement, and thus, the control module 170 may control the electronic device 101 to provide various types of user interfaces depending on the movement of the user. Accordingly, the electronic device 101 may be put in more availability.

According to an embodiment of the present invention, the electronic device 101 may change the text, figures, or diagrams displayed on the screen of the display 150, such as the home screen or application screen, depending on the speed of exercise the user does, type of exercise action, or strength and the location of the electronic device 101 and provide to the user. For example, it is assumed that the user is swimming. Since swimming has its unique pattern depending on the style, the electronic device 101 may sense the movement pattern and provide contents proper for swimming to the user through the display 150. For example, it is assumed that the user is running. The electronic device 101 may sense the moving distance of the user wearing the electronic device 101 or the movement of his arms to figure out that the user's exercise is running. As above, the electronic device 101 may determine the exercise the user is doing by analyzing the movement pattern of the user.

According to another embodiment, the electronic device 101 may receive entry of the type of the exercise from the user before or while the user does the exercise. Also in this case, the control module 170 may provide contents as per the entered type of exercise to the user through the display 150.

The control module 170 may determine the user's state using at least one of the sensing data obtained by the sensor module 180, e.g., the user's blood pressure, heart rate, respiratory rate, oxygen saturation, heart sound, respiratory sound, calorie consumption, EMG, or ECG. For example, the control module 170 may determine that the user is moving or exercising by analyzing the sensing data. For example, if the heart rate of the user as measured through the HRM sensor included in the sensor module 180 is 100 count or more, the control module 170 may determine that the user is exercising. For example, if the heart rate of the user as measured by the HRM sensor is 100 count to 120 count, the control module 170 may determine that the strength of exercise of the user is weak, if 121 count to 140 count, medium, and if 141 count to 170 count, the strength of exercise is strong.

For example, it is assumed that the user exercises for 30 minutes. Further, the user's exercise session, 30 minutes, is divided into three stages, and it is assumed that 00,00,00 to 00,10,00 indicates the initial term of the exercise (first stage), 00,10,01 to 00,20,00 the intermediate term (second stage), and 00,20,01 to 00,30,00 the final term (third stage). The control module 170 may determine that the progress of the user's exercise is the initial term, intermediate term, or final term of the exercise over time from the time when the user starts the exercise to the current time.

According to an embodiment, the control module 170 may determine at least one of the type, progress, or strength of the exercise the user is doing based on at least one of the sensing data obtained by the sensor module 180, e.g., the user's blood pressure, heart rate, respiratory rate, oxygen saturation, heart sound, respiratory sound, calorie consumption, EMG, or ECG. For example, it is assumed that the user continuously did jogging 30 minutes all the week. The memory 130 may store, under the control of the control module 170, all of the sensing data recorded while the user was jogging over the past week, e.g., sensing data received from the sensor module 180 right before the user started jogging, sensing data received from the sensor module 180 while user was jogging, or sensing data received from the sensor module 180 right after the user did jogging. That is, the memory 130 may accrue the sensing data received from the sensor module 180. The sensing data may be stored in another separate device (e.g., the electronic device 104 or server over the network (e.g., the server 106)) as well as the memory 130 of the electronic device 101. According to an embodiment, in case the other device or server stores sensing data previously obtained, sensing data newly obtained may be transferred to the devices and updated.

Further, the control module 170 may determine the type, progress, and strength of the exercise the user is doing based on the sensing data accrued in the memory 130. For example, it is assumed that the user is jogging. If the sensing data indicating the state of the user doing jogging (e.g., blood pressure, heart rate, respiratory rate, oxygen saturation, heart sound, respiratory sound, calorie consumption, EMG, ECG, acceleration, angular speed, and change in location) is similar to the sensing data when the user is jogging among the sensing data accrued in the memory 130 (e.g., the same by 70% or more), the control module 170 may determine that the user is now jogging. According to an embodiment, the control module 170 may determine the sensing data for use in determining the similarity of sensing data. For example, assuming that there are a total of 10 types of sensing data, the control module 170 may determine the type, progress, and strength of exercise the user is doing using seven of the ten types of sensing data.

The control module 170 may control the electronic device 101 based on one or more of the type, progress, strength of the exercise, and the user's state. The control module 170 may control the electronic device 101 so that the contents (e.g., current time, temperature, weather, exercise time, exercise strength, heart rate, blood pressure, respiratory rate, or oxygen saturation) displayed on the screen of the display 150 is varied based on one or more of the type, progress, and strength of the exercise. For example, in case the strength of exercise is weak, the control module 170 may control the display 150 to display six types of data including current time, temperature, weather, exercise time, heart rate, and blood pressure, and in case the strength of exercise of the user is strong, the control module 170 may vary the data displayed on the screen of the display 150 so that only three types of data including exercise time, heart rate, and blood pressure are displayed. The control module 170 may also vary the size, color, direction, and duration of display of the contents as well as the type of contents displayed on the screen of the display 150.

According to another embodiment, the control module 170 may restrict the operation of the electronic device 101 based on at least one of the type, progress, strength of the exercise and the user's state. For example, in case the user's exercise strength is weak, and an incoming call is received, the control module 170 may control the display 150 to notify the incoming call, i.e., to notify that the call is being received. The user may notice the incoming call notification displayed on the screen of the display 150 and accordingly conduct the call. However, in case the user's exercise strength is strong, although the incoming call is received, the control module 170 may control the display 150 not to display the incoming call notification. Since the incoming call notification is not displayed, the user may not be aware that the incoming call is being received. By controlling the electronic device 101 not to display the incoming call notification as above, the control module 170 may avoid the user from conducting call during exercise or from stopping exercise for conducting call. Further, the control module 170 may notify the user that the incoming call has been received by displaying the incoming call notification (missed call notification) after the user's exercise is terminated.

For example, it is assumed that the electronic device 101 supports a music player function, and the user runs the music player to listen to music. If the user's exercise strength is strong, the control module 170 may control the electronic device 101 so that the user may adjust all of the functions of the music player (playback, pause, rewind, fast forward, A-B repeat, volume adjustment, etc.). Further, if the user's exercise strength is weak, the control module 170 may control the electronic device 101, e.g., so that all of the respective corresponding buttons of the functions of the music player are displayed on the screen of the display 150, and the music player is run by the respective user inputs of the buttons.

However, if the user's exercise strength is strong, e.g., if the strength is not less than a preset level, the control module 170 may control the electronic device 101 so that the user may adjust only volume adjustment among all of the functions of the music player (playback, pause, rewind, fast forward, A-B repeat, volume adjustment, etc.). For example, the control module 170 may control the display 150 so that, among the respective corresponding buttons of the functions of the music player, only buttons corresponding to the volume adjustment are displayed on the screen of the display 150.

Additional information on the control module 170 is provided through FIGS. 2 to 5 described below. Although FIG. 1 illustrates that the processor 120 and the control module 170 are included in the electronic device 101 as separate components, the processor 120 may be implemented in the form including the control module 170 and may perform all the operations as run by the control module 170.

The sensor module 180 may measure a sensor value or may sense the operation state of the electronic device 101 and convert the measured or sensed information into an electrical signal. The sensor module 180 may measure, e.g., the moving speed, acceleration, direction, or slope of the electronic device 101. To that end, the sensor module 180 may be implemented in the form including an acceleration sensor or gyro sensor.

According to an embodiment, the sensor module 180 may measure the user's bio signals (e.g., the user's blood pressure, blood flow, heart rate, body temperature, respiratory rate, oxygen saturation, heart sound, respiratory sound, calorie consumption, EMG, or ECG). To that end, the sensor module 180 may be implemented in the form further including one or more of an E-nose sensor, an electromyography (EMG) sensor, an electroencephalogram (EEG) sensor, an electrocardiogram (ECG) sensor, an infrared (IR) sensor, an iris sensor, or a finger print sensor which is not shown in the drawings. Further, the sensor module 180 may include a heart rate variability (HRV) sensor, and the HRV sensor may sense the user's pulse wave signal. The HRV sensor may sense the pulse wave signal to compute the user's mean heart rate or heart rate distribution.

The sensor module 180 including at least one of the above-described sensors may further include a control circuit for controlling at least one or more of the sensors included in the sensing module.

One or more sensors included in the sensor module 180 may gather or measure, from the user as raw data, one or more bio signals, such as the blood pressure, blood flow, heart rate, FIRM, HRV, body temperature, respiratory rate, oxygen saturation, heart sound, respiratory sound, blood sugar, waste measure, height, body fat amount, calorie consumption, brain wave, voice, skin resistance, EMG, ECG, gait, ultrasound wave, sleeping state, and facial expression of the user using the electronic device 101. The control module 170 may analyze the raw data to determine the bio characteristic information on the user using the electronic device 101. For example, the control module 170 may determine the user's mean heart rate or heart rate distribution by analyzing the pulse wave signal obtained through the HRV sensor. At this time, the pulse wave signal may correspond to the raw data, and the control module 170 may compute the user's mean heart rate or heart rate distribution using the pulse wave signals gathered through the HRV sensor.

The sensor module 180 may include noninvasive measuring sensors, such as ultrasonic noninvasive blood sugar measurers using Raman spectroscopy. Further, the sensor module 180 may include, e.g., a cholesterol measuring device capable of simply measuring cholesterol.

According to an embodiment, the sensor module 180 may include an ECG sensor. The ECG sensor may sense a pattern signal of the active current of the heart. The ECG sensor may come in current ECG meter and voltage ECG meter depending on signal detection schemes, and this may be implemented in such a form that a plurality of ECG electrodes are attached to a side of the electronic device 101 or a portable ECG monitoring device called portable EM (PEM). The ECG waveform measured by the ECG sensor may include P, Q, R, S, and T waves, and among them, the R wave corresponds to a peak signal. The heart rate may be measured through the number of R wave signals generated per unit time.

The ECG sensor may check the heart rate in the HRV manner. The HRV is a scheme measuring variations in time interval between R waves, peak signals, and this enables analysis of activity of the autonomic nerve from a tiny variation between heart beats and thus allows the control module 170 to predict the user's various body states. The control module 170 may obtain information for computing the user's stress level in relation with the user's sympathetic nerve and parasympathetic nerve using the ECG sensor included in the sensor module 180.

For example, the healthy show a high and complicated HRV through the ECG sensor, but under disease or heavy stress, the HRV variation complexity is shown to be significantly reduced. The ECG sensor may sense the HRV variation as above and provide data necessary for the control module 170 to compute the user's stress level.

According to an embodiment, the sensor module 180 may include a heart rate sensor. The heart rate sensor includes a hear rate monitor (HRM) sensor capable of measuring a heart rate per unit time and a sensor capable of measuring a hear rate variability (HRV) which is a variation in time interval between heart beats. As a sort of heart rate sensor, the photo plethysmography (PPG) sensor may be used to measure a variation in the amount of blood in the user's blood vessels or oxygen saturation by measuring a variation in the volume of blood vessels in the peripheral blood vessels that occurs while the heart repeats contraction and relaxation.

As the electronic device 101 implemented as a wearable device is attached or contacts the user's ear, wrist, carotid, finger, or ankle, the heart rate sensor in the electronic device 101 may measure the user's heart rate. Further, it may measure the user's heart rate using a contactless scheme, such as a camera or infrared (IR). The heart rate measured by the heart rate sensor may show different values depending on the user's age, health condition, or emotional state. The heart rate pattern may also vary depending on the user's age, health condition, or emotional state. Accordingly, the control module 170 may compute the user's blood vessel elasticity and determine the user's aging degree of blood vessels by analyzing the heart rate pattern or heart rate measured by the heart rate sensor. As described above, the control module 170 may determine the user's current state by determining the user's blood vessel elasticity or blood vessel aging degree.

According to an embodiment, the sensor module 180 may include an oxygen saturation sensor. The oxygen saturation sensor may measure the ratio of hemoglobin saturated oxygen relative to the overall hemoglobin. The control module 170 may compute the calorie consumption by the user's exercise, particularly through the oxygen saturation sensor. Further, the oxygen saturation sensor may be used to detect dangerous situation that the user may encounter, e.g., dyspnea, consciousness disturbance, shock, lung disease, e.g., acute respiratory distress syndrome (ARDS), hypoxia at an alpine district, gas poisoning, or suffocation.

According to an embodiment, the sensor module 180 may include a sleep sensor. The sleep sensor measures the user's sleeping state, and this may include one or more of an acceleration sensor, gyro sensor, pulse wave measuring sensor, respiratory rate measuring sensor, and a blood pressure measuring sensor.

According to an embodiment, the sensor module 180 may include a step counter, and the step counter includes an acceleration sensor or gyro sensor and it may thus measure the user's step count and estimate the user's calorie consumption based on the step count. Further, the step counter may compute the user's moving distance using the GPS or indoor positioning technique.

According to another embodiment, the sensor module 180 may be implemented in the form of being included outside the electronic device 101. For example, the sensor module 180 may be implemented in the form of being included in the electronic device 104. Here, the user may wear the electronic device 104 on, and the electronic device 104 may transmit sensing data to the electronic device 101 that is not worn by the user. The control module 170 of the electronic device 101 may receive sensing data from the electronic device 104 through the communication interface 160 and may determine the type, progress, strength of the exercise the user carrying the electronic device 104 or the current state of the user. Further, the control module 170 may determine the type of content to be displayed on the screen of the display 150 or the way of displaying the content depending on the type, progress, strength of the exercise or the user's current state, e.g., heart rate.

Figure 23:
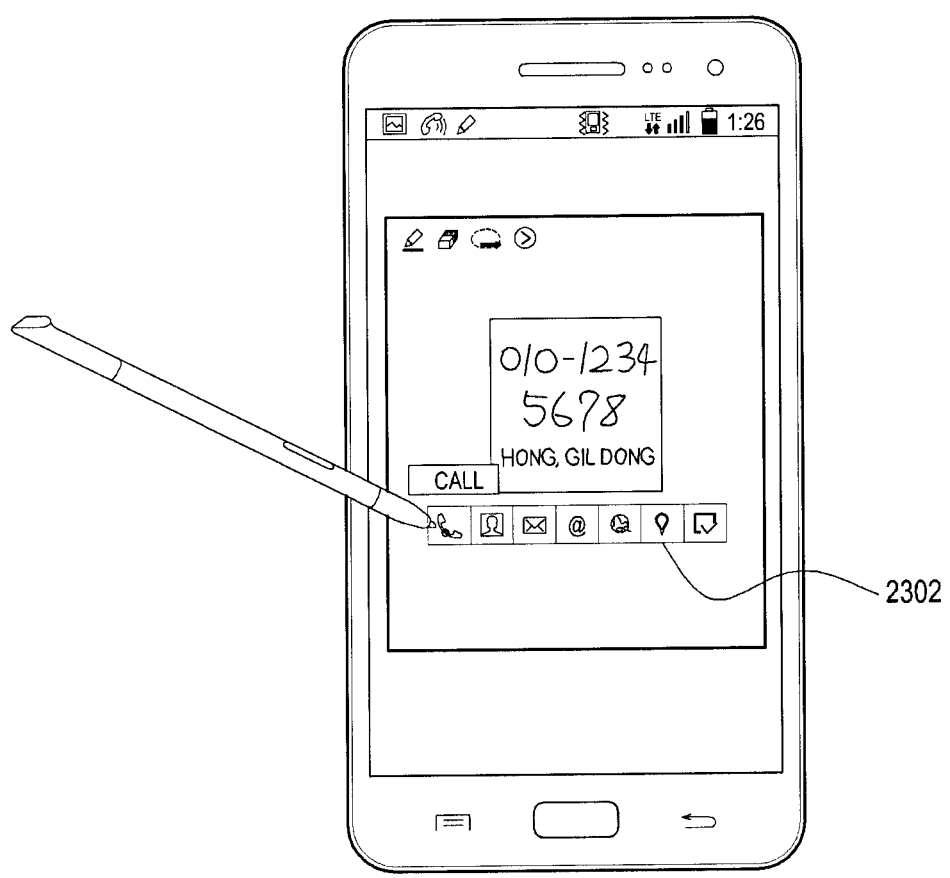
FIG. 23 is a view illustrating another example of a method of displaying content by an electronic device according to an embodiment of the present invention.

According to an embodiment, the electronic device 101, as a host device, and the electronic device 104, as a companion device, may interwork together through wireless communication or wired communication. The electronic device 101 operating as the host device may include the control module 170 and may receive sensing data from the electronic device 104 operating as the companion device and determine the direction of the screen included in the companion device based on the sensing device. Further, the control module 170 of the electronic device 101 may control the companion device to display contents depending on the screen direction of the electronic device 104. FIG. 23 illustrates an example in which the electronic device 101, as the host device, interworks with the electronic device 104 which is the companion device. FIG. 23 is described below in greater detail.

The control module 170 may generate control signals according to the operation of the electronic devices 101 and 104. Further, the control module 170 may transmit the control signal to the electronic device 104 through the communication interface 160. The electronic devices 101 and 104 may perform the respective operations of the control signals. At this time, the operation of the electronic device 104 determined by the control module 170 may be the same or similar to operations performed on the electronic device 101.

For example, in case the user's exercise strength is weak, and an incoming call is received, the control module 170 may perform control to transfer an incoming call notification from the electronic device 101 to the electronic device 104. However, if the user's exercise strength is medium or stronger, the control module 170 may control the electronic device 101 to abstain from transferring the incoming call notification to the electronic device 104.

For example, it is assumed that the electronic device 104 supports a music player function, and the user carrying the electronic device 104 runs the music player to listen to music. If the user's exercise strength is strong, the control module 170 may control the electronic device 104 so that the respective corresponding buttons of all the functions of the music player are displayed on the screen. On the contrary, if the user's exercise strength is strong, the control module 170 may control the electronic device 104 so that, among the respective corresponding buttons of the functions of the music player, only buttons corresponding to the volume adjustment are displayed on the screen in order to allow the user to use only the volume adjustment among the functions of the music player.

Figure 2:
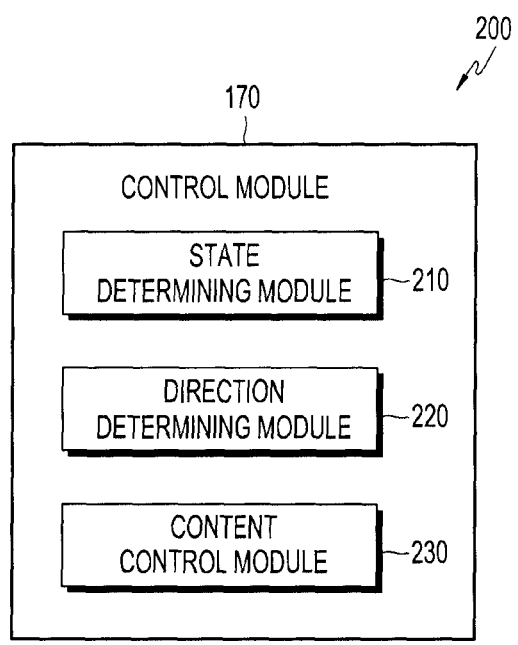
FIG. 2 is a view illustrating an electronic device (e.g., a block diagram of a control module of the electronic device) according to an embodiment of the present invention.

FIG. 2 is a block diagram 200 illustrating a control module 170 of an electronic device (e.g., the electronic device 101) according to an embodiment of the present invention.

Referring to FIG. 2, the control module 170 may include a state determining module 210, a direction determining module 220, and a content control module 230.

The state determining module 210 may determine the current state of the user (hereinafter, "user state") who uses the electronic device 101 based on sensing data gathered from one or more sensors (e.g., the acceleration sensor, gyro sensor, or HRV sensor) included in the sensor module 180. For example, if the user's heart rate measured by the HRV sensor is 85 to 130, the state determining module 210 may determine that the user is doing exercise.

The user state determined by the state determining module 210 may include the type of exercise being done by the user, the progress state of the exercise, the strength of the exercise, and the user's health condition. According to an embodiment of the present invention, the electronic device 101 may previously receive body information, such as the user's age, height, or weight, from the user in order to more exactly grasp the user state.

According to an embodiment of the present invention, the state determining module 210 may determine a stress level for the user. For example, it is assumed that when the user's heart rate is 70 to 90, it is normal. The state determining module 210 may determine that the stress level for the user is low if the user's heart rate is 91 to 100, that the stress level for the user is medium if the heart rate is 101 to 115, and that the stress level for the user is high if the heart rate is 116 or more. Further, in case the stress level departs from a preset value range, the state determining module 210 may control the display 150 to display a stop exercise alarm so that the user may stop the exercise he is now doing. For example, also in case the stress level for the user corresponds to medium or high among high, medium, and low, the control module 170 may control the display 150 to display the stop exercise alarm so that the user may stop the exercise he is now doing.

The direction determining module 220 may determine the direction of the display 150, particularly, the screen displaying contents, by analyzing signals, i.e., sensing signals, gathered from one or more sensors (e.g., acceleration sensor or gyro sensor) included in the sensor module 180.

The direction determining module 220 may compute the rotation direction of the screen. For example, if the electronic device 101 is of wrist watch type, the screen displaying one or more contents may be in the state of having turned 30 degrees with respect to the center of the user's left wrist.

The content control module 230 may determine the display direction of the contents displayed on the screen based on the screen direction determined by the direction determining module 220. For example, if the content displayed on the screen is text, the content control module 230 may determine that the text is displayed horizontally or vertically depending on the direction of the screen. That is, the content control module 230 may control the display 150 so that the text is outputted from left to right or from top to bottom.

According to an embodiment of the present invention, the content control module 230 may control the display 150 so that two or more contents displayed on one screen are outputted in different directions. For example, it is assumed that first text, second text, and an image are displayed on the screen. The content control module 230 may determine that the first text and image are displayed from left to right on the screen and that the second text is displayed from top to bottom on the screen.

The content control module 230 may determine the manner of displaying the outputted contents based on the user state determined by the state determining module 210. For example, in case the user's movement is strenuous (e.g., in case the user does high-movement intensity exercise), the state determining module 210 may restrict the number of contents displayed through the display 150 or the size of each content. Further, the state determining module 210 may allow the user to easily identify the contents by increasing the size of the content. For example, in case the user's movement is not strenuous, such as when the user abstains from doing exercise or take a light walk, the state determining module 210 may not restrict the number of contents displayed through the display 150. Further, the state determining module 210 may control the display 150 to reduce the size of the content and display a plurality of contents on the same screen or may control the display 150 so that the screens including a plurality of contents may be sequentially displayed.

According to an embodiment of the present invention, an electronic device for displaying a content may comprise a display including a screen displaying the content; and a control module configured to: obtain sensing data, determine a user's current state based on the sensing data, determine a content to be displayed on the screen based on the current state, and control the display to display the content on the screen.

Figure 3:
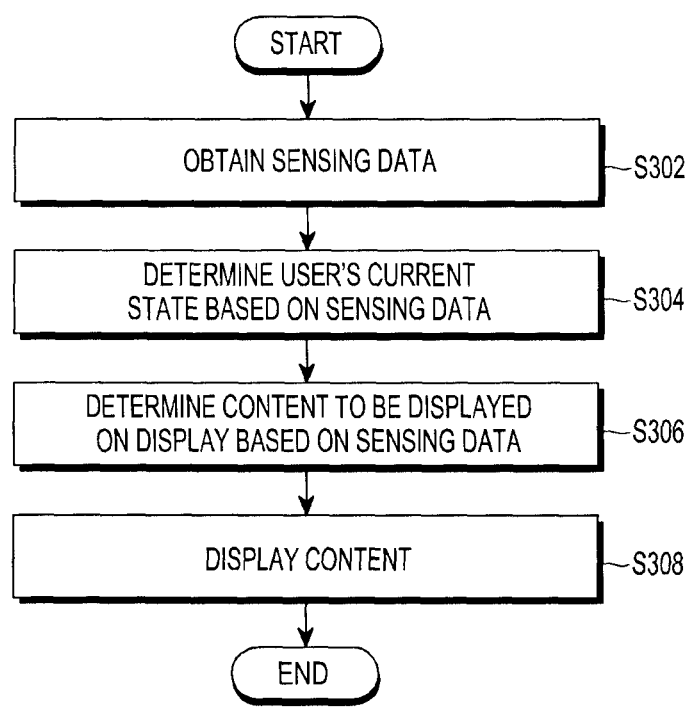
FIG. 3 is a flowchart illustrating an example of a method of displaying content by an electronic device according to an embodiment of the present invention.

FIG. 3 is a flowchart illustrating an example of a method of displaying content by an electronic device according to an embodiment of the present invention.

Referring to FIG. 3, the sensor module 180 may gather sensing data under the control of the control module 170 (S302). The sensing data may include various sensor values measured by the sensor module 180 (e.g., the user's blood pressure, heart rate, body temperature, respiratory rate, oxygen saturation, heart sound, respiratory sound, or blood sugar).

The control module 170 of the electronic device 101 may determine the user's current state based on the sensing data (S304). The user's current state may be whether the user does exercise, and if so, the type of the exercise, the progress state of the exercise, the strength of the exercise, and the user's health condition.

If the user's current state is determined in step S304, the content control module 230 may determine a content to be displayed on the screen of the display 150 based on the user's current state (S306). For example, if the user's exercise strength is high, the content control module 230 may determine the current time and calorie consumption as the content to be displayed on the screen. By contrast, if the exercise strength is low, the content control module 230 may determine the current time, exercise duration, calorie consumption, heart rate, and blood pressure as the content to be displayed on the screen and may determine to display more contents than when the exercise strength is medium.

The display 150 may display the content determined by the content control module 230 in step S306 on the screen (S308).

Figure 4:
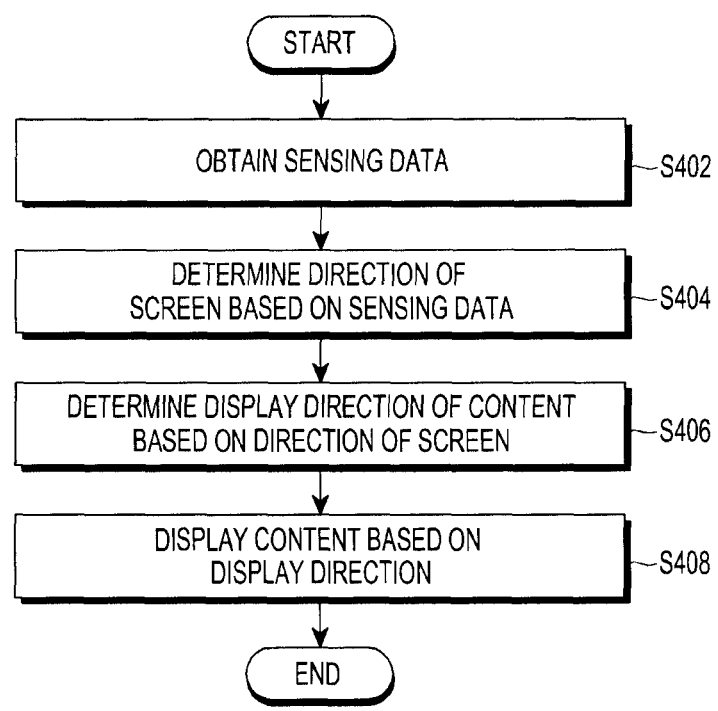
FIG. 4 is a flowchart illustrating another example of a method of displaying content by an electronic device according to an embodiment of the present invention.

FIG. 4 is a flowchart illustrating an example of a method of displaying content by an electronic device according to an embodiment of the present invention.

Referring to FIG. 4, the sensor module 180 may gather sensing data under the control of the control module 170 (S402). The sensing data may include various sensor values measured by the sensor module 180 (e.g., the speed, acceleration, slope, or GPS coordinates of the electronic device 101).

The control module 170 of the electronic device 101 may determine the direction of the screen of the display 150 based on the sensing data (S404). Here, the direction of the screen may be the direction in which light is emitted from a LCD when the screen is assumed to be implemented as the LCD. For example, under the assumption that the electronic device 101 is implemented in a circular wrist watch type, the direction determining module 220 may determine a variation in the orientated direction varied by the movement (e.g., a tilt of the electronic device 101 worn on the wrist) and the oriented direction of the screen using sensing data (e.g., the moving speed, moving acceleration, moving direction, or slope of the electronic device 101) measured by the acceleration sensor or gyro sensor of the electronic device 101 in step S404.

If the direction of the screen is determined in step S404, the content control module 230 may determine the display direction of the content based on the direction of the screen (S406). For example, the content control module 230 may determine that the text displayed on the screen is displayed in the horizontal or vertical direction.

The display 150 may display one or more contents on the screen based on the display direction of the screen determined in step S406 (S408).

Although it is described in connection with FIG. 4 that the direction of the screen indicates the direction in which the screen faces, the direction in which the screen may be a direction (orientation) in which the contents displayed on the screen are sorted. For example, it is assumed that the screen is implemented as a rectangular LCD. The direction of the screen may be a sorted direction of the contents displayed on the rectangular LCD (e.g., from left to right or from top to bottom). According to an embodiment of the present invention, the content control module 230 may determine the direction of the user's view or user's arm movement and determine the angle at which the screen turns with respect to the view direction based on the user's arm movement or user's view direction. For example, the content control module 230 may determine which one of the landscape mode and portrait mode the electronic device 101 is positioned closer to.

Figure 5:
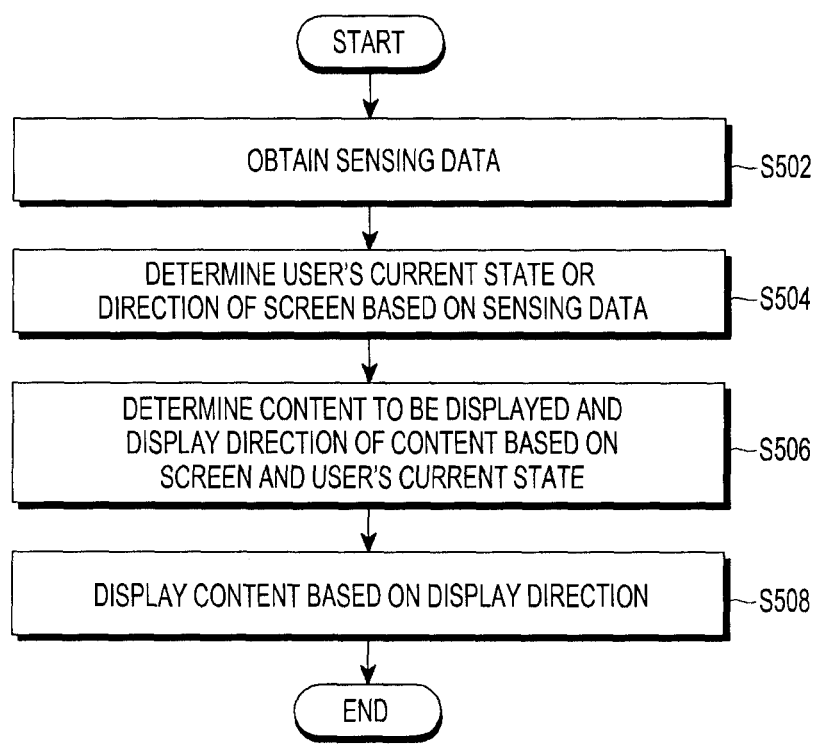
FIG. 5 is a flowchart illustrating another example of a method of displaying content by an electronic device according to an embodiment of the present invention.

FIG. 5 is a flowchart illustrating another example of a method of displaying content by an electronic device according to an embodiment of the present invention.

Referring to FIG. 5, the sensor module 180 may gather sensing data under the control of the control module 170 (S502). Here, the sensing data generated by the sensor module 180 may include one or more of the moving speed, moving acceleration, moving direction, or slope of the electronic device 101, and the sensing data may also include one or more of the user's blood pressure, heart rate, respiratory rate, oxygen saturation, calorie consumption, ECG, and EMG.

The control module 170 of the electronic device 101 may determine the user's current state or the direction of the screen of the display 150 based on the sensing data (S504). Here, the direction of the screen may be the direction in which light is emitted from a LCD when the screen is assumed to be implemented as the LCD. For example, if it is assumed that the electronic device 101 is implemented in a circular wrist watch-type, the direction determining module 220 may determine that the direction of the screen is in the state of having turned 30 degrees clockwise with respect to the center of the user's left wrist in step S504. The user's current state determined by the control module 170 in step S506 may be, e.g., the state in which the user wearing the electronic device 101 implemented as a wearable device is doing exercise (e.g., walking, jogging, or swimming).

If the user's current state or direction of screen is determined in step S504, the content control module 230 may determine the content to be displayed on the screen and the display direction of the content based on the user's current state and the direction of the screen (S506). For example, it is assumed that the content to be displayed on the screen is text saying "Message from Jim" and the font size of the characters in the text is the same. The content control module 230 may control the display 150 to display the text in the horizontal or vertical direction according to the direction of the screen. Further, if the user's state is determined to be in the state of doing exercise, the content control module 230 may perform control so that "Message from" and "Jim" in the text are different in output size from each other. According to an embodiment of the present invention, the control module 170 may process the text "Message from Jim" having the same font size to reduce the font size of "Message from" while increasing the font size "Jim". At this time, the font color of "Jim" may be different from the color of the other text for distinction.

The display 150 may display contents on the screen based on the display direction determined in step S506 (S508).

Figure 6:
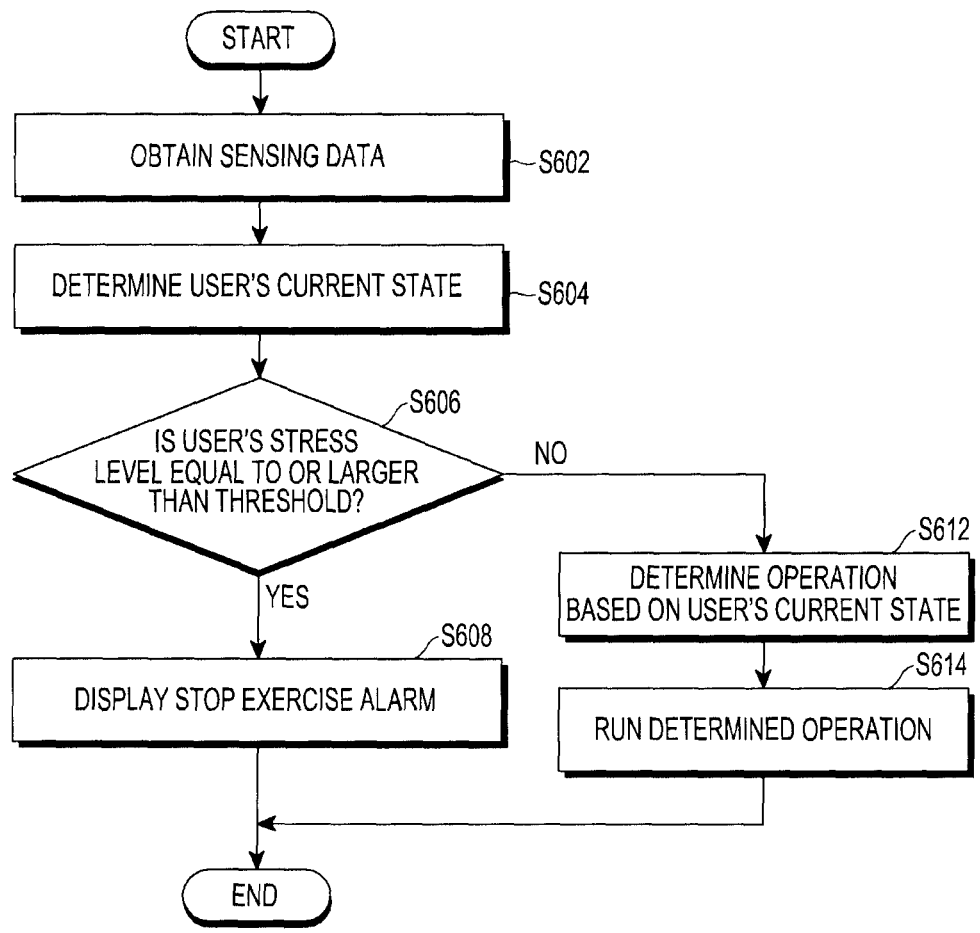
FIG. 6 is a flowchart illustrating another example of a method of displaying content by an electronic device according to an embodiment of the present invention.

FIG. 6 is a flowchart illustrating another example of a method for displaying content by an electronic device according to an embodiment of the present invention. In FIG. 6, the user is assumed to do exercise.

Referring to FIG. 6, the sensor module 180 may obtain sensing data under the control of the control module 170 (S602). The sensing data obtained by the sensor module 180 may include one or more of the moving speed, moving acceleration, moving direction, or slope of the electronic device 101, and the sensing data may also include one or more of the user's blood pressure, heart rate, respiratory rate, oxygen saturation, calorie consumption, ECG, and EMG.

The control module 170 of the electronic device 101 may determine the user's current state based on the sensing data (S604). The user's current state determined by the control module 170 in step S604 may include the type, strength, or progress state of the exercise being done by the user wearing the electronic device 101 implemented as a wearable device. If the user is doing exercise, the user's current state may include the user's stress level. According to an embodiment of the present invention, the control module 170 may determine the user's stress level in step S604. The stress level may be determined based on the exercise being done by the user, the strength of the exercise, the progress state of the exercise, the time required for the exercise, or the body temperature, blood pressure, or heart rate of the user.

If the user's current state is determined in step S604, the control module 170 may determine whether the user's stress level is equal to or larger than a predetermined threshold (S606). The predetermined threshold may be a reference value for determining whether the user may continue to do exercise. For example, if the user's heart rate is 100 or more, the control module 170 may determine that the stress level is the threshold or more. Further, if the user's systolic blood pressure is 160 mmHg or more, the control module 170 may determine that the stress level is the threshold or more. As described above, if the stress level is the threshold level or higher, the control module 170 may request the user to stop exercise.

In case it is determined in step S606 that the user's stress level is the threshold or larger (S606, yes), the control module 170 may control the display 150 to display a stop exercise alarm requesting the user to stop exercise on the screen (S608). By displaying the stop exercise alarm as above, the electronic device 101 may prevent a threat to the user's health.

If it is determined in step S606 that the stress level is less than the threshold (S606, no), the control module 170 may determine an operation based on the user's current state (S612). The control module 170 may control the electronic device 101 to run the operation determined in step S614. If the stress level is less than the threshold, the control module 170 may control the display 150 to display, e.g., an exercise course, on the screen so that the user may continue the exercise.

According to an embodiment of the present invention, a method for operating an electronic device may comprise determining movement information of the electronic device based on sensing data measured through a sensor module; determining bio information for a user by analyzing one or more bio signals; and controlling the electronic device according to the movement information and the bio information.

According to another embodiment of the present invention, a method for operating an electronic device may comprise determining whether a communication module is connected with an external device; and if the communication module is connected with the external device, controlling the electronic device based on a connection state for a connection between the electronic device and the external device.

According to still another embodiment of the present invention, a method for operating an electronic device may comprise performing one or more couplings with one or more external devices; determining movement information of the electronic device using a motion sensor; determining bio information for a user by analyzing one or more bio signals; determining a service providable from the electronic device to the user based on the movement information or the bio information; and providing the service to the user using the one or more external devices coupled with the electronic device.

According to yet still another embodiment of the present invention, a method for displaying content by an electronic device may comprise obtaining sensing data; determining a current state of a user based on the sensing data; determining a content to be displayed on a display based on the current state; and displaying the content on the display.

According to yet still another embodiment of the present invention, a method for displaying content by an electronic device may comprises obtaining sensing data for determining a direction of a screen; determining the direction of the screen based on the sensing data; determining a display direction of the content based on the direction of the screen; and displaying the content on the screen based on the display direction.

Figures 7A, 7B:
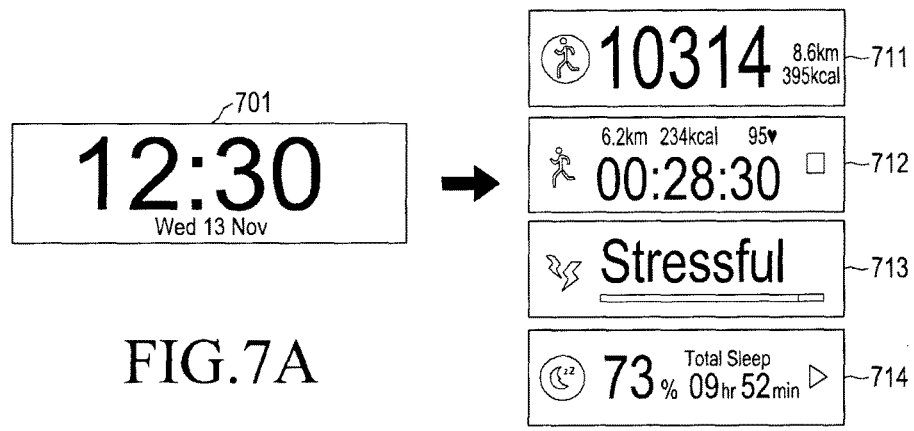
FIGS. 7A and 7B are views illustrating an example of a method of displaying content by an electronic device according to an embodiment of the present invention.

FIGS. 7A and 7B are views illustrating an example of a method of displaying content by an electronic device according to an embodiment of the present invention. In FIGS. 7A and 7B, it is assumed that the user wears the electronic device 101 on a portion of his body. Various contents displayed on the screen by the display 150 may be displayed in image form, and the image displayed over the entire screen is referred to as a "screen image".

FIG. 7A shows a basic screen image (701) of the electronic device 101, and the screen include the current time, date, and day. For example, in case the user is not doing exercise, the control module 170 may control the display 150 to display the basic screen image 701.

FIG. 7B shows an example of content displayed on the screen through the display 150 by the electronic device 101 in case the user does exercise. In FIG. 7B, it is assumed that the user does jogging. Referring to FIG. 7B, the control module 170 of the electronic device 101 may control the display 150 to display one or more exercise mode screen images 711, 712, 713, and 714. The exercise mode screens may display contents, such as the type of exercise, exercise duration, remaining time, moving distance, calorie consumption, user's heart rate, stress level due to exercise, or progress rate of exercise. The exercise mode screen images 711 to 714 of FIG. 7B, respectively, are the screen image 711 showing the exercise level, the screen image 712 showing the exercise duration, the screen image 713 showing the user's stress level, and the screen image 714 showing the progress rate of exercise. According to an embodiment of the present invention, the exercise mode screen images 711, 712, 713, and 714, respectively, may be switched into other screen images by the user's input entered through the screen of the display 150, such as a scroll input. For example, if a scroll input that moves from above to down or from right to left is entered while the exercise mode screen image 170 is displayed on the screen 150, the display 150 may switch the exercise mode screen information 711 into the exercise mode screen image 712 and displays. Although only user input through the screen is described in connection with FIGS. 7A and 7B, the user input may be a voice input or gesture input according to other embodiments. Further, the electronic device 101 may trace the user's view and may recognize the user's traced view as the user input. The control module 170 may control the electronic device 101 according to various user inputs, such as the voice input, gesture input, or user's view, e.g., switching screen images displayed on the screen or controlling the scroll.

In case the electronic device 101 runs the exercise mode, the user does exercise, and thus, although the electronic device 101 displays the exercise mode screen images (e.g., the exercise mode screen images 711, 712, 713, and 714) along with a vibration, the user might not identify it. In case the user fails to identify the exercise mode screen image as described above, the electronic device 101 may automatically set the exercise mode screen image that the user has failed to identify as an initial screen image or default screen image. For example, in case a particular exercise mode screen image along with a vibration is displayed, but is determined to have not been identified by the user, the control module 170 may set the particular exercise mode screen image as the home screen image until the user identifies it. Accordingly, the user need not enter a separate input to the electronic device 101 in order to identify the particular exercise mode screen image. Further, since the particular exercise mode screen image may be set as the initial screen image, the number of screen images that are unnecessary for the user to identify may be reduced, thus leading to power savings in the electronic device 101.

Figures 8A, 8B:
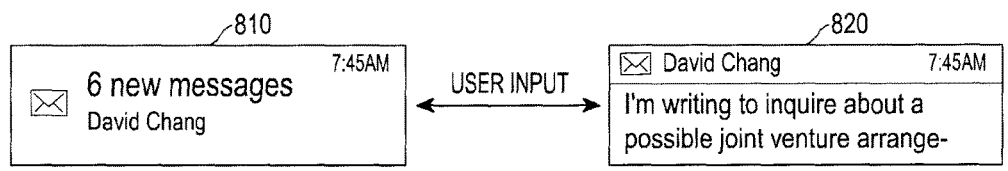
FIGS. 8A and 8B are views illustrating another example of a method of displaying content by an electronic device according to an embodiment of the present invention.

FIGS. 8A and 8B are views illustrating an example of a method of displaying content by an electronic device according to an embodiment of the present invention. In FIGS. 8A and 8B, it is assumed that the user wears the electronic device 101 on a portion of his body, and the user is doing exercise.

FIG. 8A shows a message notification screen image 810 to inform the user of the number of messages received by the electronic device 101 or that a new message has arrived. The display 150 may display the number of new messages unread by the user, the sender of message, and the current time through the notification screen image 810. In FIG. 8A, the number of new messages unread by the user is six.

The electronic device 101 may receive a user input for displaying the content of new message while displaying the message notification screen image 810. For example, while the message notification screen image 810 is displayed on the screen, the electronic device 101 may receive a user input by which the user taps the screen surface with his fingertip or stylus pen to display the content of message. If the user input to display the content of message is inputted to the electronic device 101, the control module 170 may control the display 150 to switch the screen image from the notification screen image 810 to the message display screen image 820.

FIG. 8B shows the message display screen image 820 displaying the content of one of the new messages. The display may display 150, e.g., the sender, content of message, current time, or reception time through the message screen image 820.

In one embodiment, the electronic device 101 may switch the screen image from the message display screen image 820 to the message notification screen image. While the message display screen image 820 is being displayed through the display 150 as shown in FIG. 8B, the electronic device 101 may receive a user input to display the content of the message. For example, while the message notification screen image 810 is displayed through the display 150, the electronic device 101 may receive a user input by which the user taps the screen surface with his fingertip or stylus pen to display the content of message. If the user input to display the content of message is inputted to the electronic device 101, the control module 170 may control the display 150 to switch the screen image from the notification screen image 810 to the message display screen image 820.

Figure 9A:
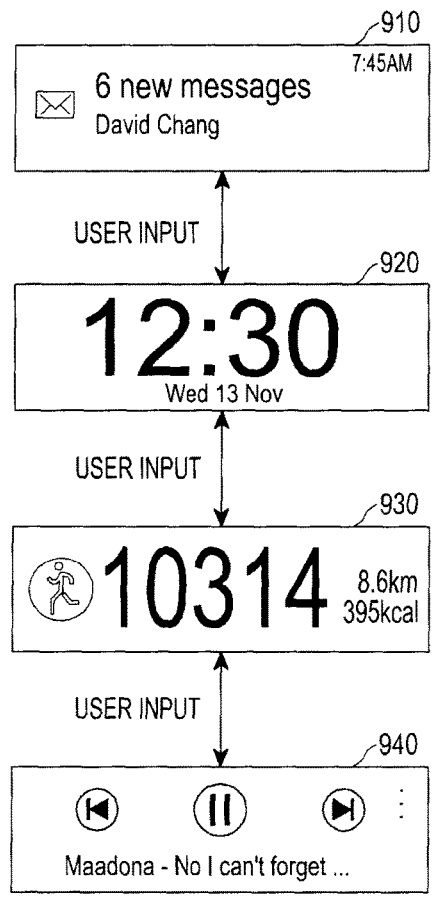
FIGS. 9A and 9B are views illustrating another example of a method of displaying content by an electronic device according to an embodiment of the present invention.
Figure 9B:
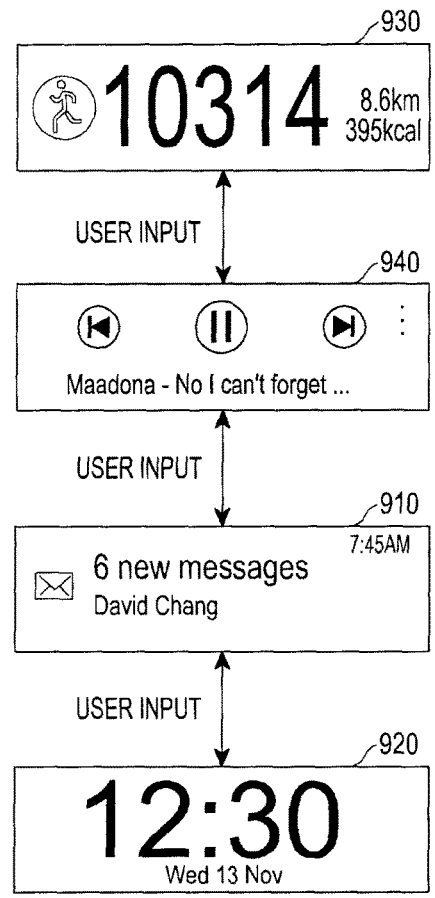

FIGS. 9A and 9B are views illustrating an example of a method of displaying content by an electronic device according to an embodiment of the present invention. In FIGS. 9A and 9B, it is assumed that the user wears the electronic device 101 on a portion of his body.

FIGS. 9A and 9B show, in order, screen images displayed on the display 150 of the electronic device 101. FIG. 9A shows screen images in case the user is not doing exercise, and FIG. 9B shows screen images in case the user is doing exercise.

According to an embodiment of the present invention, in case the electronic device 101 is implemented as a wearable device, the screen may be configured of a card-type UI considering the limited size of the screen. For example, each screen image displayed on the screen may be configured in the form of a page, and the user may look up other pages by sequentially flipping the pages through a touch or flick input. In this case, the order of pages may be previously determined, and FIGS. 9A and 9B shows a card-type UI, e.g., an example in which such configuration is made that one page is displayed on one screen and is displayed on the screen. Here, the order of pages may be varied by the user input or arbitrarily by the electronic device 101.

For example, in case the electronic device 101 is connected with another electronic device (e.g., the electronic device 104) through a communication means (e.g., the communication interface 160), the electronic device 101 may first display GUIs related to a connection event with the other electronic device, i.e., pages, on the screen.

An example is described with reference to FIGS. 9A and 9B under the assumption that the initial screen image of the electronic device 101 is the current time screen image 920 displaying the current time. The control module 170 of the electronic device 101 may set the current time screen image 920 as the initial screen image and may control the display 150 to display the current time screen image 920 ahead of the other screen images 910, 930, and 940.

According to an embodiment of the present invention, the electronic device 101 may receive a message from the other electronic device (e.g., the electronic device 104). The reception of the message from the other electronic device 101 by the electronic device is referred to as a "message reception event". In case the message reception event occurs, the control module 170 of the electronic device 101 may reset the initial screen image to the message alarm screen image 910 related to the message. Since the message alarm screen image 910 is reset as the initial screen image, the display 150 may display the message alarm screen image 910 ahead of the other screen images 920, 930, and 940. Further, the screen images may be switched in the order of "message alarm screen image 910→current time screen image 920→exercise mode screen image 930→music play screen image 940" according to a user input.

According to another embodiment, if a preset time elapses after the message reception event occurs, the control module 170 may control the electronic device 101 so that the current time screen image 920 is reset as the initial screen image.

As described above, the electronic device 101 may vary the priority of the screen images displayed through the display 150. According to an embodiment of the present invention, the electronic device 101 may change order of display of each screen image so that screen images related to an event (e.g., a message reception event, user state alarm event, or exercise mode alarm event) generated by the other electronic device may be first displayed but not in the order of latest screen images being currently looked up by the user. Thus, the user may easily recognize the latest event or information generated in the electronic device 101. According to an embodiment of the present invention, a preset time after the event occurs, the electronic device 101 may change the order of display of the screen images back to the order of screen images before the event occurs even without receiving a separate user input. Thus, the user may easily identify in order the screen images displayed on the electronic device 101.

Referring to FIG. 9A, the electronic device 101 displays the message alarm screen image 910 as the initial screen image. As shown in FIG. 9A, the electronic device 101 may display contents in the order of "message alarm screen image 910→current time screen image 920→exercise mode screen image 930→music play screen image 940". According to an embodiment of the present invention, the message alarm screen image 910, which is the initial screen image, may be an initial screen image designated by the user, an initial screen image designated as default of the electronic device 101, or a termination screen image for when the user has used the electronic device 101 before. The electronic device 101 may switch the screen images according to a user input. Upon sensing a user input (swipe input) pushing the surface of the screen, e.g., from above to left, while the message alarm screen image 910 is in display, the electronic device 101 may display the current time screen image 920. By contrast, upon receiving the user input pushing the surface of the screen 150 from left to right, the electronic device 101 may display the music play screen image 940. Likewise, upon receiving the user input pushing the screen surface from left to right while the current time screen image 920 is in display or the user input pushing the screen surface from left to right, the message alarm screen image 910 or exercise mode screen image 930 may be displayed.

Upon receiving the user input pushing the screen surface from left to right while the exercise mode screen image 930 is in display or the user input pushing the screen surface from left to right, the current time screen image 920 or music play screen image 940 may be displayed. Upon receiving the user input pushing the screen surface from left to right while the music play screen image 940 is in display or the user input pushing the screen surface from left to right, the exercise mode screen image 930 or message alarm screen image 910 may be displayed.

According to another embodiment, it is assumed that the electronic device 101 is the host device, and the other electronic device 104 is a companion device implemented as a wearable device, and that the host device and the companion device are connected together through their respective communication means. It is also assumed that the data displayed on the companion device by the host device (e.g., the electronic device 101) may be displayed on the host device, and the data displayed on the host device by the companion device may be displayed on the companion device.

The host device may assign priorities to events generated in the companion device (e.g., the wearable device) equipped with one or more sensors. The host device (e.g., the electronic device 101) may display the event related to the companion device ahead of the event generated in the host device.

For example, it is assumed that the companion device is a PPG sensor-equipped smart watch. The companion device may measure the bio information (e.g., heart rate) of the user wearing the companion device using the PPG sensor and display on its screen. Further, the companion device may transmit the bio information measured through the PPG sensor to the host device. The host device may first display the bio information received from the smart watch on its screen, allowing the user to identify the same. That is, the host device may assign priority to the bio information and may receive the bio information from the companion device while simultaneously displaying the bio information on its screen in real-time.

Generally, the sync between the host device and the companion device, which is the wearable device, may be done at preset periods rather than in real-time. Further, the connection between the host device and the companion device may be broken, so that the sync between the two devices may fail. Accordingly, the user may have difficulty in identifying health-related notifications such as the bio information through the host device.

In order to allow the notifications to be easily identified, according to an embodiment of the present invention, the host device (e.g., the electronic device 101) may provide priority to bio information-related events transferred from the wearable device (e.g., the electronic device 104).

FIG. 9B shows an example in which in case the user starts to do exercise or is doing exercise, the electronic device 101 implemented as a wearable device displays the exercise mode screen image (930) including the user's exercise load (e.g., moving distance or calorie consumption) as the initial screen image.

The control module 170 of the electronic device 101 may analyze the sensing signal measured by the acceleration sensor or bio sensor, and if the user's exercise load is not less than a preset exercise load or a preset heart rate, determine that the user's current state is the state of doing exercise. If the user is determined to be doing exercise, the control module 170 may automatically set the exercise mode screen image 930 as the initial screen image and display on the screen even without receiving a separate user input. Accordingly, as shown in FIG. 9B, the electronic device 101 may display contents in the order of "exercise mode screen image 930→music play screen image 940→message alarm screen image 910→current time screen image 920". In a similar manner to FIG. 9A, the screen images 910 to 940 may be switched according to a user input also in FIG. 9B.

Figure 10A:
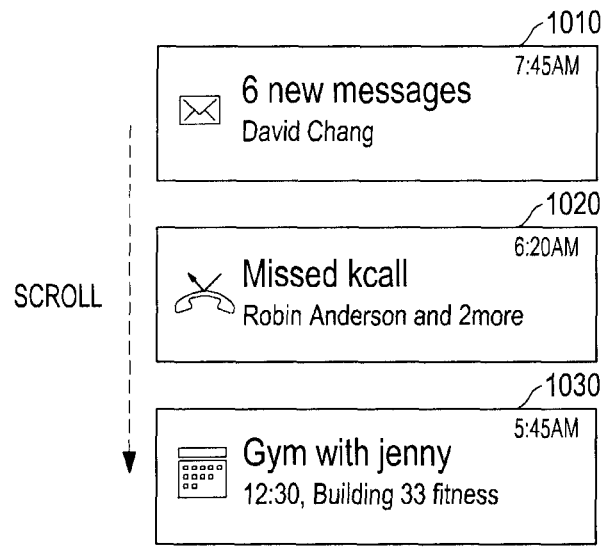
FIGS. 10A and 10B are views illustrating another example of a method of displaying content by an electronic device according to an embodiment of the present invention.
Figure 10B:
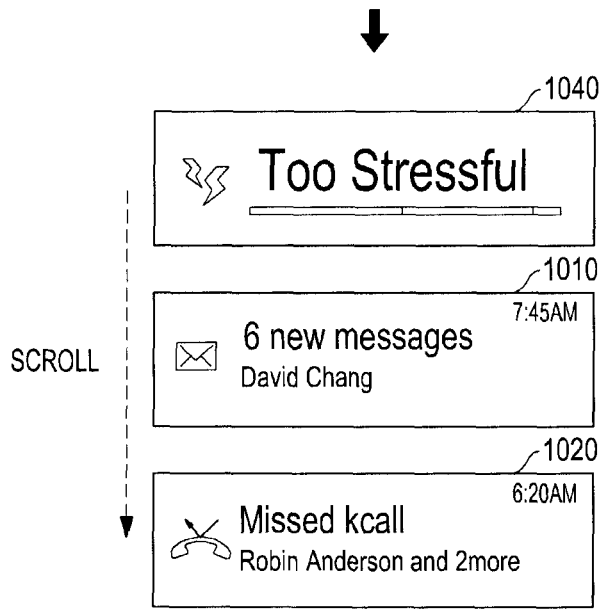

FIGS. 10A and 10B are views illustrating an example of a method of displaying content by an electronic device according to an embodiment of the present invention. In FIGS. 10A and 10B, it is assumed that the user wears the electronic device 101 on a portion of his body.

FIG. 10A shows screen images displayed on the screen of the display 150 in case the user is not doing exercise, and FIG. 10B shows screen images in case the user does exercise.

Referring to FIG. 10A, in case the user is not doing exercise, the display 150 of the electronic device 101 displays the message alarm screen image 1010 as the initial screen image. Further, if an input to switch screen images, e.g., an operation of pushing the screen surface from above to down with, e.g., the user's finger or stylus pen, is entered to the electronic device 101, the control module 170 may control the display 150 to display other screen image. In FIG. 10A, a missed call notification screen image 1020 and an exercise schedule notification screen image 1030 are displayed subsequent to the message alarm screen image 1010.

In case the user is doing exercise, the control module 170 may control the display 150 to display the user's stress level by the exercise as the initial screen image. FIG. 10B shows a stress level screen image 1040 indicating the user's stress level. If the user starts to do exercise, the control module 170, even when not receiving a separate input from the user, may automatically set the stress level screen image 1040 as the initial screen image. By setting the stress level screen 1040 as the initial screen image, the electronic device 101 may allow the user doing exercise to identify his stress level in real-time.

According to an embodiment of the present invention, in case the user's exercise load is not more than a preset exercise load, such as when the user strolls, or the user's stress level measured by the HRV sensor is not more than a preset value, the message alarm screen image 1010 may be set as the initial screen image as shown in FIG. 10A. Further, if the user's stress level is determined to be as high as a preset threshold or higher due to excessive exercise, the stress level screen image 1040 may be set as the initial screen image as shown in FIG. 10B or the user's stress level or user's current state may be separately displayed on an upper end of the screen.

Figures 11A, 11B:
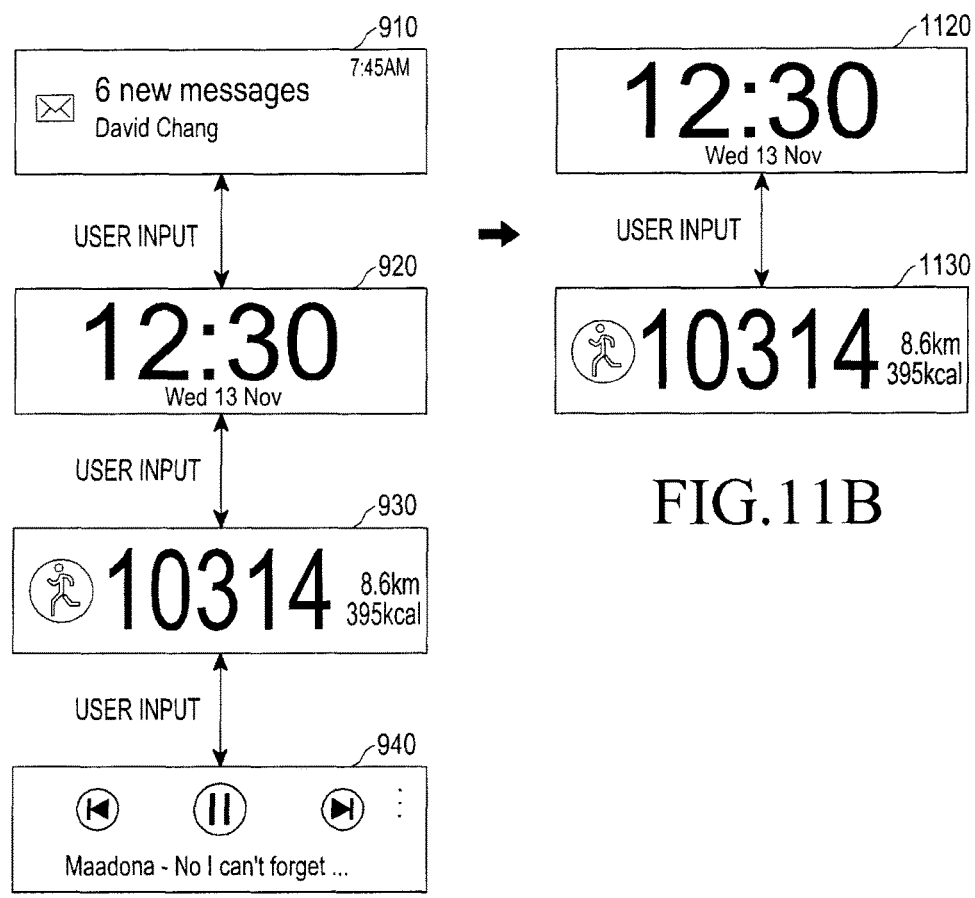
FIGS. 11A and 11B are views illustrating another example of a method of displaying content by an electronic device according to an embodiment of the present invention.

FIGS. 11A and 11B are views illustrating an example of a method of displaying content by an electronic device according to an embodiment of the present invention. In FIGS. 11A and 11B, it is assumed that the user wears the electronic device 101 on a portion of his body. It is also assumed that the electronic device 101 in FIGS. 11A and 11B are a companion device and interworks with another electronic device 104.

FIG. 11A shows the content displayed on the screen through the display 150 in case the electronic device 101 interworks with the electronic device 104 which is the host device. Referring to FIG. 11A, the electronic device 101 displays the message alarm screen image 1110 as the initial screen image. As shown in FIG. 11A, the electronic device 101 may display contents in the order of "message alarm screen image 1110→current time screen image 1120→exercise mode screen image 1130→media play screen image 1140".

The electronic device 101 may switch the screen images displayed on the screen according to a user input. Upon receiving the user input pushing the screen surface from right to left while the message alarm screen image 1110 is in display or the user input pushing the screen surface from left to right, the electronic device 101 may display the current time screen image 1120 or media play screen image 1140 on the screen. Likewise, upon receiving the user input pushing the screen surface from left to right while the current time screen image 1120 is in display or the user input pushing the surface of the screen 150 from left to right, the message alarm screen image 1110 or exercise mode screen image 1130 may be displayed on the screen.

Further, the electronic device 101 may provide the user with functions provided from the host device or content stored in the host device through interworking with the electronic device 104. Assuming that in FIG. 11A the messaging function and music playing function are provided form the electronic device 104 which is the host device, the message alarm screen image 1110 and the media play screen image 1140 may be displayed on the screen through the display 150 only in case the electronic device 101 interworks with the electronic device 104 which is the host device.

FIG. 11B shows screen images displayed on the screen through the display 150 in case the electronic device 101 does not interwork with the electronic device 104 which is the host device, i.e., in case the electronic device 101 operates in a standalone mode. If the interworking with the electronic device 104 which is the host device is terminated, the functions provided by the electronic device 104 may not be provided to the user by the electronic device 101. The control module 170 may control the display 150 to provide only screen images according to functions providable to the user regardless of whether it connects with the electronic device 104, i.e., unique functions of the electronic device 104.

Since the functions according to the message alarm screen image 1110 and the media play screen image 1140 among the screen images 1110 to 1140 shown in FIG. 11A are functions provided by the electronic device 104, they cannot be provided to the user in case the electronic device 101 does not interwork with the electronic device 104. Accordingly, in FIG. 11B, only the current time screen image 1120 and the exercise mode screen image 1130 may be displayed on the screen through the display 150.

According to an embodiment of the present invention, in case the electronic device 101 implemented as a wearable device operates standalone, e.g., upon failing to receive a message transmitted from the host device (e.g., the electronic device 104) or when the connection with the electronic device 104 is terminated, the control module 170 may remove the screen image associated with the mode in which communication with the electronic device 104 is required. That is, in case the electronic device 101 operates standalone, the control module 170 may display only the mode screen images displayable when the electronic device 101 operates standalone through the display 150. Accordingly, only in case the multimedia content stored in the electronic device 101 implemented as the wearable device is controllable, the control module 170 may display the media play screen image 1140 through the display 150.

According to another embodiment, the control module 170 may record the use history of the application frequently used by the user at a particular time or particular location in the memory 130. If one or more events of such event that the current time arrives at a particular time or such event that the electronic device 101 enters the particular location occur, the control module 170 may automatically display the initial entry screen image of the application frequently used by the user at the particular time or particular location on the screen through the display 150. According to an embodiment of the present invention, the control module 170, when arriving at the particular time or particular location, may change the screen image allowing the user to easily select the frequently used application.

The control module 170 may compute the respective preferences of applications based on one or more of the use frequency or total use time of each application. The control module 170 may arbitrarily arrange the menu or execution icons for selecting the respective applications depending on the respective preferences of the applications. For example, the control module 170 may arrange them so that they are easily noticeable to the user by displaying the execution icon corresponding to the higher-preference application to be larger than other execution icons or displaying it at the center of the screen through the display 150. According to an embodiment of the present invention, the control module 170 may evaluate the preference corresponding to each application according to the location information of the electronic device 101. In case the electronic device 101 enters the place with a higher preference per application or while the user is active in the area including the location (e.g., a geofence-set area or an area where the signal strength of the access point (AP) is not less than a preset reference value), the control module 170 may control the display 150 to vary the attribute of at least one of the menu for running the application or the position, size, and color of the execution icon and display them.

Figure 12A:
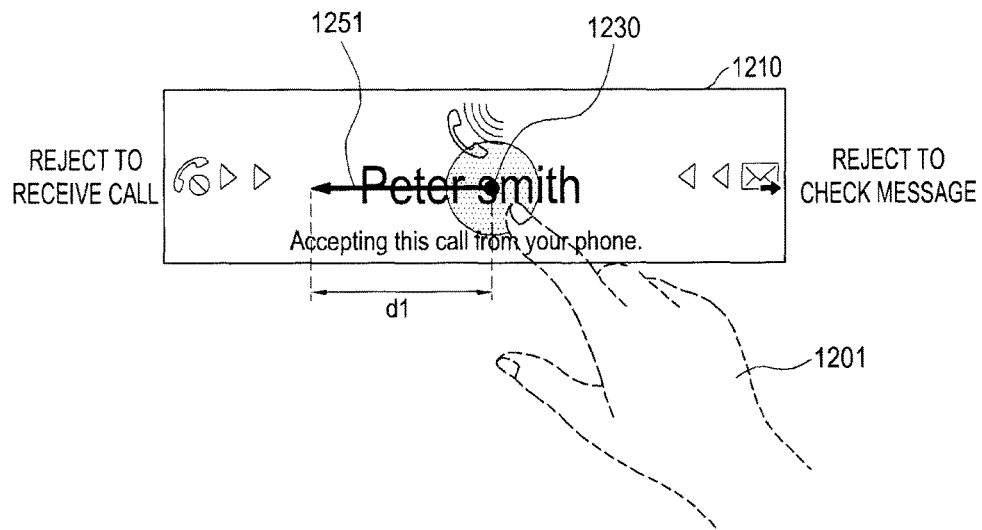
FIGS. 12A and 12B are views illustrating another example of a method of displaying content by an electronic device according to an embodiment of the present invention.
Figure 12B:
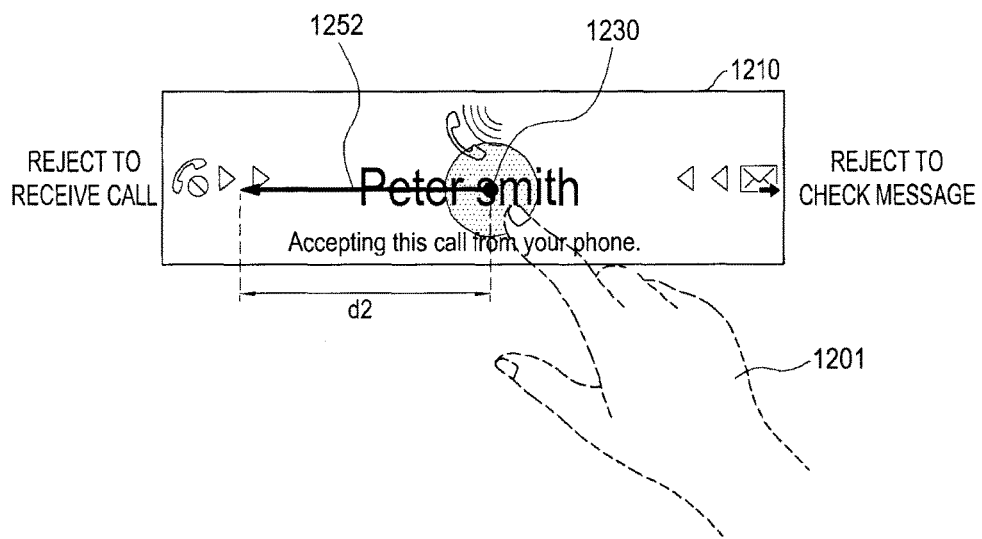

FIGS. 12A and 12B are views illustrating an example of a method of displaying content by an electronic device 101 according to an embodiment of the present invention.

FIG. 12A is a view illustrating a user input 1251 for rejecting to receive a call in case the user 1201 is not doing exercise, and FIG. 12B is a view illustrating a user input 1252 for rejecting to receive a call in case the user 1201 is doing exercise. In FIGS. 12A and 12B, it is assumed that an incoming call is received from the sender "Peter Smith" to the electronic device 101.

Referring to FIG. 12A and FIG. 12B, the user 1201 may drag to the left at a point 1230 on the screen 1210 as the user inputs 1251 and 1252 to reject call reception. The user input entered to the electronic device 101 by dragging from a point to another as described above is referred to as a "drag input".

Although the drag input 1251 of FIG. 12A and the drag input 1252 of FIG. 12B both are for rejecting the reception of calls incoming to the electronic device 101, the drag inputs 1251 and 1252 have different drag lengths d1 and d2. The drag length d2 of the drag input 1252 shown in FIG. 12A is larger than the drag length d1 of the drag input 1251 shown in FIG. 12A. In FIGS. 12A and 12B, in case the user 1201 is not doing exercise, the electronic device 101 may reject call reception if the length of the drag input 1251 is not less than d1. Further, in case the user 1201 is not doing exercise, the electronic device 101 may reject call reception only when the length of the drag input 1252 is not less than d2.

Although FIGS. 12A and 12B both show the drag inputs 1251 and 1252 for rejecting call reception, the reference values for determining whether the drag inputs 1251 and 1252 are valid may differ depending on whether the current state of the user 1201, i.e., whether the user 1201 is doing exercise. In case the user is doing exercise, the user 1201 moves more than in case he is not doing exercise, and thus, it is highly likely to enter a wrong user input to the electronic device 101. Accordingly, as shown in FIGS. 12A and 12B, the reference value when the user 1201 is doing exercise may be larger than the reference value when he is not.

As shown in FIGS. 12A and 12B, despite the same user input 1251 and 1252, different reference values for determining whether the user input is valid may be applied, preventing a malfunction of the electronic device 101 due to a wrong user input by the user.

According to an embodiment of the present invention, the user input 1230 may be at least one of a swipe, tap, long press, and hovering. When receiving the user input 1230, the control module 170 may apply different reference values for identifying the user input 1230 depending on the current state of the user or electronic device 101. For example, in case the user moves fast or does strenuous exercise, the user may have difficulty in identifying the screen of the electronic device 101 due to a quick movement in the portion where the electronic device 101 is mounted. Further, in case the user is doing strenuous exercise, the user may have difficulty in distracting his attention or may not have a room to look up the screen for a long time due to the strenuous exercise. In the above-described case, the user input (e.g., a touch or flick) entered through the electronic device 101 may have a larger error or inaccuracy in the input value by the user input (e.g., position, pattern, or strength of input) than when the user does not exercise or move.

Accordingly, the control module 170 may determine whether each function of the electronic device 101 operates according to the magnitude of gesture, duration of the touch input, or speed of gesture input entered through the camera module (not shown), touched area, distance of flick or drag, or touch strength of the user input.

Figure 13:
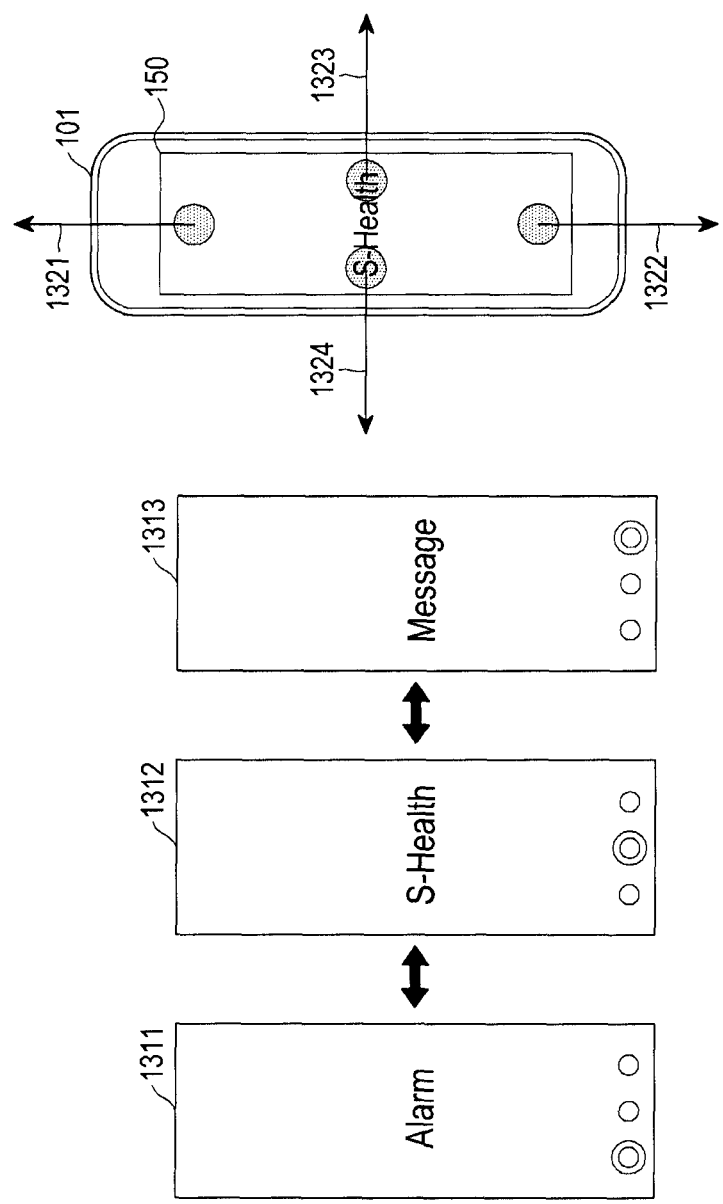
FIG. 13 is a view illustrating another example of a method of displaying content by an electronic device according to an embodiment of the present invention.

FIG. 13 is a view illustrating an example of a method of displaying content by an electronic device according to an embodiment of the present invention. In FIG. 13, the electronic device 101 displays a vertical UI through the display 150. The vertical UI is a UI providing a screen elongate vertically, and the horizontal UI is a UI providing a screen elongate horizontally.

Referring to FIG. 13, first to third screen images 311, 312, and 313 may be displayed on the screen of the display 150. The first screen image 1311 may include alarm-related contents, the second screen image 1312 healthcare-related contents, and the third screen image 1313 message-related contents. In FIG. 13, the electronic device 101, upon receiving the first to fourth inputs 1321, 1322, 1323, and 1324, may switch screen images displayed on the screen. It is assumed in FIG. 13 that the first to fourth inputs 1321 to 1324 for switching screen images are entered while the second screen image 1312 is being displayed on the display 150.

Referring to FIG. 13, the first input 1321 is to push the second screen image 1312 from down to above while the user selects a point on the screen using his finger or stylus pen. If the first input 1321 is entered, the control module 170 may control the display 150 to switch the screen image from the second screen image 1312 to the third screen image 1313.

The second input 1322 is to push the second screen 1312 from above to down while the user selects a point on the screen using his finger or stylus pen. If the second input 1322 is entered, the control module 170 may control the display 150 to switch the screen image from the second screen image 1312 to the first screen image 1311.

The third input 1323 is to push the second screen image 1312 from left to right while the user selects a point on the screen using his finger or stylus pen. If the third input 1323 is entered, the control module 170 may control the display 150 to switch the screen image from the second screen image 1312 to the first screen image 1311.

The fourth input 1324 is to push the second screen 1312 from right to left while the user selects a point on the screen using his finger or stylus pen. If the fourth input 1324 is entered, the control module 170 may control the display 150 to switch the screen image from the second screen image 1312 to the third screen image 1313.

That is, whether the user input (e.g., a swipe input) is entered vertically or horizontally, the screen image or menu GUI displayed through the display 150 of the electronic device 101 may be moved or varied horizontally or vertically. Thus, the user using the electronic device 101 may be avoided from confusion due to the automated switch of screen images on the electronic device 101 using the horizontal/vertical screens. Further, a switch of screen images is done in the manner shown in FIG. 13, allowing the user to enter a user input to the electronic device 101 in a consistent, simplified manner.

According to another embodiment, although the electronic device 101 is in the form elongate vertically rather than the electronic device formed to be elongate horizontal as shown in FIG. 13, the user input as shown in FIG. 13, e.g., the swipe/flick signals inputted through the user interface, may be received. Further, in the screen image switching manner as described in connection with FIG. 13, the screen images of the electronic device 101 may be automatically switched.

Figure 14:
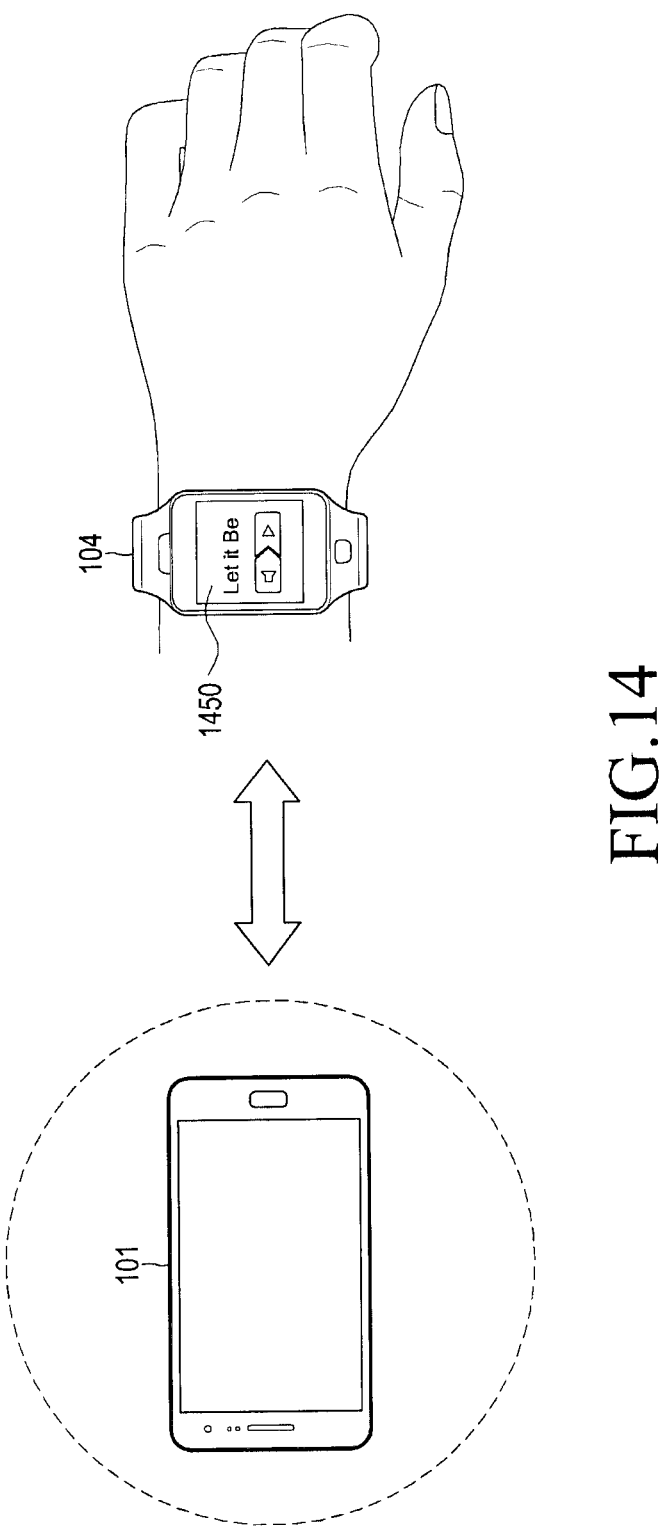
FIG. 14 is a view illustrating another example of a method of displaying content by an electronic device according to an embodiment of the present invention.

FIG. 14 is a view illustrating an example of a method of displaying content by an electronic device according to an embodiment of the present invention.

Referring to FIG. 14, the electronic device 101 may be implemented as a host device and may interwork with an electronic device 104 which is a companion device. As shown in FIG. 14, the electronic device 104 which is the companion device may be implemented as a wearable device (e.g., a circular wrist watch-type wearable device) and may be worn on a portion of the user's body. Further, the electronic device 101 which is the host device may be located at a position where it may communicate with the electronic device 104 to control the electronic device 104. The electronic device 104 shown in FIG. 14 is in the state of running the exercise mode under the control of the electronic device 101 and plays an audio file under the control of the electronic device 101. The electronic device 104 may display the screen 1450 including information (e.g., song title or play time) on the playing audio file and a menu (e.g., volume control, pause, or stop) for control related with playing the audio file.

According to an embodiment of the present invention, the electronic device 104 may determine the degree of the movement of the user wearing the electronic device 104 (e.g., sprint or walking) and differentially apply the output level of audio and voice depending on the degree of the movement. Accordingly, the electronic device 104 may provide a sound output level and input level (e.g., microphone) optimized for the user's hearing sense.

For example, in case the user happens to call while exercising hard, the electronic device 104 may increase or reduce the output of the speaker or microphone as compared with when the user does not exercise. The electronic device 104 may control the input/output level, e.g., by adjusting the volume, sensitivity, or noise filtering of the speaker, microphone, Bluetooth headset, or headphone in order to vary the call voice level. Thus, the user may easily hear sound from the electronic device 104 or input sound to the electronic device 104 even during exercise.

Figure 15:
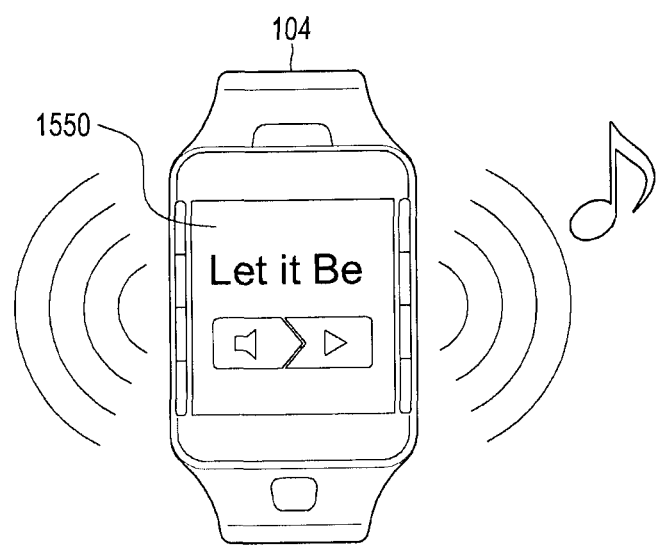
FIG. 15 is a view illustrating another example of a method of displaying content by an electronic device according to an embodiment of the present invention.

FIG. 15 is a view illustrating an example of a method of displaying content by an electronic device according to an embodiment of the present invention. The electronic device 104 shown in FIG. 15 may be a circular wrist watch-type wearable device as shown in FIG. 14 and may be in the state of interworking with the host device 101.

FIG. 15 shows the case where, when the user's movement is a preset reference value or more, that is, when the user does strenuous exercise, the electronic device 104 outputs sound at the maximum level. The electronic device 104 of FIG. 15 is playing the song file "Let it Be", and the song file may be outputted through the speaker at the maximum volume. The electronic device 104 may display the screen 1550 including information (e.g., song title or play time) on the playing audio file and a menu (e.g., volume control, pause, or stop) for control related with playing the audio file.

According to an embodiment of the present invention, in case the degree of the user's movement is a preset reference value or more, for example, in case the strength of the exercise the user is doing is high, the electronic device 104 worn on the user may temporarily stop the operation of displaying the notification to the user through the display.

The electronic device 104 may stop displaying the notification (Notification interrupt) and store the notification in the memory of the electronic device 104. Thereafter, if the degree of the user's movement sensed through the sensor module is determined to be less than the preset reference value, an alarm stored in the memory may be displayed and provided to the user. Accordingly, the electronic device 104 may reduce power consumption and allows the user to identify the alarm in a comfortable manner.

According to an embodiment of the present invention, the electronic device 104 may receive, from the user, various user inputs, such as swipe, tap, long press, or hovering. According to an embodiment of the present invention, the electronic device 104 implemented as a wearable device may reduce input errors by blocking some user inputs when the user is doing exercise or the user's movement is as large as a preset reference value or more. For example, if the user is doing pushup or immediately after he has done pushup, the hovering input may not be precisely entered to the electronic device 104. Accordingly, the control module 170 may abstain from receiving the hovering input, or although it is entered, disregard the hovering input within a predetermined time (e.g., while the user does pushup).

According to an embodiment of the present invention, if a particular application (e.g., an application related to one or more of healthcare, SNS, phone, alarm, image viewer, or media play) runs on the electronic device 101, the electronic device 104 implemented as a wearable device may display a counter application. The counter application may be an application associated with the particular application running on the electronic device 101 or including at least some functions of the particular application. For example, in case the host device (e.g., the electronic device) is running the user's healthcare application (e.g., an application related to the heart rate sensor, food calorie management, calorie consumption check, or exercise coaching), the electronic device 104 which is the companion device may also display a health coaching screen related to the healthcare application.

As another example, if the host device (e.g., the electronic device 104) displays pictures through a gallery application, the electronic device 101 which is the companion device may also run the gallery application or provide a user interface (UI) for entry into the gallery application to the user. Accordingly, the user may easily approach the gallery application through the electronic device 101. As another example, in case the user runs a video play application through the host device (e.g., the electronic device 103), the electronic device 101 which is the companion device may also run the video play application. At this time, the host device may play video, and the companion device may display information on the video (e.g., TV channel information, movie title, or cast information) or play list on the screen. Of course, the two devices, i.e., the host device and the companion device, may simultaneously display the same content on their screens.

As another example, it is assumed that the user runs a document editing application (e.g., note or word processor) through the host device (e.g., the electronic device 104). In the above case, the control module 170 of the electronic device 101 which is the companion device implemented as wearable device may pop up the document editing application on the screen through the display 150. Further, the control module 170 may control the electronic device 101 so that the document editing application is run corresponding to a one-time user input by the user. For example, the control module 170 of the electronic device 101 which is the companion device may display, as a popup, contents including a minimum portion of the document content or icon related to the document editing application on the screen through the display 150. Further, if the user selects or adjusts the popup, the control module 170 may run the document editing application or control the display 150 to display a document editing window rather than the popup.

Figure 16:
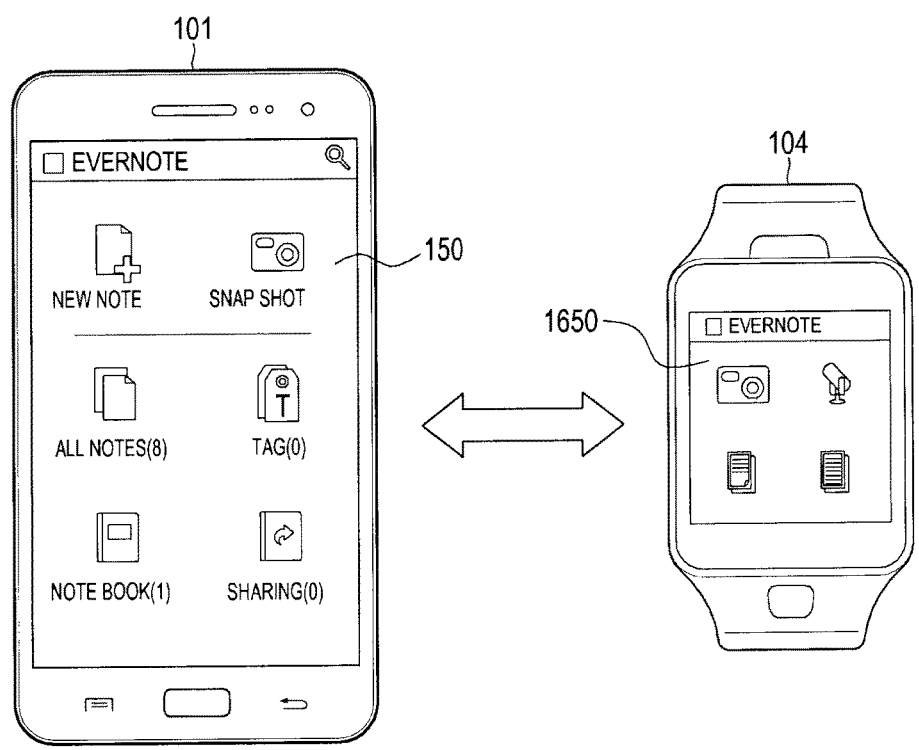
FIG. 16 is a view illustrating another example of a method of displaying content by an electronic device according to an embodiment of the present invention.

FIG. 16 is a view illustrating an example of a method of displaying content by an electronic device according to an embodiment of the present invention.

In FIG. 16, it is assumed that the electronic device 101 and the electronic device 104 interwork with each other. According to an embodiment, the electronic device 101 may be a host device, and the electronic device 104 may be a companion device.

Since the electronic devices 101 and 104 interwork with each other, the application running on the electronic device 101 which is the host device may also be run on the electronic device 104 which is the companion device.

Referring to FIG. 16, a note-related application is run on the electronic device 101 and is displayed on the screen through the display 150. Accordingly, the note-related application may also be run on the electronic device 104 which is the companion device and may be displayed on the screen 1650.

According to an embodiment of the present invention, in case the electronic devices 101 and 104 interworking with each other run and display the same application, the operation by the user input entered to the electronic device 101 or electronic device 104 may be simultaneously run and displayed on the electronic device 101 and the electronic device 104. For example, if the user generates a new note through the electronic device 104, the electronic device 101 which is the host device, as well as the electronic device 104, may generate a new note and display it on the screen through the display 150.

Figure 17A:
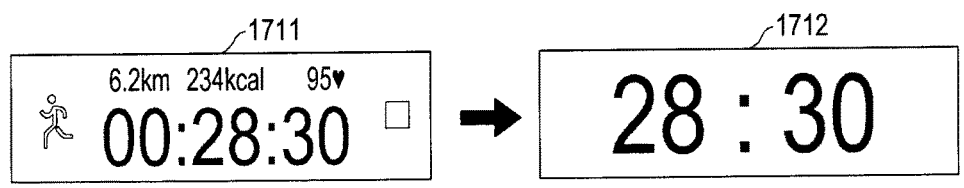
FIGS. 17A and 17B are views illustrating another example of a method of displaying content by an electronic device according to an embodiment of the present invention.
Figure 17B:
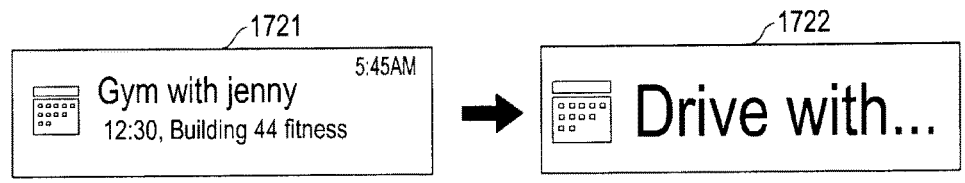

FIGS. 17A and 17B are views illustrating an example of a method of displaying content by an electronic device according to an embodiment of the present invention. In FIGS. 17A and 17B, the electronic device 101 displays a horizontal UI providing a horizontally elongated screen on the screen through the display 150. Further, it is assumed in FIGS. 17A and 17B that the user is doing exercise.

FIG. 17A shows contents, e.g., screen images 1711 and 1712, which may be displayed through the display 150 for each case where the strength of the user's exercise is high or low. At this time, the control module 170 may determine the exercise strength based on, e.g., variation in the user's movement, movement speed, movement duration, and calorie consumed per unit time.

Referring to FIG. 17A, in case the strength of the user's exercise is low, the information on the exercise the user is doing exercise, e.g., the type of exercise (e.g., running), moving distance (e.g., 6.2 km), calorie consumed by the exercise (e.g., 234 cal), the user's heart rate (e.g., 95), and exercise time (e.g., 00,28,30), is displayed on the screen. In case the strength of exercise is low, the user may easily check the screen of the electronic device 101 while exercising. Since the strength of the user's exercise belongs to a weak category, the user may continue the exercise while receiving, from the electronic device 101, while the display 150 of the electronic device 101 receives, from the electronic device 101, the contents, e.g., the first screen image 1711 including the type of exercise, moving distance, calorie consumption, heart rate, or time required for exercise. Although the first screen image 1711 includes five contents, five or more contents may be displayed through the display 150 according to another embodiment of the present invention. According to another embodiment, multiple contents may be displayed on the screen through the display 150 while the screen image switches.

If the strength of the user's exercise increases, the second screen image 1712 including only the exercise time of the user may be provided to the user by the display 150. In case the strength of exercise is high, it may be difficult for the user to check the screen of the electronic device 101 while simultaneously doing exercise. Accordingly, the control module 170 may control the display 150 to provide a limited number of information among information on the exercise the user is doing to the user. In case the contents provided to the user through the display 150 are limited, the control module 170 may control the display 150 to first display the highest-priority content depending on the respective priorities of the contents. It is assumed in FIG. 17A that among the type of exercise, moving distance, calorie consumption, heart rate, and exercise time, the exercise time has a higher priority than the others.

FIG. 17B shows contents, e.g., screen images 1713 and 1714, which may be displayed through the display 150 for each case where the strength of the user's exercise is high or low, like FIG. 17A does.

Referring to FIG. 17B, in case the strength of the user's exercise is low, the user's schedule may be displayed on the screen as in the third screen image 1721. The third screen image 1721 includes current time, schedule content, date, and location. Since various contents displayed on the screen of the display 150 may be more easily identified in case the strength of exercise is low than when the strength of exercise is high, the control module 170 may control the electronic device 101 so that various contents all are included and displayed in one screen image, e.g., the third screen image 1721.

By contrast, in case the strength of the user's exercise is high, the user's schedule may be displayed on the screen as in the fourth screen image 1722. The fourth screen image 1722 includes only schedule content. Since the user has more difficulty in identifying various contents displayed on the screen of the display 150 in case the strength of exercise is high than when the strength of exercise is low, the control module 170 may control the electronic device 101 so that one content is included and displayed in one screen, e.g., the fourth screen image 1722. At this time, the control module 170 may determine the content to be displayed on the screen of the display 150 according to priority. In FIG. 17B, the highest-priority content may be the schedule content. Accordingly, the control module 170 may control the display 150 to display only the schedule content on the screen.

Although as shown in FIGS. 17A and 17B the electronic device 101 may display only input information of various information (e.g., the second screen image 1712 and the fourth screen image 1722), according to another embodiment, the control module 170 of the electronic device 101 may sequentially display several information every preset time (e.g., 10 sec) while switching screens. In case the information is displayed while the screen images are sequentially switched, the control module 170 may various adjust the size or shape of image, letter, number, symbol, animation, video, icon, or GUI for displaying information through the display 150, depending on the user's exercise level or strength.

FIGS. 18A to 18C are views illustrating an example of a method of displaying content by an electronic device according to an embodiment of the present invention. In FIGS. 18A to 18C, the electronic device 101 displays a horizontal UI providing a horizontally elongated on the screen through the display 150. Further, it is assumed in FIGS. 18A to 18C that the user is doing jogging.

FIGS. 18A to 18C shows an example in which the contents, e.g., screen images, displayed on the display 150 are varied depending on the strength of exercise the user is doing. For example, the control module 170 may vary the amount of information or GUI size included in the screen image displayed on the screen depending on the strength of exercise.

Assuming that the strength of exercise comes in high, medium, and low, FIG. 18A shows a content displayed on the screen when the strength of exercise is low, FIG. 18B shows a content displayed on the screen when the strength of exercise is medium, and FIG. 18C shows a content displayed on the screen when the strength of exercise is high.

Referring to FIG. 18A, in case the strength of exercise is "low", the control module 170 may control the display 150 to display on the screen a first screen image 1810 including the type (jogging) of the exercise, time required for exercise (00,28,30), exercise distance (6.2 km), calorie consumption (234 kcal), and heart rate (95). Further, the display 150 may display a menu button 1811. If receiving a user input selecting the menu button 1811 from the user, the electronic device 101 may display other contents than the contents (type of exercise, time required for exercise, exercise distance, calorie consumption, and heart rate) displayed in the first screen image 1810.

Further, the control module 170 may display an exercise route as the second screen image 1818 along with the first screen image 1810. Since the strength of exercise is low, the control module 170 may control the display 150 so that the second screen image 1815 includes the map, the user's current location, the user's moving distance, the user's moving speed, time required for exercise, calorie consumption, heart rate, current time, and moving direction (left turn after move 120 m). Further, the display 150 may display a menu button 1811.

Referring to FIG. 18B, in case the strength of exercise is "medium", the control module 170 may control the display 150 to display on the screen a first screen image 1820 including the type (jogging) of the exercise, time required for exercise (00,28,30), and exercise distance (6.2 km). Further, the display 150 may display a menu button 1821 on the screen. If receiving a user input selecting the menu button 1821 from the user, the electronic device 101 may display other contents than the contents (type of exercise, time required for exercise, exercise distance) included in the first screen image 1820.

Further, the control module 170 may display an exercise route as the second screen image 1825 along with the second screen image 1820. Since the strength of exercise is medium, the control module 170 may control the display 150 so that the second screen image 1825 includes the map, the user's current location, the user's moving distance, the user's moving speed, time required for exercise, calorie consumption, heart rate, and moving direction (left turn after move 120 m). Further, the display 150 may display the menu button 1811, and the map included in the second screen image 1825 in FIG. 18B may be one represented more briefly than the map included in the second screen image 1815 in FIG. 18A.

Referring to FIG. 18C, in case the strength of exercise is "high", the control module 170 may control the display 150 to display on the screen a first screen image 1830 including the exercise distance (6.2 km). Further, the display 150 may display a menu button 1831. If receiving a user input selecting the menu button 131 from the user, the electronic device 101 may display other contents than the contents (exercise distance) included in the first screen image 1830.

Further, the control module 170 may display an exercise direction as the second screen image 1835 along with the first screen image 1830. Since the strength of exercise is high, the control module 170 may control the display 150 so that the second screen image 1835 includes the remaining distance (3 km), predicted time required (00,15,20), and moving direction (left turn after move 120 m). Further, the display 150 may display a menu button 1831, and the second screen image 1835 in FIG. 18C may be displayed more briefly than the second screen images 1815 and 1825 in FIGS. 18A and 18B, and among the contents, the may may also be omitted.

According to an embodiment, the electronic device 101 may adjust the amount of various contents displayed through the display 150. The control module 170 of the electronic device 101 may adjust per level the amount of content displayed through the display 150. Hereinafter, representing the amount of content displayed through the display 150 at a level is referred to as "display-degree level". The control module 170 of the electronic device 101 may summarize per step the information corresponding to the content by reducing the amount of content displayed through the display 150 according to the display-degree level.

For example, it is assumed that the schedule table includes detailed information, such as time, place, purpose, and attendee of meeting schedule, current time, and icon corresponding to the meeting schedule. If the display-degree level is 3, the control module 170 may display the detailed information on the screen so that the whole detailed information is included in one screen image. If the display-degree level is 2, the control module 170 may control the display 150 so that only the time, place, and purpose of the meeting schedule are included in one screen image. If the display-degree level is 1, the control module 170 may control the display 150 so that only the remaining time and place of the meeting schedule may be displayed in one screen.

As another example, it is assumed that the electronic device 101 displays a call message screen image. If the display-degree level is 3, the control module 170 may control the display 150 so that the caller's name, face picture, and phone number are included in one screen image. If the display-degree level is 2, the control module 170 may control the display 150 so that the caller's name and phone number are included in one screen image. If the display-degree level is 1, the control module 170 may control the display 150 so that only the caller's name is displayed on one screen image.

As another example, it is assumed that the electronic device 101 displays a news article or message (SMS or MMS) on the screen.

If the display-degree level is 3, the control module 170 may control the display 150 so that the detailed content of the news article or message may be included and displayed on one screen image. If the display-degree level is 2, the control module 170 may control the display 150 so that the headline or summary of the news article or summary of the message may be included and displayed on one screen image. If the display-degree level is 1, the control module 170 may control the display 150 so that only the headline of the news article or a head portion of the message may be included and displayed on one screen image. Further, a natural language processing or statistical scheme-based document summarizing engine for such data processing may be previously installed on the electronic device 101. According to another embodiment, the document summarizing engine may be included in the external device or server, and the electronic device 101 may receive the news article or message summarized by the document summarizing engine through the communication interface 160 and display it.

Figure 19:
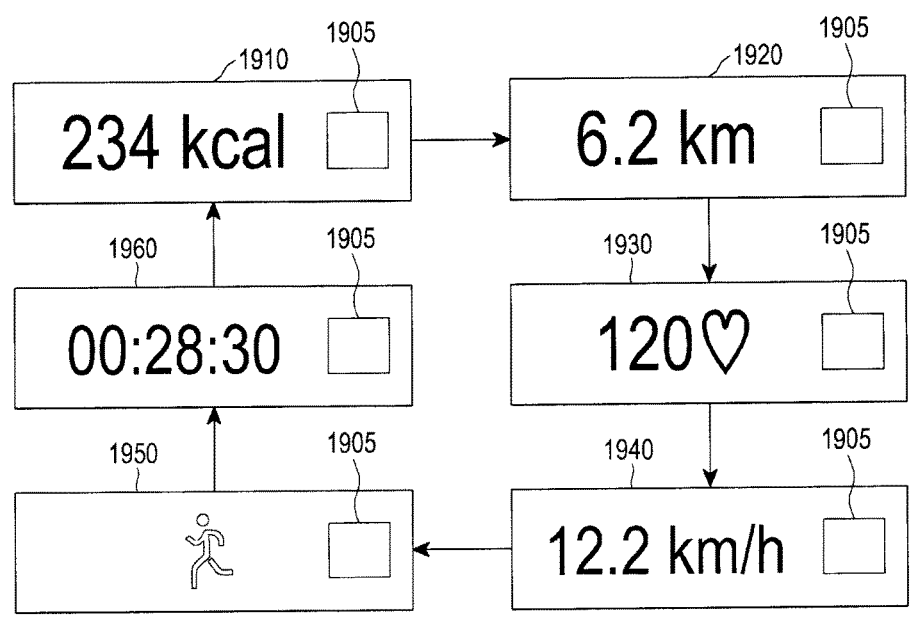
FIG. 19 is a view illustrating another example of a method of displaying content by an electronic device according to an embodiment of the present invention.

As another example, the control module 170 of the electronic device 101 may determine the significance of each content displayed through the display 150 in level units depending on the user's current state or current circumstance. Further, the control module 170 may determine content to be displayed through the display 150 depending on the significance. For example, right after the user starts to run as shown in FIG. 18A, the control module 170 may control the display 150 to display contents with a significance level of 1. The significance level 1 contents may be a detailed map including the user's running route, the user's calorie consumption, and the amount of exercise, and the control module 170 may control the display 150 so that the calorie consumption and the amount of exercise may be alternately displayed on the detailed map. Some time after the user starts to run as shown in FIG. 18B, the control module 170 may control the display 150 to display the significance level 2 contents. The significance level 2 contents may be a map briefly showing the user's running route, the user's running speed, and calorie consumption as shown in FIG. 18B. The control module 170 may control the display 150 to display the user's running speed and calorie consumption on the brief map together with the map. A significant time after the user starts to run as shown in FIG. 18C, the control module 170 may control the display 150 to display the significance level 3 contents. The significance level 3 contents may be the moving direction of the running user, and the control module 170 may control the display 150 to briefly display the moving direction in an arrow or text. FIG. 19 is a view illustrating an example of a method of displaying content by an electronic device according to an embodiment of the present invention. FIG. 19 shows a case in which six screen images 1910, 1920, 1930, 1940, 1950, and 1960 are displayed through the display 150. In FIG. 19, the user is currently running, and accordingly, the control module 170 may control the display 150 so that each screen image 1910 to 1960 includes only one content and menu button 1905.

Referring to FIG. 19, the first screen image 1910 may include the calorie consumption (234 kcal) and the menu button 1905, the second screen image 1920 may include the moving distance (6.2 km) and the menu button 1905, the third screen image 1930 may include the heart rate 120 and the menu button 1905, the fourth screen image 1940 may include the moving speed (12.2 km/h) and the menu button 1905, the fifth screen image 1950 may include the exercise type (running) and the menu button 1905, and the sixth screen image 1960 may include the time required for exercise (00,28,30) and the menu button 1905.

According to an embodiment of the present invention, upon receiving the user input pushing the screen from right to left with any one point on the screen selected, the electronic device 101 may switch the screen images from the first screen image 1910 to the second screen image 1920, from the second screen image 1920 to the third screen image 1930, from the third screen image 1930 to the fourth screen image 1940, from the fourth screen image 1940 to the fifth screen image 1950, from the fifth screen image 1950 to the sixth screen image 1960, or from the sixth screen image 1960 to the first screen image 1910.

According to an embodiment of the present invention, the electronic device 101 may display screen images for representing their respective contents displayed through the display 150 in order at preset times. For example, the electronic device 101 may switch the screen images from the first screen image 1910 to the second screen image 1920, from the second screen image 1920 to the third screen image 1930, from the third screen image 1930 to the fourth screen image 1940, from the fourth screen image 1940 to the fifth screen image 1950, from the fifth screen image 1950 to the sixth screen image 1960, and from the sixth screen image 1960 to the first screen image 1910 every ten seconds and may repeat such switching operation. Further, the electronic device 101 may receive a touch, tap, flick, swipe, voice input, and pressing a button previously provided in the electronic device 101, as the user input, from the user. The electronic device 101 may run the user's desired mode, display the user's desired screen image, or switch the screen image according to the user input.

According to an embodiment of the present invention, upon receiving the user input pushing the screen from left to right with any one point on the screen selected, the electronic device 101 may switch the screen images from the first screen image 1910 to the sixth screen image 1960, from the second screen image 1920 to the first screen image 1910, from the third screen image 1930 to the second screen image 1920, from the fourth screen image 1940 to the third screen image 1930, from the fifth screen image 1950 to the fourth screen image 1940, or from the sixth screen image 1960 to the fifth screen image 1950.

Figure 20A:
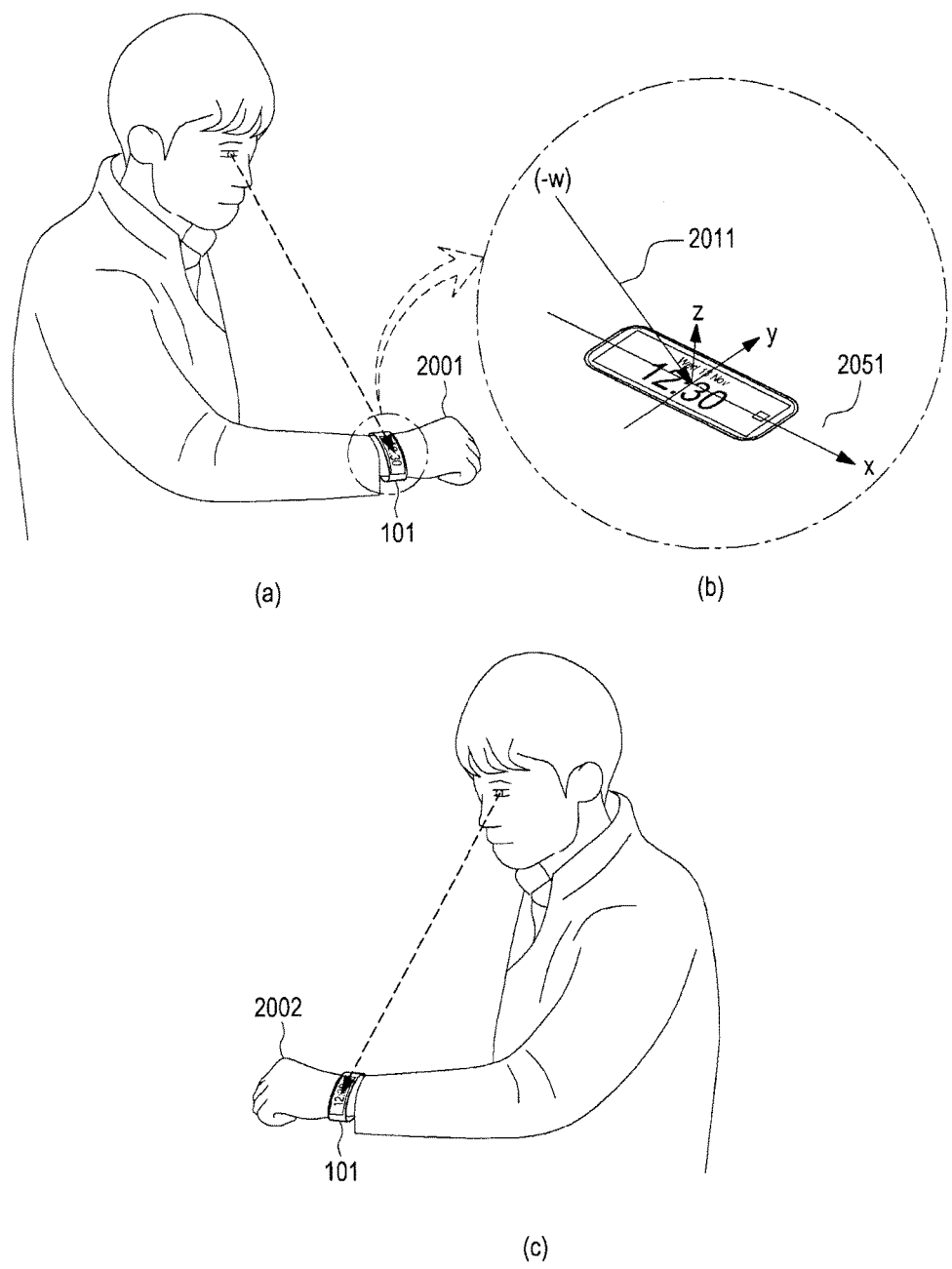
Figure 20B:
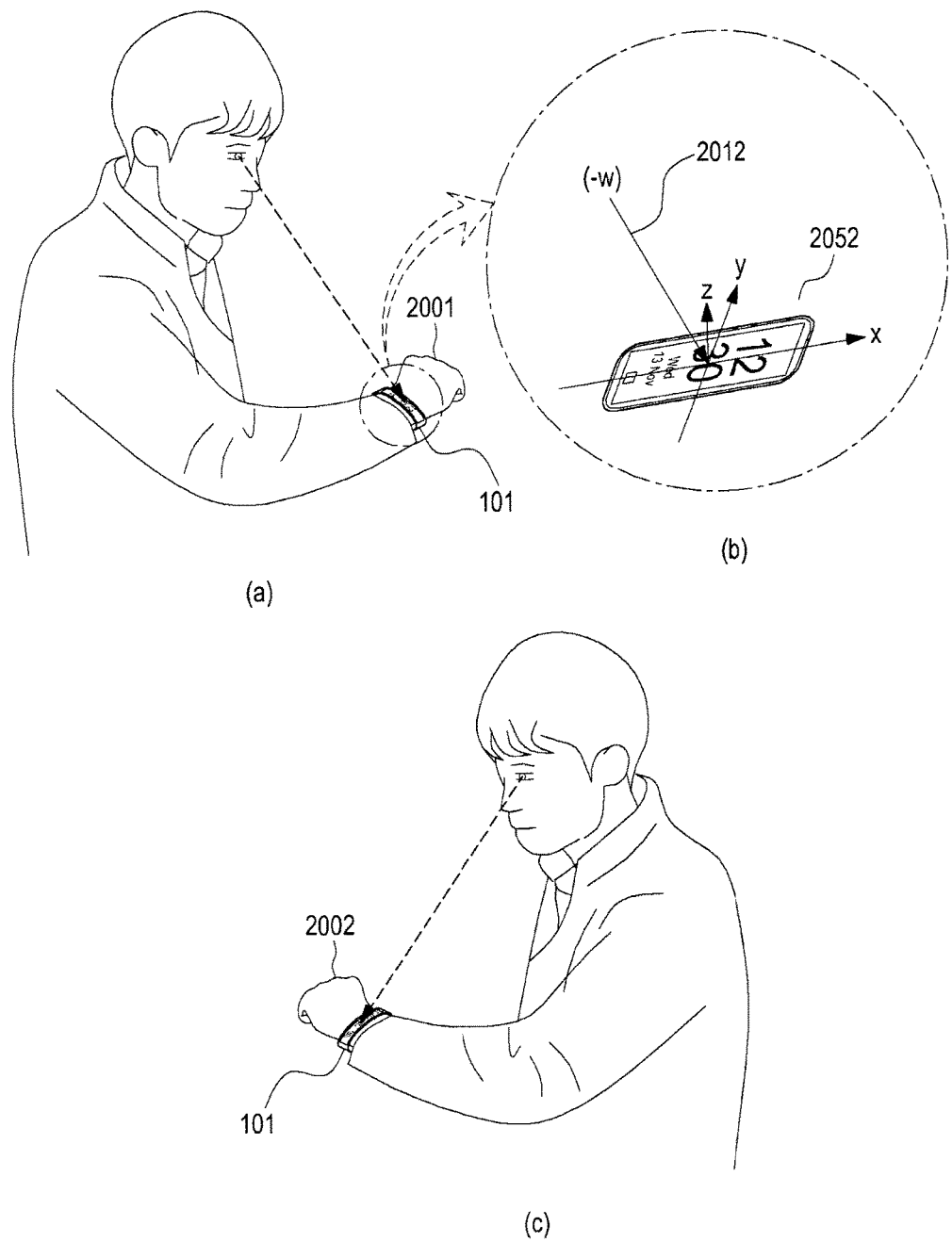

FIGS. 20A to 20C are views illustrating another example of a method of displaying content by an electronic device 101 according to an embodiment of the present invention. It is assumed in FIGS. 20A to 20C that the electronic device 101 is implemented as a wrist watch-type wearable device. Further, FIGS. 20A to 20C are views illustrating examples of identifying content outputted from the wearable device worn on the user's wrist when the electronic device 101 implemented as the wrist watch-type wearable device is worn on the user.

In FIG. 20A, (a) shows an example in which the user wears the electronic device 101 on his right hand 2001, and (c) OF FIG. 20A shows an example in which the user wears the electronic device 101 on his left hand 2002. Further, Fig. (b) of 20A shows the view direction 2011 incident onto the screen of the electronic device 101 and the coordinate system 2015 in case the user wears the electronic device 101 on his right hand 2001.

Referring to FIG. 20A, the electronic device 101 may be worn on the user's right hand 2001 or left hand 2002. In case the electronic device 101 is worn on the user's right hand 2001 or left hand 2002, the direction w facing the user's eyes (the opposite direction of the direction 2011 in which the user views the screen, i.e., the opposite direction of the view), when referring to the coordinate system 2051, is identical or similar to the direction z of the screen, i.e., the direction in which the screen faces.

If the direction z of the screen is identical to the opposite direction w of the view or the angle between the direction z of screen and the opposite direction w of the view is not more than a reference angle (e.g., 30°) and the direction z of the screen is similar to the opposite direction w of the view, the control module 170 may control the display 150 so that the content is outputted in a horizontal direction (left to right) as shown in FIG. 20A. According to an embodiment of the present invention, if the angle between the direction Z of the screen and the opposite direction w of the view is more than the predetermined reference, i.e., in case the direction z of the screen is not similar to the opposite direction w of the view, the control module 170 may control the display 150 so that the content is not displayed on the screen. According to an embodiment of the present invention, in case the direction z of the screen is not similar to the opposite direction w of the view, the control module 170 may power off the screen or operate the electronic device 101 as a low power device or control the display 150 to output on the screen other content, e.g., clock, screen saver, weather information, or lock screen image, instead of the content.

According to an embodiment of the present invention, in case the direction z of the screen is similar to the opposite direction w of the view, the control module 170 may determine whether to output content on the screen through the display based on the security level of the content. For example, such circumstance is assumed that it is not easy for the user wearing the electronic device 101 to identify the content. In case the content has a high security level, for example, in case the content is personal information, health information, or information on the caller of an incoming call, the control module 170 may control the display 150 to abstain from displaying the content. By contrast, in case the content has a low security level, for example, in case the content is weather or time, the control module 170 may control the display 150 to display the content. According to an embodiment of the present invention, for low-security level contents, the control module 170 may always display them on the screen through the display 150 regardless of the user's current state.

As mentioned above, the contents may have security levels divided into two grades or more. According to an embodiment of the present invention, a security level may be previously determined for each content, and the security level of each content may be determined by the control module 170.

According to an embodiment of the present invention, the control module 170 may control the display 150 to output only contents with a particular level or more of security level or less than the particular level in case the direction Z of the screen is similar to the opposite direction w of the view.

Further, referring to FIG. 20A, the control module 170 may determine that the screen of the electronic device 101 is in a horizontally elongated shape with respect to the x and y axis of the coordinate system 2051 shown in FIG. 20A. Further, the contents outputted through the screen of (a) and (c) in FIG. 20A may have a horizontally elongated shape or may be arranged and displayed in the horizontally elongated shape. Referring to FIG. 20A, the y axis of the coordinate system 2051 is in the direction of a virtual line that vertically meets two longer edges of the four edges of the screen on the screen surface (e.g., the central point of the screen surface), and the x axis is in the direction of a line perpendicular to the y axis on the screen surface (e.g., the central point on the screen surface). The control module 170 may determine the direction Z of the screen (e.g., the direction where the screen faces or norm vector on the screen surface) using the point where the x axis and the y axis meet. Here, the control module 170 may determine that the opposite direction w of the user's view is closer to the y axis than the x axis. For example, the control module 170 may determine that the current pose of the user wearing the electronic device 101 is the pose under the state where the horizontal edge of the screen is longer under the movement of the user's arm or wrist or the direction of the y axis of the electronic device 101 is similar to the direction of the gravity or its opposite direction. Accordingly, the control module 170 may control the display 150 so that the content is outputted in a horizontally long shape.

In FIG. 20B, (a) shows an example in which the user wears the electronic device 101 on his right hand 2001, and (c) of FIG. 20B shows an example in which the user wears the electronic device 101 on his left hand 2002. Further, (b) of FIG. 20B shows the view direction 2012 incident onto the screen of the electronic device 101 and the coordinate system 2052 in case the user wears the electronic device 101 on his right hand 2001.

Referring to FIG. 20B, for the user, the screen of the electronic device 101 is in a vertically longer shape with respect to the x axis and y axis of the coordinate system 2052. Further, the contents outputted through the screen of (a) of 20A and (c) of FIG. 20B may have a vertically elongated shape or may be arranged and displayed in the vertically elongated shape. As described above, in case the direction z of the screen is identical or similar to the opposite direction w of the view, although the vertical edge of the screen is longer than the horizontal edge, the control module 170 may control the display 150 so that the contents are outputted in the horizontal direction (e.g., from left to right or from right to left). That is, the control module 170 may adjust the layout so that the contents fit the vertically longer screen and control the display 150 so that the contents are arranged and outputted in row units. According to another embodiment, the control module 170 may control the display 150 so that the contents are outputted in a vertical direction, i.e., from above to down. For example, the letters may be arranged and outputted vertically (sorted in column units) like the way in, e.g., ancient books.

According to an embodiment of the present invention, the direction in which the contents are arranged on the screen (e.g., the horizontal direction, vertical direction, left-to-right direction, or upper-lower direction) may be determined by the user input. The user input may be user's manipulation, e.g., selection of menu, selection of button, or selection of icon. The way to arrange the contents by the user input may be information preset and stored in the electronic device 101, and the control module 170 may control the display 150 so that the contents may be outputted in the way of arrangement according to the user input. According to an embodiment of the present invention, the way to arrange contents may be varied according to the user input. For example, the user may enable the control module 170 to adjust the way to arrange contents by entering which hand the user wears the electronic device 101 to the electronic device 101. In case the screen displaying contents is shaped as a square or rectangle, if the user's hand wearing the electronic device 101 is determined, the control module 170 may designate one of the four edges of the screen, as a reference for outputting the content. Thus, the way to arrange contents may be determined.

According to an embodiment of the present invention, one or more sensors previously provided in the electronic device 101 may sense the pose of the electronic device 101, specifically the screen, and generate pose information (hereinafter, "screen pose information") accordingly. For example, the electronic device 101 may be pitched, yawed, or rolled, and one or more sensors previously provided in the electronic device 101 may sense the poses. At this time, the screen included in the electronic device 101 may also be pitched, yawed, or rolled. The screen pose information represents information indicating the pose the screen currently makes. The control module 170 may determine or vary the way to arrange contents or whether to output contents based on the screen pose information. For example, the control module 170 may determine the direction z of the screen based on sensing data measured by the acceleration sensor or gyro sensor provided from the electronic device 101. Further, the control module 170 may determine the way to arrange contents, such as displaying contents in the horizontal mode or landscape mode or in the vertical mode or portrait mode depending on the direction Z of the screen.

According to an embodiment of the present invention, the one or more sensors may sense the movement of the electronic device 101 and generate movement information (hereinafter, device movement information) accordingly. For example, the electronic device 101 may be tilted or rotated, and the one or more sensors may sense the movement of the electronic device 101. The movement information represents information on various movements generated from the electronic device 101. The control module 170 may determine or vary the way to arrange contents or whether to output contents based on the device movement information.

According to an embodiment of the present invention, the control module 170 may determine or vary the way to arrange contents or whether to output contents based on the angle between the user's eyes and the screen (e.g., the angle between the direction −w where the view faces the screen and the direction Z where the screen faces).

According to an embodiment of the present invention, the opposite direction w of the user's view may be determined based on a separate embedded sensor (e.g., the camera, IR camera, or view tracing device). For example, the electronic device 101 may include a camera device (not shown) facing in the same direction as the screen and may analyze the area including the user's eyes or facial area in the image inputted through the camera to determine whether the user's view or face faces the screen. For example, the control module 170 may extract the user's eye area, face area, or eyeball area from the image captured for the user's face or eye. The control module 170 may determine the opposite direction w of the user's view based on one or more of the eye area, face area, or eyeball area. At this time, the control module 170 may determine the opposite direction w of the user's view based on the shape or area of each of the eye area, face area, or eyeball area.

According to an embodiment of the present invention, the pose information on the user's face (hereinafter, face pose information) may be identified based on the face image or eye image. For example, the control module 170 may be aware of the arranged shape of each of the elements constituting the user's face, such as eyes, nose, and mouth, through the face image and may be aware of the shape or relative position of each eye through the eye image. The control module 170 may sense the face pose information, e.g., one or more of the orientation of the user's face or eyeball, based on the information.

According to an embodiment of the present invention, the control module 170 may determine the device pose information or screen pose information based on the face pose information and may determine the way to arrange contents through the screen based on the device pose information or screen pose information. That is, the control module 170 may determine the orientation or device pose information of the camera module previously provided in the electronic device 101 using the face pose information. Further, the control module 170 may also determine the orientation of the camera module or screen pose information using the face pose information.

According to an embodiment of the present invention, the opposite direction w of the user's view may be determined based on the information indicating the movement or pose (e.g., pitch, yaw, or roll) of the electronic device 101, e.g., device pose information or screen pose information. Further, the information indicating the movement or pose of the electronic device 101 may be sensed or determined using one or more of the acceleration sensor, gyro sensor, and geo-magnetic sensor.

FIGS. 20A and 20B correspond to examples in which the user looks down to the wrist where the electronic device 101 is worn. In FIGS. 20A and 20B, the direction Z of the screen of the electronic device 101 faces in the opposite direction of the ground or in a similar direction to the opposite direction of the ground. The electronic device 101 determines the information indicating the movement or pose of the electronic device 101 using at least one of the above-described sensors. Subsequently, the electronic device 101 may determine the direction where the screen faces, i.e., the direction z of the screen, based on the information indicating the movement or pose of the electronic device 101. Subsequently, the electronic device 101 may perform control so that, if the direction z of the screen is within a predetermined reference angle (e.g., 45°) from the opposite direction of the ground (not shown), the contents are displayed through the display 150.

According to another embodiment, in case the direction z of the screen faces the ground, it may be predicted that the user cannot identify the screen. If the angle between the direction Z of the screen and the orientational direction of the ground (not shown) is within a predetermined reference angle (e.g., 45°), the control module 170 of the electronic device 101 may perform control so that the contents are not outputted on the screen of the display 150.

According to an embodiment of the present invention, the movement or pose of the screen may be sensed using one or more sensors to determine the direction where the contents displayed on the screen are arranged. For example, the control module 170 may control the display 150 so that the contents may be displayed on the screen in the horizontal mode or landscape mode in which the horizontal line is longer than the vertical line or the vertical mode or portrait mode in which the vertical line is longer than the horizontal line.

In FIG. 20C, (a) shows an example in which the user wears the electronic device 101 on his right hand 2001, and (c) of FIG. 20C shows an example in which the user wears the electronic device 101 on his left hand 2002. Further, (b) of FIG. 20C shows the view direction 2013 incident onto the screen of the electronic device 101 and the coordinate system 2053 in case the user wears the electronic device 101 on his right hand 2001.

Referring to FIG. 20C, the electronic device 101 remains worn on the user's right hand 2001 or left hand 2002. In case the electronic device 101 is worn on the user's right hand 2001 or left hand 2002, the direction w facing the user's eyes (the opposite direction of the view), when referring to the coordinate system 2053, is not similar or opposite to the direction z of the screen included in the display 150, i.e., the direction in which the display 150 faces. For example, the direction z of the screen shown in FIG. 20C may be not similar or opposite to the opposite direction w of the view depending on the state where the user wears the electronic device 101.

If the direction z of the screen is opposite to the opposite direction w of the view or the angle between the direction z of screen and the opposite direction w of the view is not less than a predetermined reference angle (e.g., 30°) and the direction z of the screen is not similar to the opposite direction w of the view, the control module 170 may control the display 150 so that the contents are not outputted on the screen. In case the direction z of the screen is opposite or not similar to the opposite direction w of the view, this may mean that the direction of the user's view is identical or similar to the direction z of the screen. Accordingly, although contents are outputted on the screen, the user may not identify the contents. In the above case, the control module 170 may prevent waste of power that may occur when the screen remains powered on by preventing the display 150 from outputting the content on the screen or turning off the screen.

According to an embodiment of the present invention, the control module may determine the direction z of the screen of the electronic device 101 worn on the user who is on the move based on the sensing data obtained from, e.g., the acceleration sensor or gyro sensor. The following Table 1 represents parameters available for the control module 170 to determine the direction z of the screen. The parameters may be stored in the memory 130.

The following Table 1 assumes that the electronic device 101 is a wearable device implemented in a bracelet or wrist watch-type wearable on the user's wrist. In case the electronic device 101 is implemented as a wearable device as above, the control module 170 may determine the direction z of the screen and the user's body portion (e.g., left wrist, right wrist, portion adjacent to the back of a hand, or position adjacent to a palm) wearing the electronic device 101 by referring to Table 1 below.

According to an embodiment of the present invention, after first wearing the electronic device 101, the user may move with the electronic device 101 on. In particular, if the user does such exercise as to rotate or tilt his wrist, the electronic device 101 may sense the direction of exercise in which the user may smoothly do the exercise to determine the user's body portion where the electronic device 101 is worn.

For example, it is assumed as shown in FIG. 20B that the electronic device 101 is worn at an adjacent position, such as the back of the left wrist. At this time, the direction z of the screen in which the content is displayed is assumed to be the opposite direction of the ground. When the user moves or does exercise so that his palm faces up, i.e., the direction z of the screen in the electronic device 101 faces the ground, the user may easily tilt counterclockwise the left wrist where the electronic device 101 is worn. However, it is not easy for the user to tilt clockwise his left wrist wearing the electronic device 101 so that the direction z of the screen of the electronic device 101 faces the ground or does exercise, and its resultant rotation angle is relatively restricted as well. This comes from a human being's exercise capability per body portion, and the electronic device 101 may determine the position on the body portion where the electronic device 101 is worn or candidate position by sensing the direction of smooth exercise after the user wears the electronic device 101.

In case it is not known which hand the electronic device 101 is worn, the control module 170 may determine in pair candidate positions for wearing the electronic device 101 according to the movement of the wrist. According to another embodiment, as shown in Table 1, the control module 170 may determine one candidate position where the electronic device 101 is worn based on the tendency where most people tend to let their back of hand face in the opposite direction of the ground (e.g., the tendency of determining the main direction of the screen embedded in the electronic device 101 worn on the wrist).

Thereafter, in order for the user to turn the wrist with the user's right palm facing up (the state where the screen faces the ground) so that the user's wrist is viewed, that is, in order for the user to do pronation so that the screen of the electronic device 101 faces in the opposite direction of the ground, the user may turn the wrist counterclockwise.

Figure 20D:
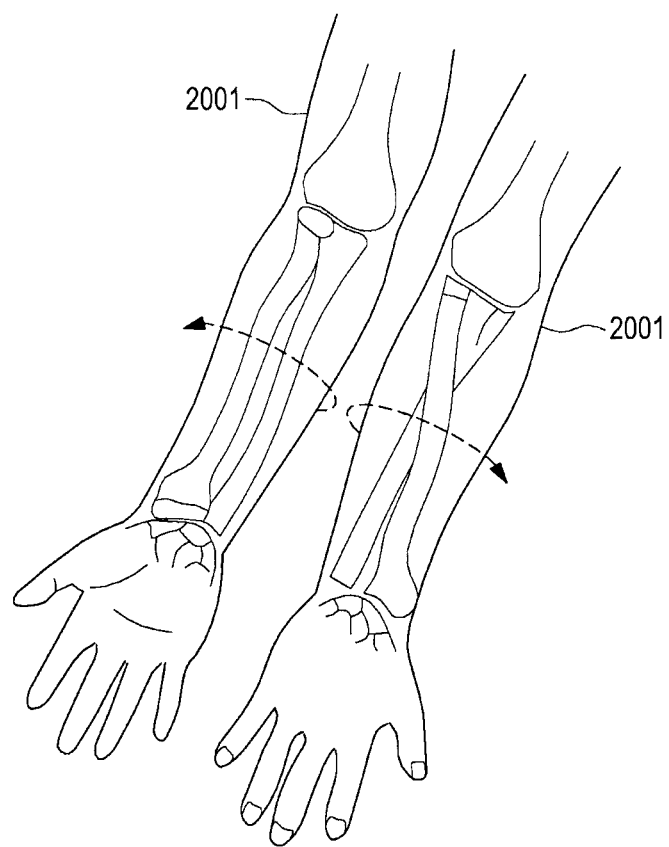

One or more sensors included in the sensor module 180 of the electronic device 101, e.g., the acceleration sensor or gyro sensor, may obtain the slope or acceleration of the electronic device 101 that is moved when the user twists his wrist or turns his arm as shown in FIG. 20D. The control module 170 may determine whether the electronic device 101 is attached to the user's body using the directivity of the rotational movement in the electronic device 101 caused by the user's movement and the main direction z of the screen. Further, the control module 170 may determine the position where the electronic device 101 is worn using the directivity of the rotational movement in the electronic device 101 and the direction z of the screen.

Figure 21A:
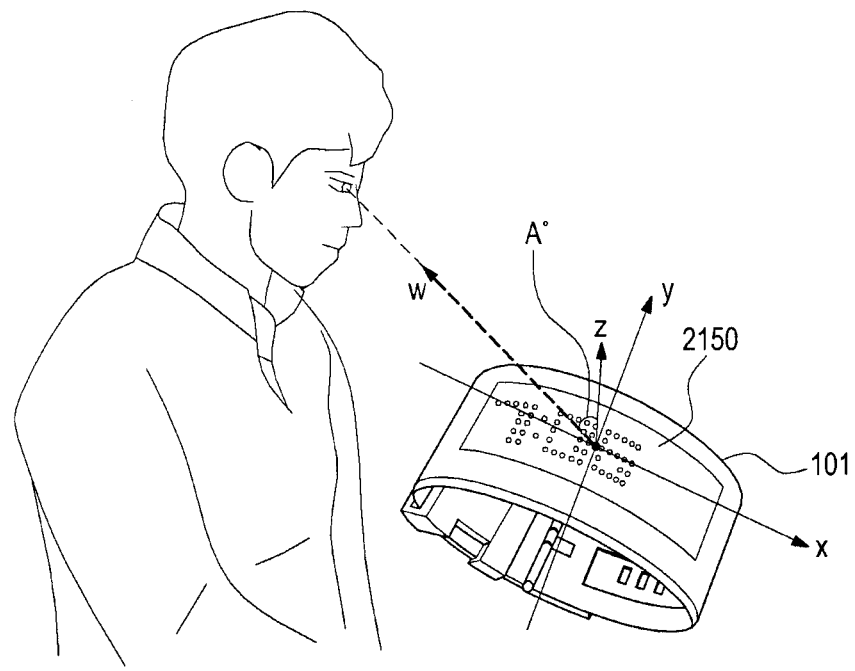
FIGS. 21A and 21B are views illustrating another example of a method of displaying content by an electronic device according to an embodiment of the present invention.
Figure 21B:
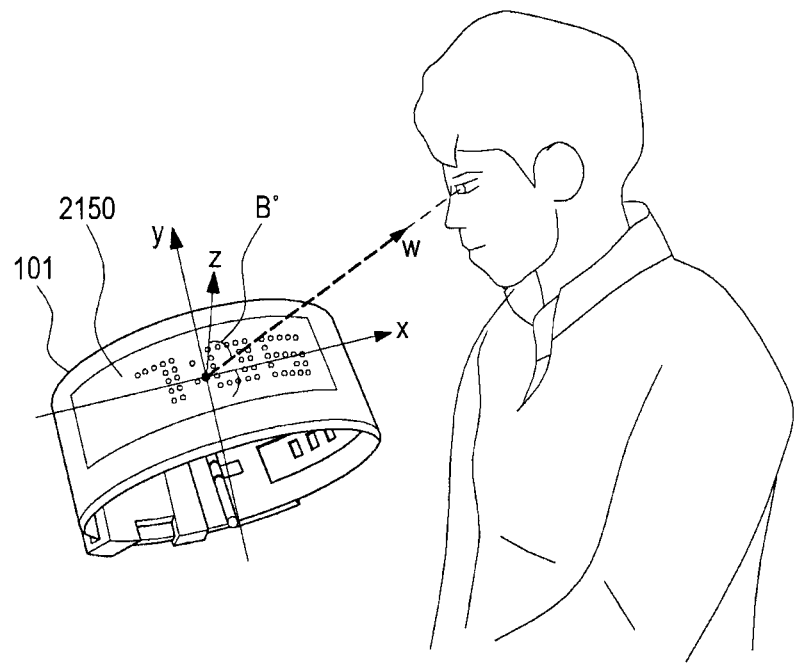

FIGS. 21A and 21B are views illustrating examples in which an electronic device 101 displays contents on the screen through the display 150 according to various embodiments of the present invention. In particular, FIGS. 21A and 21B are views illustrating contents receivable by the user wearing the electronic device 101 implemented as a wearable device from the electronic device 101.

Referring to FIG. 21A, the direction z of the screen included in the display 150 of the electronic device 101 is not consistent with the opposite direction w of the user's view. Further, the angle between the opposite direction w of the user's view and the direction z of the screen 2150 is A°. That is, the screen 2150 of the electronic device 101 is in the state turned by A° counterclockwise with respect to the

TABLE 1

| Main direction (z) of screen of electronic device | smooth rotation direction of electronic device upon wrist tilting exercise | orientational direction (z) of screen after wrist titlting exercise | smooth rotation direction upon subsequent titlting exercise while wrist is tilted | determined position where electronic device is mounted |
|---|---|---|---|---|
| opposite direction of the ground | counterclockwise (clockwise direction | direction of the ground | clockwise (counterclockwise direction is relatively limited) | position adjacent to the back of left wrist |
| opposite direction of the ground | clockwise (counterclockwise direction is relatively limited) | direction of the ground | counterclockwise (clockwise direction | position adjacent to the back of right wrist |
| direction of the ground | counterclockwise (clockwise direction | opposite direction of the ground | clockwise (counterclockwise direction is relatively limited) | position adjacent to palm of left wrist |
| direction of the ground | clockwise (counterclockwise direction is relatively limited) | opposite direction of the ground | counterclockwise (clockwise direction | position adjacent to palm of right wrist |

FIG. 20D is a view illustrating an example in which the user's right arm where the electronic device 101 is worn is viewed from above. Referring to FIG. 20D and Table 1, the user may turn his wrist clockwise so that the user's palm is rotated to be viewed while the back of the right hand of the user wearing the electronic device 101 implemented as a wearable device faces up (the state where the screen of the electronic device 101 faces in the opposite direction of the ground), i.e., in order for the user to allow the direction z of the screen of the electronic device 101 to face the ground by supination.

opposite direction w of the view. Referring to FIG. 21A, the opposite direction w of the view faces to the left of the screen 2150. Accordingly, it may be shown that the user's view is inclined to the left of the screen 2150. As described above, in case the user's view is inclined to a portion of the screen 2150, the control module 170 may control the display 150 so that the contents are displayed inclined to the side where the view is inclined. Referring to FIG. 21A, since the user's view is inclined to the left, the control module 170 may control the display 150 so that the contents are displayed inclined to the left of the screen 2150. In FIGS. 21a and 21*b*, the content displayed on the screen 2150 through the display 150 is current time, "7:06". As shown in FIG. 21A, if the user's view faces from the left side of the electronic device 101 to the screen 2150 of the electronic device 101, the control module 170 may control the display 150 so that "7:06" is displayed inclined to the left with the right side of the screen G150 emptied.

Also in FIG. 21B, the direction z of the screen 2150 of the electronic device 101 is not consistent with the opposite direction w of the user's view. Further, the angle between the opposite direction w of the user's view and the direction z of the screen 2150 is B°. That is, the screen 2150 of the electronic device 101 is in the state turned by B° clockwise with respect to the opposite direction w of the view. Referring to FIG. 21B, the opposite direction w of the view faces to the right of the screen 2150. Accordingly, it may be shown that the user's view is inclined to the right of the screen 2150. As described above, in case the user's view is inclined to a portion of the screen 2150, the control module 170 may control the display 150 so that the contents are displayed inclined to the side where the view is inclined. Referring to FIG. 21B, since the user's view is inclined to the right, the control module 170 may control the display 150 so that the contents are displayed inclined to the right of the screen 2150. In FIGS. 21A and 21B, the content displayed on the screen 2150 through the display 150 is current time, "7:06". As shown in FIG. 21A, if the user's view comes to the screen G150 of the electronic device 101 from the right side of the electronic device 101, the control module 170 may control the display 150 so that "7:06" is displayed inclined to the right with the left side of the screen 2150 emptied.

According to an embodiment of the present invention, the display 150 may display the UI displayed on the screen in the horizontal direction or vertical direction under the control of the control module 170. Hereinafter, the UI displayed in the horizontal direction is referred to as a horizontal UI, and the UI displayed in the vertical direction is referred to as a vertical UI. The display 150 may switch the UI displayed on the screen from the horizontal UI to the vertical UI or from the vertical UI to the horizontal UI under the control of the control module 170.

The switch between the horizontal UI and vertical UI may be predicted utilizing a user profile previously stored in the electronic device 101, such as a pre-stored exercise range of the user's body. After the user wears the electronic device 101, the control module 170 may compare the user's profile previously stored with the exercise range of the current body activity to determine the UI displayed on the screen. At this time, the control module 170 may determine whether to display the horizontal UI or vertical UI on the screen.

According to another embodiment, the electronic device 101 may determine the UI displayed on the screen according to a user input. At this time, the control module 170 may determine whether to display the horizontal UI or vertical UI on the screen according to the user input. The user input may include an input for selecting a virtual button, an input for selecting an icon, or an input of a physical button, such as a hard key.

According to an embodiment of the present invention, the control module 170 may sense a movement input (e.g., a motion input or gesture input) entered through the electronic device 101 using the movement sensor. The control module 170 may compare the movement input sensed using the movement sensor with movement data previously stored in the memory 130 to change the UI even when the similarity is not less than a reference value. At this time, the control module 170 may control the display 150 to change the horizontal UI into the vertical UI or change the vertical UI into the horizontal UI and display the same.

For example, the user wearing the electronic device 101 implemented as a wearable device may change the direction of the UI displayed on the screen by tilting his head or wrist or shaking the wrist. For example, the user may make a gesture with a preset particular angle, particular direction, or particular speed, and the electronic device 101 may perform motion recognition on the gesture. The control module 170 may change the direction of the UI displayed on the screen depending on the result of the motion recognition. As another example, the user may change the direction of the UI by making a large circle with his arm with the electronic device 101 worn on the arm or tilting the hand with the electronic device 101 on the wrist or finger.

According to an embodiment of the present invention, the control module 170 may switch the horizontal UI into the vertical UI or the vertical UI into the horizontal UI based on the state and type of the user's exercise. That is, the display 150 may automatically change UIs and display the same depending on the state or type of the user's exercise. The control module 170 may determine the state or type of the user's exercise using at least one sensor included in the electronic device 101, e.g., one or more of the movement sensor, location sensor, or bio sensor.

For example, the horizontal UI in a normal situation where the user does not exercise, the horizontal UI in case the exercise is biking, and the vertical UI in case the exercise is running may be provided to the user. That is, upon detecting a signal strength not more than a predetermined reference through the acceleration sensor or if the heart rate is not more than a predetermined reference, the control module 170 may determine that the use is not doing exercise. If the user's movement is sensed by the acceleration sensor, and the signal pattern measured by the acceleration sensor is similar to running by a predetermined reference or more, the control module 170 may determine that the user is running.

As another example, if the signal pattern measured by the acceleration sensor provided in the electronic device 101 worn on the wrist is a pattern in which the user is not running but moves left or right, and the user's moving distance measured by the GPS sensor is a predetermined distance or more, the control module 170 may determine that the user's state is in a state of riding the bicycle. That is, the control module 170 may sense circumstance information, such as location or moving speed, using the acceleration sensor or gyro sensor and may determine whether to display the horizontal UI or vertical UI on the screen using data outputted from the sensors. Further, the control module 170 may control the display 150 to change the horizontal UI into the vertical UI or change the vertical UI into the horizontal UI and display the same using the data outputted from the sensors.

As an example, the user may desire UIs with different directions in the company or home, frequently visiting coffee shop, bus or subway. If the moving speed measured using the GPS sensor or positioning sensor included in the electronic device 101 is a predetermined reference or more or the user is determined to stand still on a road, the control module 170 may determine that the user is on the move using a vehicle or public transportation. Further, the control module 170 may determine whether the user is driving a car using the acceleration sensor or gyro sensor.

According to an embodiment of the present invention, the electronic device 101 may determine whether the user is indoor or outdoor by receiving and measuring the sound around the user through an audio device, such as the microphone. For example, if there is high surrounding noise, the user is highly likely to be in a busy place, such as an outside place or to use the public transportation. If it is a bus or subway under such determination condition, the control module 170 may display letters in a smaller font or images in a reduced size when running an application, such as message, personal schedule, or diary. By doing so, the electronic device 101 may reduce exposure of the user's privacy and protect the user's privacy. If the user is determined to be behind the wheel or be indoor alone, such as home or office under the determination condition, the control module 170 may control the display 150 to enlarge and display the letters or image. Further, the control module 170 may analyze the location information of the electronic device 101, determine the location of the electronic device 101, i.e., whether the user is indoor or outdoor, and control the display 150 to display the horizontal UI or vertical UI according to the result of determination.

According to another embodiment, in case the user puts more weight on readability, although the user is in a bus or subway, the control module 170 may enlarge and display the letter font or image when running an application, such as message, personal schedule, or diary.

When determining what space the user is located in, the control module 170 may use the illumination sensor, temperature sensor, or pressure sensor included in the electronic device 101. That is, the control module 170 may determine the space where the user is located using data outputted through the illumination sensor, temperature sensor, or pressure sensor. Further, the control module 170 may control the operation of the electronic device 101 depending on the space where the user is located. For example, in case the illuminance is high, the control module 170 may determine that it is shiny outside, and the control module 170 may additionally adjust the screen brightness of the electronic device 101.

Figures 22A, 22B:
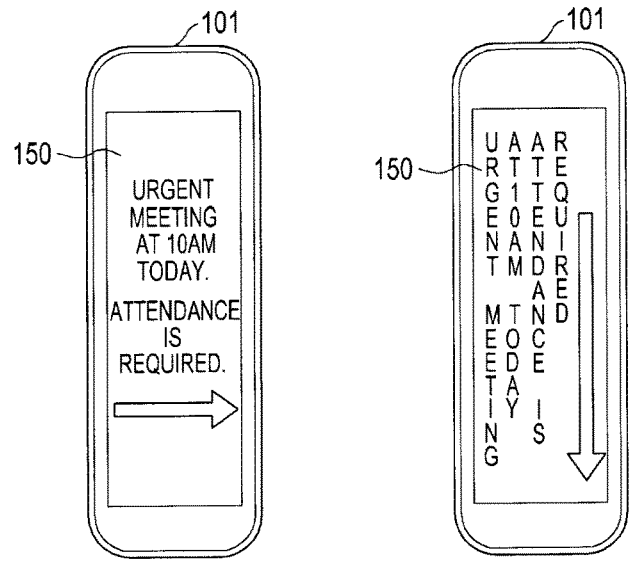
FIGS. 22A to 22C are views illustrating another example of a method of displaying content by an electronic device according to an embodiment of the present invention.
Figure 22C:
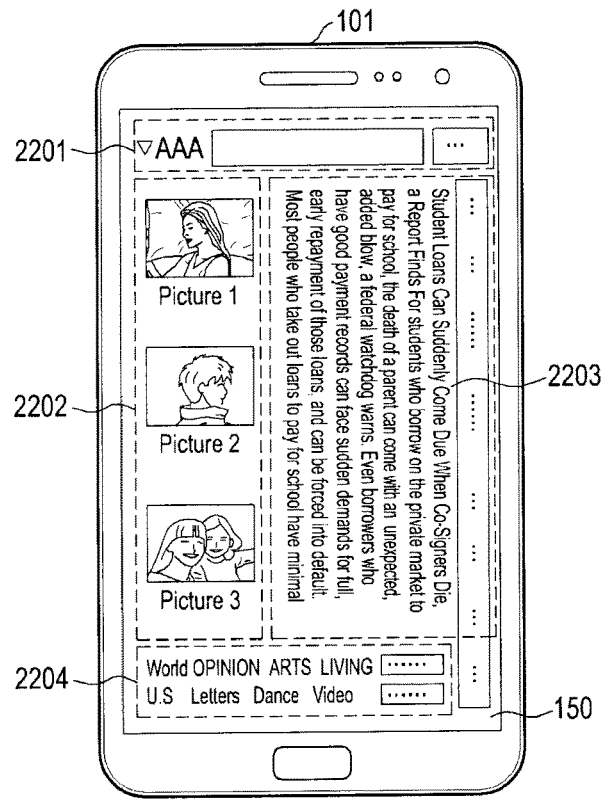

FIGS. 22A to 22C are a view illustrating another examples of a method of displaying content by an electronic device according to an embodiment of the present invention.

FIG. 22A shows the electronic device 101 running the horizontal writing mode and including the screen of the display 150 where contents from the user are inputted in the horizontal direction (from left to right). The content inputted through the screen of the display 150 from the user in FIG. 22A is text saying "Urgent meeting at 10 o'clock today. Attendance is required". According to an embodiment of the present invention, the electronic device 101 may support writing horizontally in the horizontal writing mode and may receive letters from the user in the horizontal direction.

FIG. 22A shows the electronic device 101 running the vertical writing mode and including the screen of the display 150 where contents from the user are inputted in the vertical direction (from above to down). The content inputted through the display 150 from the user in FIG. 22B is text saying "Urgent meeting at 10 AM today. Attendance is required". According to an embodiment of the present invention, the electronic device 101 may support writing vertically in the vertical writing mode and may receive letters from the user in the vertical direction.

As described above, the electronic device 101 may receive contents from the user as well as output contents in the horizontal or vertical direction of the display 150. According to an embodiment of the present invention, the electronic device 101 may receive contents (e.g., text or images) from the user through a virtual keypad or handwriting recognition. Further, the horizontal writing mode as shown in FIG. 22A and the vertical writing mode as shown in FIG. 22B may be performed in parallel. For example, contents may be displayed or inputted on an upper end of the display 150 in the horizontal writing mode. Contents may be displayed or inputted on a lower end of the display 150 in the vertical writing mode.

FIG. 22C shows the electronic device 101 outputting the content in the horizontal and vertical direction through the display 150. Referring to FIG. 22C, the electronic device 101 runs the horizontal writing mode for a portion of the display 150 and the vertical writing mode for the rest of the display 150. Among the contents 2201, 2202, 2203, and 2204 displayed on the display 150, the first content 2201, the second content 2202, and the fourth content 2204 are outputted in the horizontal direction (from left to right) according to the horizontal writing mode. Further, the third content 2203 is outputted in the vertical direction (from above to down) according to the vertical writing mode. As shown in FIG. 22C, the horizontal writing mode and the vertical writing mode may be performed in parallel on one screen, and this may apply to input of contents as well as output of contents.

According to an embodiment of the present invention, in case of providing a screen image including various contents, such as a web browser screen, to the user, the horizontal area in the layout constituting the screen image, where the name of search engine (e.g., NAVER) and the search window are arranged, the vertical area where the body and pictures are arranged, and a lower horizontal area where other contents are arranged may have the contents arranged in the form of horizontal writing or vertical writing depending on the shape of the areas. According to an embodiment of the present invention, the control module 170 may recognize the vertical mode or horizontal mode using the tilt information on the screen included in the display 150. The control module 170 may select the writing mode in which more information may be displayed of the horizontal writing and vertical writing using the tilt information or determine the shape of areas configuring the layout of the screen image, and control the display 150 so that the contents are arranged in the corresponding area in the horizontal writing if the corresponding area is longer horizontally and are arranged in the corresponding area in the vertical writing if the corresponding area is longer vertically.

FIG. 23 is a view illustrating another example of a method of displaying content by an electronic device according to an embodiment of the present invention.

Referring to FIG. 23, the electronic device 101 may display content in a color requiring less power consumption or its similar color. According to an embodiment of the present invention, the electronic device 101 may display an edit window 2302 to receive content from the user or display the edit window 2302 for editing the content.

According to an embodiment of the present invention, the control module 170 may adjust the font or color for saving electric current depending on the remaining battery and charged state. In case the electronic device 101 is implemented as a wearable device or mobile device, the battery capability may be limited by the characteristics of the device. Accordingly, the control module 170 may control the operation of the electronic device 101 to minimize power consumption due to running various operations of the electronic device 101.

For example, if the remaining battery of the electronic device 101 is less than 30%, the control module 170 may configure the screen image so that the display 150 including the screen may be driven only with smaller power in order to minimize the power consumption. For example, the control module 170 may configure the screen image in a color that may be implemented with less power and its close color. As an example, in case the screen is a LCD, the control module 170 may configure the background of the screen image in black. As an example, in case the screen is an OLED, the control module 170 may control some OLEDs to output the background in red and convert the shape or color of the remaining portion except for the background, e.g., images or text, into a form that may be easily noticeable to the user. Further, in case only a portion of the screen may light on, such as the OLED, the control module 170 may control the display 150 so that only a portion of the screen may light on considering the characteristics of the OLED. For example, the control module 170 may control the display 150 so that an area positioned off the user's view angle of the screen displaying the contents may light off.

According to an embodiment of the present invention, the control module 170 may control the display 150 including the screen displaying contents depending on the type of exercise. For example, the operation of determining whether the screen is at a position noticeable to the user's eyes or not during exercise may be more easily performed by determining the type of the exercise. For example, swimming has a unique movement pattern per swimming style, and thus, the control module 170, if a unique movement pattern is determined to occur as per the style, may determine that the user's exercise is swimming. As another example, for running outdoor, the control module 170 may determine that the exercise is running through arm movement information and moving distance.

According to an embodiment of the present invention, the electronic device 101 may previously receive the type of exercise from the user. The user may input the type of exercise to the electronic device 101 before starting to exercise.

The control module 170 may obtain a unique pattern of the exercise through the information indicating the exercise, i.e., exercise information. Further, the control module 170 may obtain information on the direction and position where the electronic device 101 is mounted using the user's body exercise range information. The control module 170 may grasp the user's view direction or view position information based on the direction or position of the electronic device 101. Further, the control module 170 may recognize or estimate the user's view direction or view position information along with the position and direction of the electronic device 101. The control module 170 may control the display 150 or light off the screen so that information fitting the circumstance, i.e., contents, may be displayed based on the user's view direction, view position information, and position and direction information of the electronic device 101.

In particular, in case the electronic device 101 automatically recognizes the type of the user's exercise, the control module 170 may control the electronic device 101 to provide the user with necessary information using the user's pose and the position and direction information of the electronic device 101. For example, the electronic device 101 may provide the user with only information (e.g., coaching information or pose correction) necessary at necessary times. By contrast, if the time is determined to be not necessary for the user, the electronic device 101 may reduce power consumption or display only common information by abstaining from displaying separate information.

Figure 24:
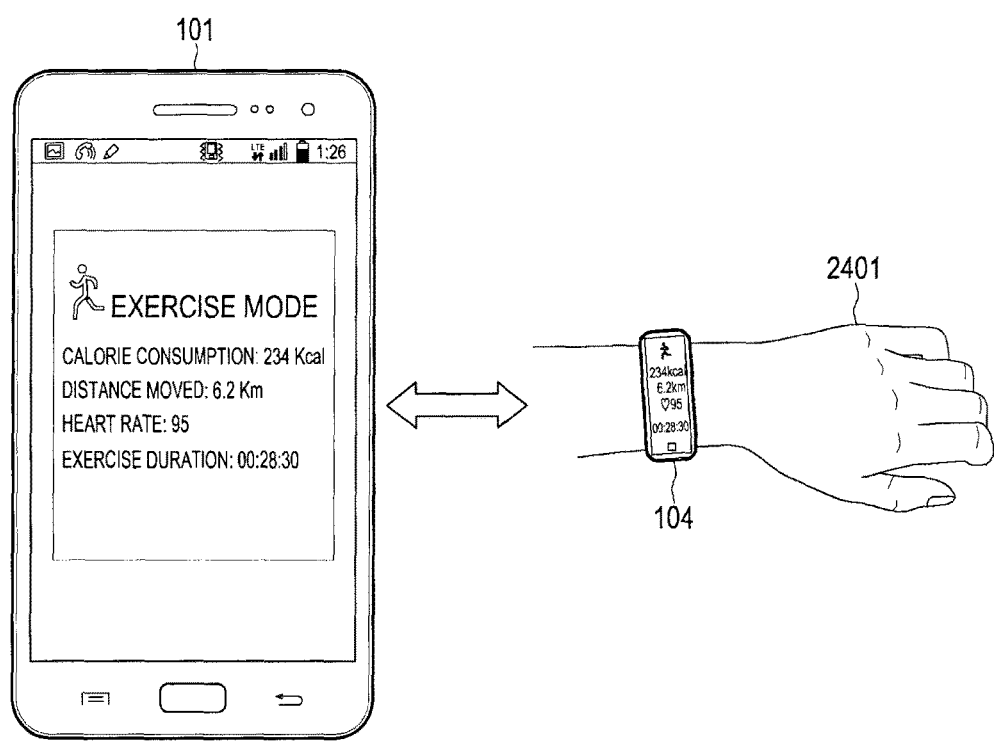
FIG. 24 is a view illustrating an example of a method of displaying content by a plurality of electronic devices according to an embodiment of the present invention.

FIG. 24 is a view illustrating an example of a method of displaying content by a plurality of electronic devices according to an embodiment of the present invention. The electronic device 101 and the electronic device 104, respectively, may be implemented as a host device and companion device, and the electronic device 101 and the electronic device 104 may interwork with each other. It is assumed in FIG. 24 that the electronic device 101 which is the host device controls the electronic device 104 which is the companion device.

Referring to FIG. 24, the electronic device 104 which is the companion device is worn on a wrist of the user 2401 and runs an exercise mode under the control of the electronic device 101. Since the electronic device 104 is worn on the wrist of the user 2401, the electronic device 101 may control the sensor module (not shown) of the electronic device 104 to measure various bio signals of the user 2401 (e.g., the blood pressure, blood flow, heart rate, body temperature, respiratory rate, oxygen saturation, heart sound, respiratory sound, or blood sugar of the user 2401) or moving speed, moving acceleration, moving direction or slope of the electronic device 104. The electronic device 101 may determine the direction of the display 150 of the electronic device 104 or the current state of the user 2401 based on the sensor value measured through the sensor module of the electronic device 104. The electronic device 101 may determine the content to be displayed on the display 150 according to the direction of the display 150 of the electronic device 104 or the current state of the user 2401. Further, the electronic device 101 may transmit the content to be displayed on the display 150 of the electronic device 104 to the electronic device 104, and the electronic device 104 may display the content received from the electronic device 101.

The electronic device 101 may sense that the user 2401 is doing exercise through the sensor value measured by the sensor module of the electronic device 104 and may change the electronic device 101 or electronic device 104 into the exercise mode. If the exercise mode runs, the electronic device 101 or electronic device 104 may display content by the exercise mode on the display 150.

It is assumed in FIG. 24 that the electronic device 101 determines that the user 2401 is doing exercise based on the sensor value measured through the sensor module of the electronic device 104. In FIG. 24, the control module 170 of the electronic device 101 switches the operation mode of the electronic device 101 and the electronic device 104 both into the exercise mode. Accordingly, the type of exercise (running), calorie consumption (234 Kcal), moving distance (6.2 km), pulse rate (95), and exercise time (00,28,30) are being displayed on the display of the electronic device 104. Further, contents as per the exercise mode may also be displayed on the electronic device 101 which is the host device and is interworking with the electronic device 104. Further, the operation mode (exercise mode) of the electronic device 101, calorie consumption (234 Kcal), moving distance (6.2 km), heart rate (95), and exercise time (00,28, 30) are being displayed on the display 150 of the electronic device 101.

Here, the contents displayed on the display of the electronic device 104 may be contents transmitted from the electronic device 101. Further, the electronic device 104 may continuously measure bio signals of the user 2401 using the sensor module under the control of the electronic device 101 and transfer sensor values measured by the sensor module to the electronic device 101.

Figure 25:
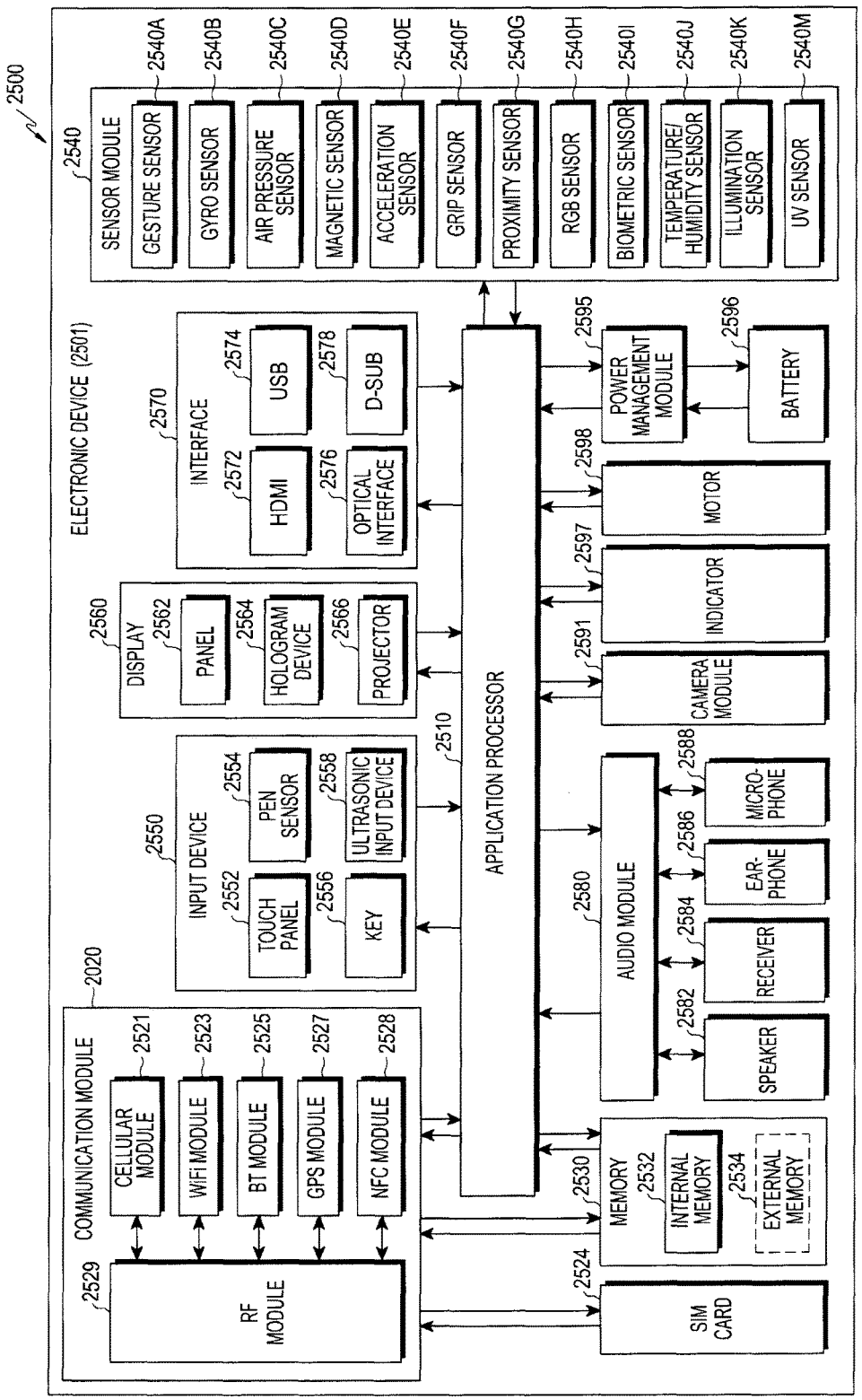
FIG. 25 is a block diagram illustrating an electronic device according to an embodiment of the present invention.

FIG. 25 is a block diagram 2500 illustrating an electronic device 2501 according to an embodiment of the present invention.

The electronic device 2501 may include the whole or part of the configuration of, e.g., the electronic device 101 or the electronic device 104 shown in FIG. 1. Referring to FIG. 25, the electronic device 2501 may include one or more application processors (APs) 2510, a communication module 1220, an SIM (subscriber identification module) card 2524, a memory 2530, a sensor module 2540, an input device 2550, a display 2560, an interface 2570, an audio module 2580, a camera module 2591, a power management module 2595, a battery 2596, an indicator 2597, and a motor 2598.

The AP 2510 may control multiple hardware and software components connected to the AP 2510 by running an operating system or application programs, and the AP 2010 may process and compute various data including multimedia data. The AP 2510 may be implemented in, e.g., a system on chip (SoC). According to an embodiment of the present invention, the AP 2510 may further include a graphic processing unit (GPU) (not shown).

The communication module 2520 (e.g. the communication interface 2560) may perform data communication with other electronic devices (e.g., the electronic device 104 or the server 106) connected with the electronic device 2501 (e.g., the electronic device 101) via a network. According to an embodiment of the present invention, the communication module 2520 may include a cellular module 2521, a WiFi module 2523, a BT module 2525, a GPS module 2527, an NFC module 2528, and a radio frequency (RF) module 2529.

The cellular module 2521 may provide voice call, video call, text, or Internet services through a communication network (e.g., an LTE, LTE-A, CDMA, WCDMA, UMTS, WiBro, or GSM network). The cellular module 2521 may perform identification and authentication on the electronic device in the communication network using, e.g., a subscriber identification module (e.g., the SIM card 2524). According to an embodiment of the present invention, the cellular module 2521 may perform at least some of the functions providable by the AP 2510. For example, the cellular module 2521 may perform at least some of the multimedia control functions.

According to an embodiment of the present invention, the cellular module 2521 may include a communication processor (CP). The cellular module 2521 may be implemented in, e.g., an SoC. Although in FIG. 25 the cellular module 2521 (e.g., a communication processor), the memory 2530, or the power management module 2595 are provided separately from the AP 2510, the AP 2510 may be configured to include at least some (e.g., the cellular module 2521) of the above-listed components, according to an embodiment of the present invention.

According to an embodiment of the present invention, the AP 2510 or the cellular module 2521 (e.g., a communication processor) may load commands or data received from a non-volatile memory or other component connected thereto and process the loaded commands or data. The AP 2510 or the cellular module 2521 may store, in the non-volatile memory, data received from other component(s) or data generated by the other component(s).

The Wi-Fi module 2523, the BT module 2525, the GPS module 2527, or the NFC module 2528 may include a process for, e.g., processing data communicated through the module. Although in FIG. 25 the cellular module 2521, the WiFi module 2523, the BT module 2525, the GPS module 2527, and the NFC module 2528 are shown in their respective separate blocks, at least some (e.g., two or more) of the cellular module 2521, the WiFi module 2523, the BT module 2525, the GPS module 2527, and the NFC module 2528 may be included in a single integrated circuit (IC) or an IC package. For example, at least some of the processors respectively corresponding to the cellular module 2521, the WiFi module 2523, the BT module 2525, the GPS module 2527, and the NFC module 2528 (e.g., the communication processor corresponding to the cellular module 2521 and the WiFi processor corresponding to the WiFi module 2523) may be implemented in a single SoC.

The RF module 2529 may communicate data, e.g., RF signals. The RF module 2529 may include, e.g., a transceiver, a power amp module (PAM) (not shown), a frequency filter (not shown), or a low noise amplifier (LNA) (not shown). The RF module 2529 may further include parts (e.g., conductors or wires) for communicating radio waves in a free space upon performing wireless communication. Although in FIG. 25 the cellular module 2521, the Wi-Fi module 2523, the BT module 2525, the GPS module 2527, and the NFC module 2528 share a single RF module 2529, the cellular module 2521, the Wi-Fi module 2523, the BT module 2525, the GPS module 2527, or the NFC module 2528 may communicate RF signals through a separate RF module(s).

According to an embodiment, the electronic device 2501 may be connected with a companion device (e.g., the electronic device 104) through the Wi-Fi module 2523, the BT module 2525, or the NFC module 2528. Further, the electronic device 2501 may be linked to a base station (e.g., the server 106) through the cellular module 2521 and may be connected with a host device (e.g., the electronic device 101) through the base station.

The SIM card 2524 may include a subscriber identification module, and the SIM card 2024 may be inserted into a slot formed at a predetermined position of the electronic device. The SIM card 2524 may contain unique identification information (e.g., an integrated circuit card identifier (ICCID) or subscriber information (e.g., an international mobile subscriber identity (IMSI)).

The memory 2530 (e.g., the memory 2530) may include an internal memory 2532 or an external memory 2534. The internal memory 2532 may include, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present invention, the internal memory 2532 may be a solid state drive (SSD). The external memory 2534 may include a flash drive, e.g., a compact flash (CF) memory, a secure digital (SD) memory, a micro-SD memory, a min-SD memory, an extreme digital (xD) memory, or a Memory Stick®. The external memory 2534 may be functionally connected with the electronic device 2501 via various interfaces. According to an embodiment of the present invention, the electronic device 2501 may further include a storage device (or storage medium) such as a hard disk drive.

The sensor module 2540 may measure a physical quantity or detect an operational stage of the electronic device 2501, and the sensor module 2040 may convert the measured or detected information into an electrical signal. The sensor module 2540 may include at least one of, e.g., a gesture sensor 2540A, a gyro sensor 2540B, an air pressure sensor 2540C, a magnetic sensor 2540D, an acceleration sensor 2540E, a grip sensor 2540F, a proximity sensor 2540G, a color sensor 2540H such as an red-green-blue (RGB) sensor, a bio sensor 2540I, a temperature/humidity sensor 2540J, an illumination sensor 2540K, or an ultra violet (UV) sensor 2540M. Additionally or alternatively, the sensor module 2540 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor which is not shown in the drawings. Further, the sensor module 2540 may include a heart rate variability (HRV) sensor or heart rate monitor (FIRM) sensor. The sensor module 2540 may further include a control circuit for controlling at least one or more of the sensors included in the sensing module.

The input unit 2550 may include a touch panel 2552, a (digital) pen sensor 2554, a key 2556, or an ultrasonic input device 2558. The touch panel 2552 may recognize touch inputs in at least one of capacitive, resistive, infrared, or ultrasonic methods. The touch panel 2552 may further include a control circuit. With the capacitive method, physical contact or proximity detection may be possible. The touch panel 2552 may further include a tactile layer. In this regard, the touch panel 2552 may provide the user with a tactile response.

The (digital) pen sensor 2554 may be implemented in a way identical or similar to e.g., how a touch input of a user is received, or by using a separate sheet for recognition. The key 2556 may include e.g., a physical button, optical key or key pad. The ultrasonic input device 2558 may use an input tool that generates an ultrasonic signal and enable the electronic device 2501 to identify data by sensing the ultrasonic signal to a microphone (e.g., a microphone 2588). According to an embodiment of the present invention, the electronic device 2501 may receive the user's input from an external electronic device (e.g., a network, computer, or server) connected with the electronic device 2301 using the communication module 2520.

The display 2560 (e.g., the display 2560) may include a panel 2562, a hologram device 2564, or a projector 2566. The panel 2562 may be, e.g., a liquid crystal display (LCD), active matrix organic light emitting diodes (AMOLEDs), or the like. The panel 2562 may be implemented to be flexible, transparent, or wearable. The panel 2562 may also be incorporated with the touch panel 2552 in a module. The hologram device 2564 may make three dimensional (3D) images (holograms) in the air by using light interference. The projector 2566 may display an image by projecting light onto a screen. The screen may be, for example, located inside or outside of the electronic device 2501. In accordance with an embodiment, the display 2560 may further include a control circuit to control the panel 2562, the hologram device 2564, or the projector 2666.

The interface 2570 may include e.g., a High Definition Multimedia Interface (HDMI) 2572, a USB 2574, an optical interface 2576, or a D-subminiature (D-sub) 2578. The interface 2570 may be included in e.g., the communication interface 160 shown in FIG. 1. Additionally or alternatively, the interface 2570 may include a mobile high-definition link (MHL) interface, a secure digital (SD) card/multimedia card (MMC) interface, or IrDA standard interface.

The audio module 2580 may perform various processes (e.g., encoding or decoding) relating to converting a sound wave and audio signal to an electric signal or vice versa. At least a part of the audio module 2580 may be included in e.g., the electronic device 101 as shown in FIG. 1. The audio module 2580 may process sound information input or output through e.g., a speaker 2582, a receiver 2584, an earphone 2586, or a microphone 2588.

The camera module 2591 may be a device for capturing still images and videos, and may include, according to an embodiment of the present invention, one or more image sensors (e.g., front and back sensors) (not shown), a lens (not shown), an Image Signal Processor (ISP) (not shown), or a flash such as an LED or xenon lamp (not shown).

The power manager module 2595 may manage power of the electronic device 2501. Although not shown, e.g., a power management integrated circuit (PMIC), a charger IC, or a battery or fuel gauge is included in the power manager module 2595.

The PMIC may be mounted on e.g., an IC or an SOC. A charging method may be divided into wired and wireless charging methods. The charger IC may charge a battery and prevent overvoltage or overcurrent from being induced from a charger. According to an embodiment of the present invention, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 2596, a voltage, a current, or a temperature while the battery 2096 is being charged. The battery 2596 may save or generate electricity, and supply power to the electronic device 2501 with the saved or generated electricity. The battery 2596 may include, e.g., a rechargeable battery or a solar battery.

The indicator 2597 may indicate a particular state of the electronic device 2501 or a part of the electronic device (e.g., the AP 2510), including e.g., a booting state, a message state, or recharging state. The motor 2598 may convert an electric signal to a mechanical vibration. Although not shown, a processing unit for supporting mobile TV, such as a GPU may be included in the electronic device 2501. The processing unit for supporting mobile TV may process media data conforming to a standard for digital multimedia broadcasting (DMB), digital video broadcasting (DVB), or media flow.

Each of the aforementioned components of the electronic device may include one or more parts, and a name of the part may vary with a type of the electronic device. The electronic device in accordance with various embodiments of the present invention may include at least one of the aforementioned components, omit some of them, or include other additional component(s). Some of the components may be combined into an entity, but the entity may perform the same functions as the components may do.

According to an embodiment of the present invention, an electronic device for displaying a content may comprise a display including a screen displaying the content; and a control module configured to: obtain sensing data, determine a user's current state based on the sensing data, determine a content to be displayed on the screen based on the current state, and control the display to display the content on the screen.

Figure 26:
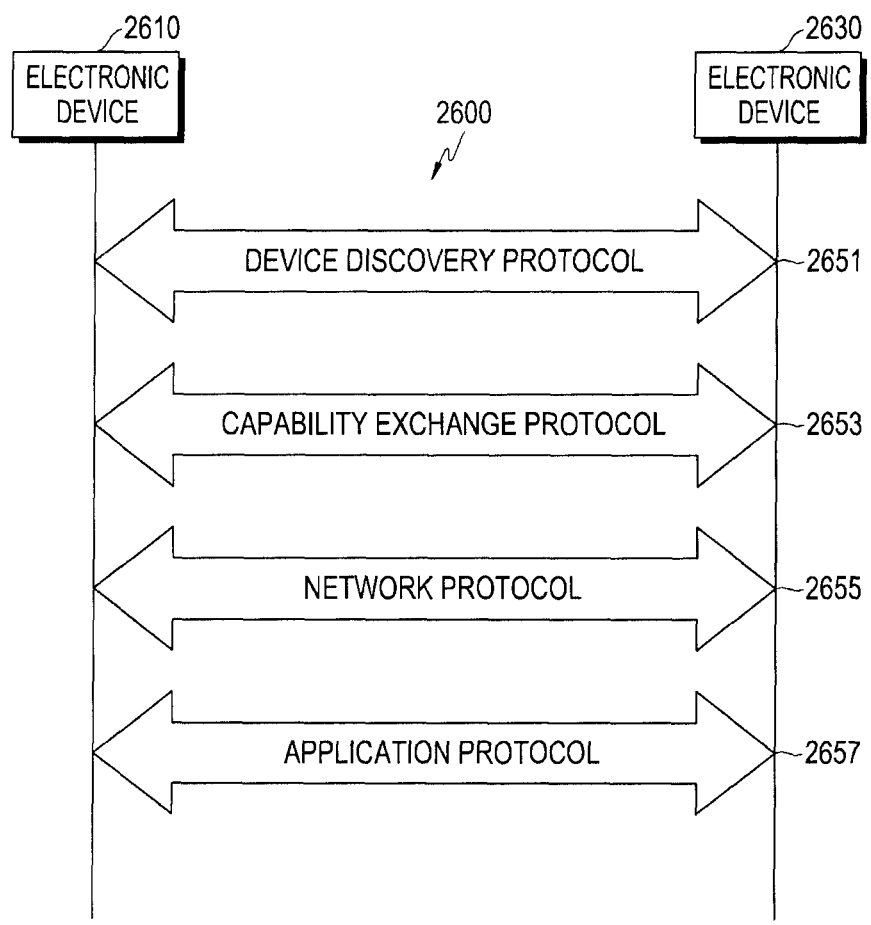
FIG. 26 is a view illustrating a communication protocol between a plurality of electronic devices (e.g., the electronic device and electronic device) according to an embodiment of the present invention.

FIG. 26 illustrates a communication protocol 2600 between a plurality of electronic devices (e.g., the electronic device 2610 and the electronic device 2630) according to an embodiment of the present invention.

Referring to FIG. 26, the communication protocols 2600 may include, e.g., a device discovery protocol 2651, a capability exchange protocol 2653, a data/session protocol 2655, and an application protocol 2657.

According to an embodiment of the present invention, the device discovery protocol 2651 may be a protocol for each electronic device (e.g., the electronic device 2610 or the electronic device 2630) to detect an external electronic device that the electronic device may communicate with or to link itself to the detected external electronic device. For example, the electronic device 2610 (e.g., the electronic device 101) may detect the electronic device 2630 (e.g., the electronic device 104), as a device communicable with the electronic device 2210, through its available communication scheme (such as through Wi-Fi, BT, or USB) using the device discovery protocol 2651. The electronic device 2610 may obtain and store identification information about the detected electronic device 2630 using the device discovery protocol 2651 in order to establish a communication link with the electronic device 2630. The 2610 may establish such communication link with the electronic device 2630 based on, e.g., at least the identification information.

According to an embodiment of the present invention, the device discovery protocol 2651 may be a protocol for mutual authentication between the plurality of electronic devices. For example, the electronic device 2610 may perform authentication between the electronic device 2610 and the electronic device 2630, at least, based on communication information for linkage with the electronic device 2630 (e.g., media access control (MAC) address, universally unique identifier (UUID), subsystem identification (SSID), or information provider (IP)).

According to an embodiment of the present invention, the capability exchange protocol 2653 may be a protocol for exchanging information relating to capabilities of services supportable by the electronic device 2610 or the electronic device 2630. For example, the electronic device 2610 and the electronic device 2630 may swap the information regarding the capabilities of the services that they are currently providing through the capability exchange protocol 2653. The exchangeable information may include identification information indicating particular services supportable by the electronic device 2610 and the electronic device 2620. For example, the electronic device 2610 may receive identification information on a particular service provided by the electronic device 2630 from the electronic device 2630 through the capability exchange protocol 2633. In this case, the electronic device 2610 may determine, based on the received identification information, whether the electronic device 2610 may be supportive of the particular services.

According to an embodiment, the data/session protocol 2655 may be a protocol for controlling the flow of data that is communicated between the electronic devices (e.g., the electronic device 2610 and the electronic device 2630) communicationably connected with each other, e.g., so that the electronic devices may provide services while interworking with each other. For example, the electronic device 2610 or the electronic device 2630 may conduct error control or data quality control using the data/session protocol 2655. Additionally or alternatively, the data/session protocol 2655 may determine the transmission format of data communicated between the electronic device 2610 and the electronic device 2630. The electronic device 2610 or the electronic device 2630 may manage, at least, a session (e.g., session connection or session termination) for data exchange between the electronic devices 910 and 930 using the data/session protocol 2655.

According to an embodiment of the present invention, the application protocol 2657 may be a protocol for providing a procedure or information for exchanging data related to services offered to an external electronic device. For example, the electronic device 2610 (e.g., the electronic device 101 or electronic device 104) may provide a service to the electronic device 2630 (e.g., the electronic device 104 or the server 106) through the application protocol 2657.

According to an embodiment of the present invention, the communication protocols 2600 may be standard communication protocols, protocols designated by an individual or an organization (e.g., a communication device/system manufacturer or network provider) or combinations thereof.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to yet still another embodiment of the present invention, there is provided a machine readable storage medium recording a program for executing a method for displaying content by an electronic device, may comprise obtaining sensing data; determining a current state of a user based on the sensing data; determining a content to be displayed on a screen based on the current state; and displaying the content on the screen.

At least a part of the device (e.g., modules or their functions) or method (e.g., operations) may be implemented as instructions stored in a computer-readable storage medium e.g., in the form of a programming module. The instructions, when executed by one or more processor (e.g., the processor 120), may cause the processor to carry out a corresponding function. The computer-readable storage medium may be e.g., the memory 130. At least a part of the programming module may be implemented (e.g., executed) by e.g., the processor 120. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as compact disc ROMs (CD-ROMs) and digital versatile discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present invention, and vice versa.

Modules or programming modules in accordance with various embodiments of the present invention may include at least one or more of the aforementioned components, omit some of them, or further include other additional components. Operations performed by modules, programming modules or other components in accordance with various embodiments of the present invention may be carried out sequentially, simultaneously, repeatedly, or heuristically. Furthermore, some of the operations may be performed in a different order, or omitted, or include other additional operation(s).

According to an embodiment of the present invention, there is provided a storage medium storing commands configured to be executed by at least one processor to enable the at least one processor to perform at least one operation, wherein the at least one operation may include the operation of obtaining sensing data for determining the direction of a display, the operation of determining the direction of the display based on the sensing data, the operation of determining the display direction of content according to the direction of the display, and the operation of displaying the content according to the display direction.

The embodiments herein are provided merely for better understanding of the present invention, and the present invention should not be limited thereto or thereby. It should be appreciated by one of ordinary skill in the art that various changes in form or detail may be made to the embodiments without departing from the scope of the present invention defined by the following claims.

The invention claimed is:

1. A method for displaying a content by an electronic device, the method comprising:
obtaining sensing data;
determining a current state of a user based on the sensing data including a data relating a strength of an exercise performed by the user;
when the strength of the exercise of the obtained sensing data is in a first range, displaying a first number of content on a display of the electronic device; and
when the strength of the exercise of the obtained sensing data is in a second range, displaying a second number of content on the display.

2. The method of claim 1, wherein sensing data comprises one or more of the user's blood pressure, blood flow, heart rate, body temperature, respiratory rate, oxygen saturation, heart sound, respiratory sound, or blood sugar.

3. The method of claim 1, further comprising determining one or more of a type of the exercise of the user, a progress state of the exercise, and a moving direction of the user or a moving speed of the user.

4. The method of claim 3, further comprising adjusting a color of content being displayed in the display of the electronic device based on the strength of the exercise.

5. The method of claim 4,
when the first range is a range including higher value than the second range, the displayed first number of content is less than the displayed second number.

6. The method of claim 3, further comprising adjusting the number of the content or a color of a content being displayed in the display of the electronic device based on the moving speed.

7. The method of claim 6, further comprising:
when the moving speed increases, displaying the displayed first number of the content or the displayed second number of content to be decreased on the display, and
when the moving speed decreases, displaying the displayed first number of the content or the displayed second number of content to be increased on the display.

8. The method of claim 1, further comprising:
determining a stress level of the user; and
determining whether the stress level is equal to or larger than a predetermined threshold.

9. The method of claim 8, further comprising displaying an alarm of stopping exercise if the stress level is equal to or larger than the predetermined threshold.

10. The method of claim 8, further comprising displaying content for continuing an exercise by the user if the stress level is less than the predetermined threshold.

11. An electronic device for displaying a content, comprising:
a display including a screen displaying the content; and
a processor configured to:
obtain sensing data,
determine a current state of a user based on the sensing data including a data relating a strength of an exercise performed by the user;
when the strength of the exercise of the determined sensing data is in a first range, display a first number of content on the display; and
when the strength of the exercise of the determined sensing data is in a second range, displaying a second number of content on the display.

12. The electronic device of claim 11, wherein the sensing data comprises one or more of the user's blood pressure, blood flow, heart rate, body temperature, respiratory rate, oxygen saturation, heart sound, respiratory sound, or blood sugar.

13. The electronic device of claim 11, wherein the processor is further configured to:
determine one or more of a type of the exercise of the user, a progress state of the exercise, a moving direction of the user, or a moving speed of the user.

14. The electronic device of claim 13, wherein when the first range is a range including higher value than the second range, the displayed first number of content is less than the displayed second number.

15. The electronic device of claim 13, wherein the processor is further configured to:
adjust the displayed first number of content or the displayed second number of content based on the moving speed of the user.

16. The electronic device of claim 15, wherein the processor is further configured to:
decrease the displayed first number of content or the displayed second number of content when the moving speed of the user increases; and
increase the displayed first number of content or displayed second number of content when the moving speed of the user decreases.

17. The electronic device of claim 11, wherein the processor is further configured to:
determine a stress level of the user,
determines whether the stress level of the user is equal to or larger than a predetermined threshold, and
if the stress level is equal to or larger than the predetermined threshold, control the display to display an alarm for stopping an exercise of the user on the screen.

18. The electronic device of claim 17, wherein the processor is further configured to:
if the stress level of the user is less than the predetermined threshold, control the display to display the content for continuing the exercise of the user.

19. The electronic device of claim 18, wherein the processor is configured to:
if a vertical length of the screen is larger than a horizontal length, control the display to display the content in a vertical direction.

20. The electronic device of claim 11, wherein the processor is further configured to:
determine a direction of the screen based on the sensing data,
determine a display direction of the content based on the direction of the screen, and
control the display to display the content based on the display direction.

21. The electronic device of claim 20, wherein the processor is configured to:
if a horizontal length of the screen is larger than a vertical length, control the display to display the content in a horizontal direction.

22. The electronic device of claim 20, wherein the processor is configured to:
control the display to display the content on a portion of the screen in a horizontal direction, and
control the display to display the content on a remaining portion of the screen in a vertical direction.

23. The electronic device of claim 20, wherein the processor is configured to:
determine a rotation angle of the screen based on a slope of the electronic device included in the sensing data, and
control the display to display the content in a leaning position in a direction of the screen based on the rotation angle.

24. The electronic device of claim 20, wherein the processor is configured to:
if an angle between the direction of the screen and an opposite direction of a view of the user is less than a predetermined reference value, control the display to display the content in a horizontal direction.

25. The electronic device of claim 20, wherein the processor is configured to:
if an angle between the direction of the screen and an opposite direction of a view of the user is equal to or larger than a predetermined reference value, control the display to abstain from displaying the content on the screen.

26. The electronic device of claim 20, wherein the processor is configured to:
determine a degree of movement of the user as a user state based on the sensing data, and
if the degree of the user's movement is not less than a predetermined reference value, restrict the number of the content displayed on the screen.

27. The electronic device of claim 26, wherein the processor is further configured to:
abstain from restricting a number of the content if the degree of the user's movement is less than the predetermined reference value.

28. A non-transitory machine-readable storage medium recording a program executable by a processor of an electronic device, the program comprising:
obtaining sensing data;
determining a current state of a user based on the sensing data including a data relating a strength of an exercise performed by the user;
when the strength of the exercise of the determined sensing data is in a first range, displaying a first number of content on a display of the electronic device; and
when the strength of the exercise of the determined sensing data is in a second range, displaying a second number of content on the display.

* * * * *